US012486121B2

(12) United States Patent
Cedarleaf-Pavy et al.

(10) Patent No.: US 12,486,121 B2
(45) Date of Patent: Dec. 2, 2025

(54) ROBOTICALLY-CONTROLLED STRUCTURE TO REGULATE ITEM FLOW

(71) Applicant: Dexterity, Inc., Redwood City, CA (US)

(72) Inventors: Jordan Cedarleaf-Pavy, Mountain View, CA (US); Austen Poteet, San Francisco, CA (US); Timothy Ryan, San Francisco, CA (US); David Leo Tondreau, III, San Francisco, CA (US); Adam Kell, Millbrae, CA (US); Harshit Shah, Menlo Park, CA (US)

(73) Assignee: Dexterity, Inc., Redwood City, CA (US)

( * ) Notice: Subject to any disclaimer, the term of this patent is extended or adjusted under 35 U.S.C. 154(b) by 825 days.

(21) Appl. No.: 17/550,408

(22) Filed: Dec. 14, 2021

(65) Prior Publication Data
US 2022/0324658 A1 Oct. 13, 2022

Related U.S. Application Data

(60) Provisional application No. 63/173,263, filed on Apr. 9, 2021.

(51) Int. Cl.
*G06F 7/00* (2006.01)
*B65G 1/00* (2006.01)
*B65G 47/90* (2006.01)

(52) U.S. Cl.
CPC .................. *B65G 47/905* (2013.01)

(58) Field of Classification Search
CPC ..... B65G 47/905; B65G 47/88; B65G 1/1378
USPC .................. 700/213, 223, 230, 228; 414/281
See application file for complete search history.

(56) References Cited

U.S. PATENT DOCUMENTS

| 4,438,841 | A | | 3/1984 | Johnson |
| 4,825,997 | A | | 5/1989 | Bowman |
| 10,913,615 | B2 | * | 2/2021 | Wagner ................. B65G 47/12 |
| 11,401,116 | B1 | * | 8/2022 | Covelle ............. B65G 47/8823 |

(Continued)

FOREIGN PATENT DOCUMENTS

| CN | 101095035 A | * | 12/2007 | ........... G01G 19/393 |
| CN | 201169390 | | 12/2008 | |

(Continued)

OTHER PUBLICATIONS

Lewco Conveyor, "Belt Conveyor with Squaring Stop and Reject Paddle / Overhead Pusher", YouTube, Apr. 30, 2014, retrieved on [Apr. 29, 2022]. Retrieved from the internet <URL: https://www.youtube.com/watch?v=XXEvVCuaXNA> entire document.

*Primary Examiner* — Yolanda R Cumbess
(74) *Attorney, Agent, or Firm* — Van Pelt, Yi & James LLP

(57) ABSTRACT

A robotic system is disclosed. The system includes a communication interface, and one or more processors coupled to the communication interface and configured to: receive, via the communication interface, data associated with a plurality of items within a workspace, determine to control a flow of items on a chute based at least in part on the data associated with the plurality of items within the workspace, and in response to determining to control the flow of items, implement to control the flow of items at least by controlling a flow disrupter move in a manner that causes the flow of items to change, wherein the flow disrupter is flush with the chute when the flow disrupter is not deployed to impede the flow of items.

25 Claims, 19 Drawing Sheets

(56) References Cited

U.S. PATENT DOCUMENTS

| | | | |
|---|---|---|---|
| 11,548,739 B1 * | 1/2023 | Mao | ............... B65G 47/90 |
| 2005/0217210 A1 | 10/2005 | Sting | |
| 2012/0061207 A1 | 3/2012 | Dewitt | |
| 2012/0181145 A1 | 7/2012 | Rogers | |
| 2016/0101957 A1 | 4/2016 | Costanzo | |
| 2017/0312789 A1 | 11/2017 | Schroader | |
| 2019/0070728 A1 | 3/2019 | Wertenberger | |
| 2020/0095001 A1 | 3/2020 | Menon | |
| 2021/0171291 A1 * | 6/2021 | Green | ............... B65G 47/64 |

FOREIGN PATENT DOCUMENTS

| | | | | |
|---|---|---|---|---|
| CN | 104040306 A * | 9/2014 | | ............ G01G 13/06 |
| EP | 0521541 | 1/1993 | | |
| EP | 1127812 | 8/2001 | | |
| EP | 1127812 A1 * | 8/2001 | | ........... B65G 11/203 |
| EP | 2794435 | 4/2016 | | |
| EP | 3246272 | 11/2017 | | |
| EP | 3246272 A1 * | 11/2017 | | ............... B07C 3/06 |
| EP | 3248914 | 11/2017 | | |
| EP | 3689795 A1 * | 8/2020 | | ........... B65G 11/081 |
| EP | 4049949 A1 * | 8/2022 | | ............... B07C 5/36 |
| JP | 2004250224 | 9/2004 | | |
| KR | 20180066408 | 6/2018 | | |
| TW | M240029 | 8/2004 | | |
| WO | WO-2013091652 A1 * | 6/2013 | | ............... B07C 5/36 |
| WO | 2020068545 | 4/2020 | | |
| WO | WO-2022219066 A2 * | 10/2022 | | ................ B64F 1/36 |

\* cited by examiner

ROBOTICALLY-CONTROLLED STRUCTURE TO REGULATE ITEM FLOW

CROSS REFERENCE TO OTHER APPLICATIONS

This application claims priority to U.S. Provisional Patent Application No. 63/173,263 entitled ROBOTICALLY-CONTROLLED STRUCTURE TO REGULATE ITEM FLOW filed Apr. 9, 2021 which is incorporated herein by reference for all purposes.

BACKGROUND OF THE INVENTION

Robots have been used to perform tasks in manufacturing and other fields. For example, robots have been used to perform tasks in environments that may be unhealthy or otherwise dangerous to humans, tasks that require the application of force greater than a human may be able to apply, and tasks that require a high degree of precision and consistency over time.

Autonomous robots perform at least some tasks in an automated manner, without requiring human control or direction. For example, automated robots have been used to perform repetitive and/or otherwise predetermined tasks and sequences of tasks, typically in a controlled environment, such as a factory. More recently, self-driving cars, delivery drones, and other autonomous vehicles have been under development.

Teleoperation in the field of robotics refers to remote operation of a robot by an operator. For example, robots have been used to perform surgery, defuse bombs, and perform other tasks under the control of a skilled human operator.

Shipping and distribution centers, warehouses, shipping docks, air freight terminals, big box stores, and other activities that ship and receive items. In some cases, the shipping of items includes receiving a non-homogenous set of items, and sorting the items for shipping such as a sortation according to a destination. In other cases, the shipping of non-homogeneous sets of items use strategies such as packing and unpacking dissimilar items in boxes, crates, containers, conveyor belts, and on pallets, etc. Packing or sorting dissimilar items in boxes, crates, on pallets, etc. enables the resulting sets of items to be handled by heavy lifting equipment, such as forklifts, cranes, etc., and enables items to be packed more efficiently for storage (e.g., in a warehouse) and/or shipment (e.g., in truck, cargo hold, etc.). In further other cases, the shipping of items includes assembling inventory from a warehouse into a kit for shipping according to manifests or orders.

Use of robotics in connection with shipping and receiving is made more challenging in many environments due to the variety of items, variations the order, number, and mix of items to be packed, on a given pallet or kit for example, and a variety of types and location of container and/or feed mechanism from which items must be picked up to be placed on the pallet or other container.

BRIEF DESCRIPTION OF THE DRAWINGS

Various embodiments of the invention are disclosed in the following detailed description and the accompanying drawings.

DETAILED DESCRIPTION

Figure 1:
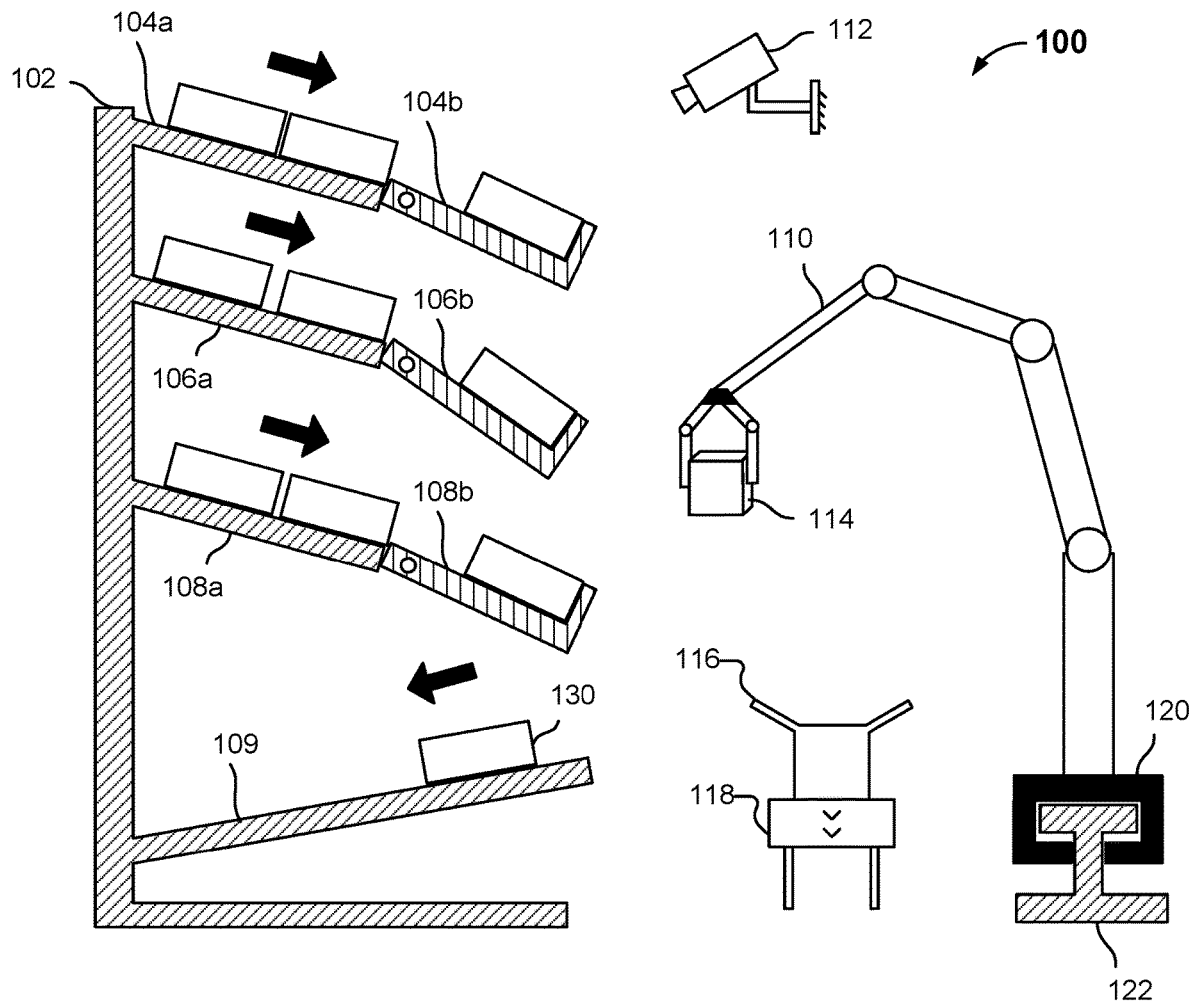
FIG. 1 is a diagram illustrating an embodiment of a robotic system to assemble a kit of items.
Figure 1:
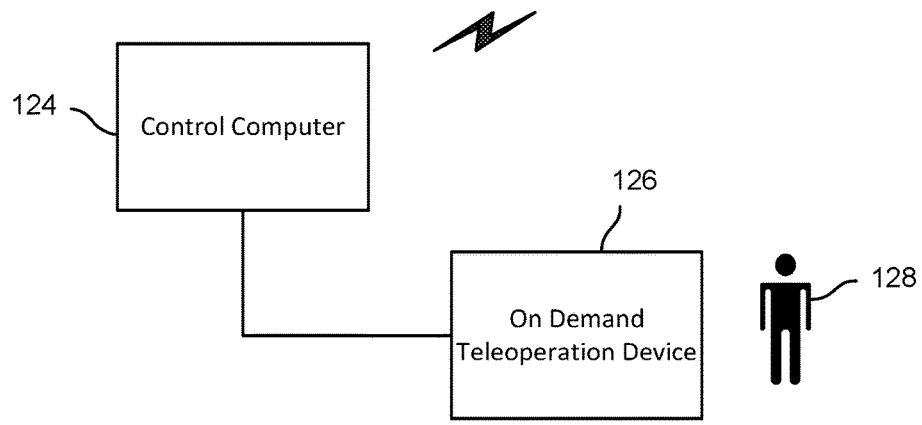

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment.

The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, "pallet" includes a platform, receptacle, or other container on, or in, which one or more items may be stacked or placed. Further, as used herein, the pallet may be used in connection with packaging and distributing a set of one or more items. As an example, the term pallet includes the typical flat transport structure that supports items and that is movable via a forklift, a pallet jack, a crane, etc. A pallet, as used herein, may be constructed of various metals including, wood, metals, metal alloys, polymers, etc.

As used herein, palletization of an item or a set of items includes picking an item from a source location, such as a conveyance structure, and placing the item on a pallet such as on a stack of items on the pallet.

As used herein, depalletization includes picking an item from a pallet, such as from a stack of items on the pallet, moving the item, and placing the item at a destination location such as a conveyance structure.

As used herein, singulation of an item includes picking an item from a source pile/flow and placing the item on a conveyance structure (e.g., a segmented conveyor or similar conveyance). Optionally, singulation may include sortation of the various items on the conveyance structure such as via singly placing the items from the source pile/flow into a slot or tray on the conveyor.

As used herein, kitting includes the picking of one or more items/objects from corresponding locations and placing the one or more items in a predetermined location in a manner that a set of the one or more items correspond to a kit.

"Kitting machines" or "kitting systems" and their integration into highly automated kitting operations are disclosed. In various embodiments, a kitting machine as disclosed herein comprises an at least partly robotically controlled unit that supplies and positions an item to facilitate the item being located, picked up, and/or positioned in and/or for packaging and/or shipment as part of a kitting operation. In various embodiments, a kitting machine as disclosed herein may comprise one or more kitting shelf machine modules, each comprising a modular component. A kitting shelf machine module as disclosed herein may comprise one or more shelves, bins, or other receptacles. In some embodiments, the shelves, bins, or other receptacles may be positioned via robotic control to position an item of pick up. A kitting shelf machine module+ as disclosed herein may be integrated with one or more other kitting shelf machine modules, one or more robotic arms, and/or other components to comprise an at least partly automated kitting system, capable of locating, selecting, and packing prescribed quantities of each of one or more arbitrary individual items, such as items included in an order, invoice, or similar data.

As used herein, a flow disrupter device refers to a structure that is configured to control or regulate the flow of an item at the chute. The flow disrupter may also be referred to herein as a disrupter device. The flow disrupter device may be controlled via a computer system (e.g., a robotic system). For example, the flow disrupter device may be controlled based on the computer system sending to a signal or instruction to the flow disrupter device. In some embodiments, the flow disrupter device comprises an actuator that controls movement or positioning of a flow disrupter.

Techniques are disclosed to programmatically use a robotic system comprising one or more robots (e.g., robotic arm with suction, gripper, and/or other end effector at operative end) to move items from a source location to a destination location, including singulating an item, kitting an item, palletizing an item, and/or to otherwise pack and/or unpack arbitrary sets of non-homogeneous items (e.g., dissimilar size, shape, weight, weight distribution, rigidity, fragility, type, packaging, etc.).

Various embodiments include a robotic arm picking and placing items from a source location to a destination location. The robotic arm may operate within a workspace to move items from the source location to the destination location. The various items may be transported through (e.g., to and/or from) a workspace via a chute such as a conveyance structure (e.g., a conveyor), etc. In some embodiments, the robotic system (e.g., via control computer or the like) controls the flow of items at the chute to facilitate the picking and placing of items by the robotic arm. For example, the robotic system may control to disrupt and/or improve a flow of items at (e.g., within or via) the chute. The control of the flow of items at the chute may be based on information obtained with respect to the workspace.

Flow of items at the chute may be relatively unpredictable. Various characteristics of the chute, an item, an interaction between the item and the chute (e.g., a friction coefficient, etc.), and an interaction between items as the items flow at the chute, etc. As an example, the flow of items at the chute may be unpredictable based at least in part on an item geometry, an item size, a chute geometry, a friction coefficient of the item, a friction coefficient of the chute, a mass of the item, a material compliance, etc. In some cases, the unpredictability of the flow at the chute may cause excessive flow of items, insufficient flow of items, a jamming of items in the chute, an inconsistent burden depth (e.g., an average depth of items flowing through the chute and/or on the conveyor).

Items may be provided to a workspace via the chute. Because the flow of items at the chute may be unpredictable, the characteristics of the set of items at the workspace may be unpredictable. For example, a number of items at the workspace may be unpredictable. As another example, a density of items at the workspace may be unpredictable. The efficiency with which a robotic arm moves items from/to the workspace may be sub-optimal based on a state of the workspace, such as whether the workspace is replenished with items at a sufficient rate (e.g., a rate that is the same or substantially the same as the rate at which the robotic arm moves items from the workspace). Various embodiments, control and/or regulate a flow of items at the chute in connection with improving the predictability of the workspace (e.g., a set of items in the workspace), the distribution of items in the workspace, the ease with which a robotic item may pick/place and item from/to the workspace, the efficiency of the robotic item in connection with moving items from/to the workspace, etc.

According to various embodiments, the flow of the item(s) at the chute may be controlled based at least in part on changing an orientation and/or geometry of a chute. For example, in response to determining that the flow of the items at the chute is to be changed/regulated, a slope of at least part of a chute may be controlled. The disrupter device may be a structure that changes the slope of at least part of the chute. In the case that the chute is downward sloping towards the workspace, then the flow of items at the chute may be increased by controlling to make the chute steeper. Conversely, the flow of items at the chute may be decreased by controlling to make the chute less steep.

In some embodiments, the robotic system obtains information associated with the workspace and uses such information in connection with determining whether and/or how to control the flow of items at the chute. The information associated with the workspace may include data associated with one or more items in the workspace, such as a plurality of items to be moved by the robotic arm from the source location to the destination location. The data associated with the one or more items in the workspace may include a density of items in the workspace, a number of items in the workspace, a measure of flow to/from or through the workspace, etc. Various other values pertaining the one or more items in the workspace may be obtained (e.g., values that may be used in connection with determining an ability of the robotic arm to pick/place items from/to the workspace, an ease with which the robotic arm may pick/place the items, etc.). The robotic system may obtain the information associated with the workspace based at least in part on data obtained by one or more sensors (e.g., an image system such as a 2D/3D camera, a laser sensor, an infrared sensor, a sensor array, a weight sensor, etc.).

In various embodiments, 3D cameras, force sensors, and other sensors and/or sensor arrays are used to detect and determine attributes of items to be picked and/or placed. Items the type of which is determined (e.g., with sufficient confidence, as indicated by a programmatically determined confidence score, for example) may be grasped and placed using strategies derived from an item type-specific model. Items that cannot be identified are picked and placed using strategies not specific to a given item type. For example, a model that uses size, shape, and weight information may be used. The sensors and/or sensor arrays may be disposed in or around a workspace of a robotic arm.

In some embodiments, the robotic system obtains the information associated with the workspace based on a model of the workspace (e.g., the workspace may be modeled based at least in part on the data obtained by the one or more sensors). For example, the robotic system generates a model of the workspace (e.g., a model including various items identified to be within the workspace, determining one or more characteristics of one or more items in the workspace, etc.). The robotic system may determine whether to control the flow of items at the chute based at least in part on the model of the workspace. In response to determining to control/regulate the flow of items at the chute, the robotic system may determine a strategy for controlling/regulating the flow of items, and/or implementing the strategy for controlling/regulating the flow of items.

According to various embodiments, the system includes a disrupter device with which the system controls to change a flow of items at the chute. The disrupter device may be configured to selectively impede flow of items at (e.g., through) the chute, and/or to selectively improve flow of items at the chute. The system may send a signal and/or an instruction to the disrupter device to cause the disrupter device to change a flow of the items at the chute. In response to receiving the signal and/or instruction, the disrupter device may move to control the flow of the items. The disrupter device may be controlled to change the geometry of the chute or the area through which an item may flow. For example, the disrupter device may be moved/positioned in a manner that changes the dimensions of the chute and/or the area through which an item may flow. The disrupter device may be configured to move about an axis that defines a width of the chute. The disrupter device may be of various sizes or shapes.

In some embodiments, the disrupter device comprises a flow disrupter. The flow disrupter include a flap, a bladder, etc. In the case that the flow disrupter corresponds to a flap, the flap may be oriented (e.g., rotated) to impede, regulate, and/or improve flow of items at the chute. As the orientation of the flap is changed, the flow of items at the chute may be controlled/regulated. In the case that the flow disrupter corresponds to a bladder, the bladder may be controlled in a manner that its size is changed (e.g., based on introduction of a fluid, etc. into an internal cavity defined in the bladder). As the size of the bladder is changed, the flow of items at the chute may be correspondingly changed. For example, in response to the bladder being "inflated", the bladder may at least partially restrict the flow of items at the chute, and in response to the bladder being "deflated," the bladder may move to permit items to flow more freely at the chute.

According to various embodiments, when the disrupter device is controlled to not regulate the flow of items or to otherwise be oriented to not impede the flow of items on the chute, the flow disrupter is substantially flush with a surface of the chute on which items move. In response to a determination to control/regulate a flow of items on the chute, the disrupter device may be actuated to move the flow disrupter in a manner that at least part of the flow disrupter is no longer flush with the surface of the chute on which items move. By causing the at least part of the flow disrupter to no longer be flush with the surface of the chute, the flow disrupter impedes the flow of items, and causes items to flow less freely through the chute. An extent to which the disrupter device is actuated may correspondingly change an extent to which the flow disrupter is oriented to impede the flow of items.

In some embodiments, the disruptor device comprises an actuation device (e.g., an actuator) with which the flow disrupter is controlled (e.g., actuated). Examples of actuation devices include a motor, a piston, a pump, and the like. As an example, in the case of the flow disrupter comprising a flap, the actuation device may include a motor and/or piston that is operatively connected to the flap. In response to a control signal (e.g., from the robotic system), the motor and/or piston may apply a force on the flap to cause the flap to move/rotate. Accordingly, the robotic system may control the movement/orientation of the flap via the actuation device, and may correspondingly control the flow of items at the chute. As another example, in the case of the flow disrupter comprising a bladder, the actuation device may include a pump that is operatively connected to the bladder such as in a manner to pump a fluid in/out of a cavity of the bladder. Examples of the fluid used in connection with inflating the bladder include air, water, etc.

According to various embodiments, the disrupter device corresponds to a detachable module that may be deployed on an existing chute. For example, an existing chute may convey items to a pickup zone of a workspace in a relatively unimpeded manner. The disrupter device may be deployed based on placing the disrupter device on the existing chute or otherwise affixing the disrupter device to the existing chute so that items are carried over the disrupter device or through a zone in which the disrupter device may control the flow of items such as via actuation of a flow disrupter comprised in the disrupter device. Deployment of the disrupter device may include connecting the disrupter device to a control computer, such as a control computer that controls operation of a robot, etc. such that the control computer may control the flow of items to the pickup zone within which the robot picks items.

FIG. 1 is a diagram illustrating an embodiment of a robotic system to assemble a kit of items.

A kitting system configured to perform kitting is disclosed. In some embodiments, the kitting system includes a kitting shelf system that is used in connection with kitting. The kitting shelf system may include one or more shelves on which one or more items are stored for use in a kitting process for assembling one or more kits. The kits may be assembled based at least in part on a corresponding order (e.g., based on a packing slip associated with the order). Various embodiments include one or more robotic systems. A robotic system may include one or more robotic arms that are respectively configured to autonomously operate to pick an item/object from a first location and place the item/object in a second location. A robotic arm included in a kitting system may be controlled to operate (e.g., autonomously) pick and place the item/object according to a plan to assemble a kit.

Each item or object within an item on the kitting shelf may have machine readable information, such as text and/or optically or otherwise encoded information, which can be machine read and used in connection with kitting the object and/or item, e.g., via an automated kitting system and/or processing. As an example, to read the information for a given item (or object within the item), one or more sensors may obtain information pertaining to the item while the item is within the kitting shelf system (e.g., on a shelf of the kitting shelf system such as on a presentation face of the shelf, etc.). As another example, to read the information for a given item (or object within the item), one or more sensors may obtain information pertaining to the item while the item is being moved (by the robotic arm) from the kitting shelf system to the corresponding receptacle (e.g., the information pertaining to the item is scanned during a path/trajectory of the item from the kitting shelf system to the receptacle).

In the example shown, kitting system 100 includes a kitting shelf system 102 and a robotic arm 110. According to various embodiments, kitting shelf system 102 includes one or more shelves. Each of the one or more shelves may comprise a presentation face (e.g., presentation face 104b, presentation face 106b, and/or presentation face 108b). The presentation face corresponds to an area or surface on which an item is disposed on the kitting shelf system. In connection with kitting of one or more items, robotic arm picks an item (or object from within an item) from at least one presentation face. Kitting shelf system 102 may include one or more feeder portions (e.g., feeder portion 104a, feeder portion 106a, and/or feeder portion 108a). In some embodiments, kitting shelf system 104 includes a gate that is configured to control conveyance of an item from a feeder portion to the corresponding presentation face. The gate structure may be coupled to, or integrated with, the presentation face. An item (e.g., a tray or other receptacle, etc.) may be provided to the kitting shelf system 102 via the feeder portion. For example, an item may be conveyed by the chute (or conveyor connected to the chute) to the feeder portion.

In some embodiments, robotic arm 110 is movable with respect to kitting shelf system 100 and/or with respect to a conveyor or other location at which a receptacle is disposed. In the example shown in FIG. 1, robotic arm 110 is mounted on carriage 120, which is configured to ride along a rail or other linear guide 122 disposed alongside and substantially parallel to the conveyor 118. As an example, the robotic arm 110 may be mounted on a side opposite the kitting shelf system 100. As an example, the robotic arm 110 may be mounted on a same side as the kitting shelf system 100. In some embodiments, one or more robotic arms are mounted on a same side of conveyor 118 as a kitting shelf system and one or more robotic arms are mounted on a side of conveyor 118 that is opposing to kitting shelf system. In various embodiments, a motor, belt, chain, or other source of motive force is applied via a controller (not shown in FIG. 1) to move the carriage 110 and attached robotic arm 110 along the rail or guide 122 to facilitate the automated retrieval of items from one or more kitting shelf systems, and the placement of items (e.g., object 114) in receptacle 118 (e.g., a box, a tray, etc.) as the receptacle 116 is moved along conveyor 118. Control of robotic arm may be coordinated based at least in part on one or more items to be picked and placed in receptacle 116, a location of receptacle 116 (e.g., a predetermined location at which the item is to be kitted), and/or a path of receptacle 116 (e.g., based on a determined movement of conveyor 118).

Referring further to FIG. 1, in the example shown kitting system 100 includes a camera 112 (e.g., a video camera) configured to capture images (e.g., video images) of the elements comprised in kiting system 100. Camera 112 may be one of a plurality of sensors that obtains information pertaining to the workspace (e.g., the workspace corresponding to kitting system 100). For example, camera 112 may be one of a plurality of sensors used by control computer 124 to control the elements comprising kitting system 100. For example, in the example shown, video generated by camera 112 and sent to control computer 124 may be used by control computer 124 to control the speed and/or direction of the conveyor belts comprised in system 100 and/or a gating mechanism in the kitting shelf system 102 to ensure a sufficient and not excessive number of items are available in the pickup zone (e.g., a presentation face of kitting shelf system 102) and/or to position or reposition the items for retrieval by robotic arm 110. As another example, video generated by camera 112 and sent to control computer 124 may be used by control computer 124 to control the disrupter device to regulate the flow of items to the workspace (e.g., the kitting shelf system 102). In addition, camera 112 and/or other cameras and/or other sensors may be used to facilitate robotic arm 110 picking up an item and/or placing the item in receptacle 116 (e.g., box). In various embodiments, a plurality of cameras may be deployed in a number of locations, including in the environment and on the respective elements comprising system 100, to facilitate automated (and, if needed, human assisted) kitting operations. In various embodiments, sensors other than cameras may be deployed, including without limitation contact or limit switches, pressure sensors, weight sensors, and the like.

In various embodiments, one or more sensors are disposed on a chassis of the robotic arm or a chassis of a robotic structure on which the robotic arm is disposed. System 100 may include one or more accelerometers operatively connected to or disposed within proximity of the one or more sensors (e.g., the one or more cameras). The control computer may obtain the image data pertaining to the workspace based at least in part on information obtained by the one or more accelerometers. In some embodiments, the one or more sensors may comprise a scanner that obtains data pertaining to a label or identifier on the object as the object is moved from the item to the predetermined structure.

In various embodiments, one or more sensors (e.g., camera 112) is used to capture information pertaining to items associated with kitting shelf system 102. For example, camera 112 may capture an image of one or more items on shelf 104, shelf 106, and/or shelf 108. As another example, if an item on a shelf 104, shelf 106, and/or shelf 108 is a tray or other receptacle, camera 112 may capture information pertaining to objects within the tray. Control computer 124 may use information pertaining to the workspace to determine a plan, and/or to control operation of robotic arm 110 to pick an item (or an object from within the item) from kitting shelf system 102. Control computer 124 may use the information pertaining to the workspace in connection with determining a location of an object within a tray on shelf 104, shelf 106, and/or shelf 108; a quantity of objects within the tray; a type of object within the tray; an orientation of one or more objects within the tray; a density of items within the tray, a quantity of items at the feeder portion, etc.

In various embodiments, control computer 124 is programmed to determine a plan to fulfill a kitting requirement based at least in part on a model of the robotic arm 110 and other elements comprised in kitting system 100, e.g., kitting shelf system 102; conveyor 118; a receptacle source module (e.g., a box assembly machine) (not shown); robotic arm 110; and/or carriage 120. The respective models in various embodiments reflect capabilities and limitations of each respective element. For example, the shelves 104, 106, and 108 of kitting shelf system 102 are in fixed positions in this example, but each has a conveyor belt which may be capable of being moved in forward and back directions and/or at different speeds. In addition, the control computer 124 may use information stored in connection with initialization and/or configuration, e.g., which items are on which location(s) on which kitting shelf system (or on which shelf of which kitting shelf system), where each kitting shelf system and/or its associated pick up zone (e.g., presentation face(s)) is located, etc., to determine a plan to fulfill a requirement. In addition, control computer 124 may use data determine based at least in part on sensor data, such as video captured by camera 112, to make a plan to fulfill a requirement.

According to various embodiments, kitting of items from one or more kitting shelf systems is improved through use of a dynamic kitting method or system that determines a path or trajectory for kitting of an item using one or more of an attribute of the item to be singulated and an attribute of another item within the workspace (e.g., an item and/or receptacle on the conveyor). The dynamic kitting method or system may include an updating of the path or trajectory for kitting of an item in response detecting one or more of an attribute of the item to be kitted and an attribute of another item within the workspace (e.g., an item on the conveyor). The dynamic kitting method or system may include an updating of the conveyance of an item from a feeder portion of a kitting shelf system to a presentation face of the kitting shelf system in connection with kitting of an item (or object from an item on the kitting shelf system) in response to determining an attribute of the workspace. The attribute of the workspace used in connection with updating the plan for kitting the item/object may include an attribute of an item/object to be kitted, a quantity of objects within an item (e.g., a tray on a kitting shelf system), a speed of the conveyor, a characteristic associated with a receptacle on the conveyor, an orientation of the item on the kitting shelf system, an orientation of a presentation face of the kitting shelf system, control of the disrupter device, determining a strategy for controlling/regulating flow at the chute, etc. In some embodiments, the kitting system 100 (e.g., control computer 124) dynamically updates the plan for kitting the item during kitting based on a context of the workspace (e.g., a state or condition of the item, a property of the item, another item within the workspace, a speed of conveyor 118, an identifier of receptacle 116, etc.).

In some embodiments, kitting system 100 includes control computer 124 and/or an operation teleoperation device 126. In the example shown, operation of kitting shelf system 102, conveyor 118; and robotic arm 110, and/or carriage 120 are operated in a coordinated manner under the control of control computer 124. In the example shown, control computer 124 is in communication (e.g., wireless communication) with controllers, not shown in FIG. 1, each configured to control operation of a corresponding element comprising kitting system 100, e.g., kitting shelf system 102; robotic arm 110, conveyor 118, carriage 120, and/or receptacle source (not shown). Although wireless connections are shown in FIG. 1, in various embodiments wired connections or a combination of wired and wireless connections may be used.

In some embodiments, the gate structure controls flow of items from the feeder portion to the presentation face. The gate structure may serve to isolate an item (e.g., a tray from which objects are picked) to facilitate easier removal of the tray upon a determination that the tray is empty. The isolation of the tray by the gate structure allows for the tray to be removed from the corresponding shelf (e.g., the presentation face) without the tray contacting other trays on the shelf (e.g., buffer trays such as the trays on the feeder portion behind the gate). Incidental contact between an empty tray (e.g., during removal of the tray) with buffer trays may cause the robotic arm to drop the empty try, or may cause one or more of the buffer trays to become misaligned or jammed.

According to various embodiments, the gate structure permits or prevents an item to flow from a feeder portion to the presentation face. The control of flow of items from the feeder portion to the presentation face may prevent items from being cluttered on the presentation face and can assist with providing sufficient space and order of items on the presentation face for a robotic arm to pick and place an item/object from the presentation face. Limiting the number of items on a presentation face (e.g., controlling the flow of items) may also improve the sensing or perception of items on the presentation face, and/or prevent an overflowing of items to the presentation face, which could cause an uncontrolled motion of items. The gate structure may be configured to prevent/inhibit more than a threshold of items to be disposed on a presentation face at any particular time. In some embodiments, the gate structure is toggled (e.g., moved) between an open position and a closed position. As an example, the open position may correspond to an orientation of the gate structure when no item is present on the presentation face. As another example, the open position may correspond to an orientation of the gate structure when a quantity of items on the presentation of items is less than a threshold number of items. As another example, the open position may correspond to an orientation of the gate structure when a weight on (or force applied to) to the presentation face is less than a threshold weight (or threshold force). When the gate structure is oriented in the open position, a flow or conveyance of an item from the feeder portion to the presentation face may be permitted (e.g., unblocked). Conversely, when the gate structure is oriented in the closed position, a flow or conveyance of an item from the feeder portion to the presentation face may be prevented (e.g., the flow of items is blocked). In the example illustrated in FIG. 1, a portion of the presentation faces 104*b*, 106*b*, and/or 108*b* is used to block conveyance of items from the corresponding feeder portions 104a, 106a, and/or 108a; the corresponding gate portions may be hinges operatively coupled to presentation faces 104b, 106b, and/or 108b. In some embodiments, the gate structure is configured to move an element that is distinct from the corresponding presentation face in connection with moving to an open position and/or closed portion.

In some embodiments, the gate structure is mechanically operated (e.g., to move between the open position and the closed position) based at least in part on a weight (e.g., a weight of an item, if any) applied to the corresponding presentation face. The gate structure may include a biasing element that biases the gate structure to be oriented in the open position. If a force applied to the presentation face (e.g., corresponding to the weight of the item on the presentation face) exceeds the biasing of the gate structure, the gate structure may operate to orient in the closed position. In some embodiments, the gate structure is electromechanically operated. For example, the gate structure may receive a signal and based at least in part on the signal the gate structure may operate in a closed position or an open position. The signal may be provided by a computer, such as control computer 124. The signal to control the gate structure may be determined/provided based at least in part on information obtained by one or more sensors in the workspace. For example, image data obtained by camera 112 of kitting system 100 may be used in connection with determining whether to gate structure is to be oriented in the open position or closed position (e.g., based at least in part on a determination of whether an item is disposed on the corresponding presentation face). Information obtained by one or more other sensors may be used in connection with determining whether to control the gate structure is to be oriented in the open position or closed position. Examples of sensors that may be implemented to obtain such information include a weight sensor, a force sensor, a torque sensor, a pressure sensor, an infrared sensor, etc. The information used in connection with determining whether to control the gate structure to be oriented in the open position or closed position may be used to determine whether an item is on the corresponding presentation face, to determine whether an item(s) on the presentation face exceed a threshold value (e.g., a threshold weight, a threshold force), etc. As an example, a model of information obtained by the one or more sensors may be generated. The model may determine/define information that is indicative of whether an item is present on the presentation face, or whether a quantity of items present on the presentation face is less than a threshold quantity of items, etc. The control computer 124 may use the model to determine whether to control the gate structure to be oriented in the open position or the closed position. For example, in response to determining that an item is present on the presentation face, the control computer 124 may send a signal to the gate structure to cause the gate structure to move to a closed position (e.g., thereby preventing conveyance of further items to the presentation face).

As illustrated in FIG. 1, a presentation face (e.g., presentation face 104b, presentation face 106b, and/or presentation face 108b) is movable. For example, the presentation face toggles between an empty position according to which the presentation face does not have an item, and an occupied position according to which the presentation has an item. Although the example illustrated in FIG. 1 illustrates the presentation face toggling between two positions/orientations, the kitting shelf system 102 may be configured for the presentation face to be moved to orient in one of a plurality of positions/orientations. For example, the presentation face may be oriented in any one of the plurality of positions/orientations based at least in part on a context of the workspace (e.g., an item to be provided on the presentation face, a location of a robotic arm to pick the item, a size of the robotic arm, a location of a sensor or camera, etc.).

In various embodiments, the empty position corresponds to a position at which the presentation face is oriented to facilitate a flow/conveyance of one or more items from the feeder portion to the presentation face. For example, the empty position may correspond to a position at which the presentation face is oriented when a quantity of items on the presentation face is less than a threshold number. As another example, the empty position corresponds to a position at which the presentation face is oriented when the presentation face is empty (e.g., does not have any items disposed thereon). As another example, the empty position corresponds to a position at which the presentation face is oriented when a weight on (or force applied to) the presentation is less than a threshold weight (or threshold force). In some embodiments, each presentation face in a particular kitting shelf system (e.g., kitting shelf system 102) may have a same angle of orientation (e.g., such as an angle relative to a normal to the ground) when orientated in corresponding empty positions. In some embodiments, two or more presentation faces in a particular kitting shelf system (e.g., kitting shelf system 102) have different angles of orientation (e.g., such as an angle relative to a normal to the ground) when orientated in corresponding empty positions. As an example, a first set of one or more presentation faces has an angle of orientation that is different from an angle of orientation of a second set of one or more presentation faces. As another example, each presentation face within a particular kitting shelf system has a different angle of orientation (e.g., such as an angle relative to a normal to the ground) when orientated in a corresponding empty position. The shelves (e.g., at least one of the corresponding feeder portion and the kitting portion) on a kitting shelf system can be configured at different angles based on a height of the shelf relative to the ground. The configuring of shelves at different angles may permit a better line of sight for sensors in the workspace, such as camera 112, and such a configuration may improve the information pertaining to the workspace (e.g., identifiers on the items may be obtained more easily or accurately, etc.).

In some embodiments, a bottom shelf on which items are presented (e.g., a shelf from which an item may be obtained such as the shelf corresponding to feeder portion 108a) has a corresponding presentation face 108b that has less of a range of motion than presentation faces of higher shelves such as presentation face 104b and 106b. The presentation face on such a bottom shelf may be fixed relative to the feeder portion. For example, the presentation face on such a bottom shelf may be integrated with the feeder portion or not otherwise change positions relative to the feeder portion. Such a bottom shelf or the presentation face of such bottom shelf (e.g., presentation face 108b) may have a shallower pitch/angle than one or more higher shelves or of the presentation faces for the one or more higher shelves (e.g., presentation face 104b and/or 106b). In some embodiments, shelves (e.g., presentation faces of such shelves such as when an item is on the presentation face) has a progressively shallower pitch or angle the lower the shelf is on the kitting shelf system such as kitting shelf system 100.

In various embodiments, the occupied position corresponds to a position at which the presentation face is oriented to facilitate picking of one or more items (e.g., by the robotic arm) from the presentation face. The presentation face may be oriented in the occupied position when conveyance/flow of one or more items from the feeder portion to the presentation face is to be prevented. In some embodiments, each presentation face in a particular kitting shelf system (e.g., kitting shelf system 102) may have a same angle of orientation (e.g., such as an angle relative to a normal to the ground) when orientated in corresponding empty positions. In some embodiments, two or more presentation faces in a particular kitting shelf system have different angles of orientation (e.g., such as an angle relative to a normal to the ground) when orientated in corresponding occupied positions. As an example, a first set of one or more presentation faces has an angle of orientation that is different from an angle of orientation of a second set of one or more presentation faces. As another example, each presentation face within a particular kitting shelf system has a different angle of orientation (e.g., such as an angle relative to a normal to the ground) when orientated in corresponding occupied positions. The shelves (e.g., at least one of the corresponding feeder portion and the kitting portion) on a kitting shelf system can be configured at different angles based on a height of the shelf relative to the ground. The configuring of shelves at different angles may permit a better line of sight for sensors in the workspace, such as camera 112, and such a configuration may improve the information pertaining to the workspace (e.g., identifiers on the items may be obtained more easily or accurately, etc.).

In some embodiments, the orientation of the presentation face may have a greater tilt downwards the lower the corresponding shelf is to the ground. Such an orientation of the presentation face may enhance one or more sensors (e.g., camera 112) to obtain information pertaining to the presentation shelf or one or more items/objects on the presentation face. In addition, such an orientation may enhance the ability of the robotic arm to engage an item with the end effector of the robotic arm. A robotic arm may have limitations with respect to its wrist extension capabilities/configurations and/or its wrist flexion capabilities/configurations. As an example, the orientation of the presentation face (e.g., at least in the occupied position) is configured based at least in part on an extent of wrist extension that is required by a robotic arm to pick the item/object from the presentation face). The shelf/presentation face may be configured based at least in part on the range of motion of a wrist of a robotic arm in the kitting shelf system (e.g., a range of motion with respect to wrist extension/flexion). An end effector or wrist component of the robotic arm may have size limitations that inhibit the ability of the robotic arm to engage (e.g., at certain angles and heights/locations) an item disposed on a presentation face. Accordingly, the orientation of the presentation face (e.g., at least in an occupied position) of a shelf may be configured to improve the likelihood/ability of the robotic arm to configure its position to engage an item/object on the presentation face with an end effector of the robotic arm at an orthogonal relative to the item/object. The orientation of the presentation face when in the occupied position can correspond to an orientation in which a tray/item disposed thereon is optimally angled (at each level/shelf) for a better vision from an onboard camera (e.g., a camera disposed in the workspace and/or on a robotic arm or chassis thereof). In some embodiments the orientation of the presentation face in the empty position and/or occupied position is based at least in part on a configuration of the corresponding gate structure. For example, if the gate structure is a hinge, the orientation of the presentation face in the empty position and/or occupied position is based at least in part on a range of motion of the hinge.

According to various embodiments, kitting shelf system 102 includes one or more feeder portions (e.g., 104a, 106a, and/or 108a). In some embodiments, the kitting shelf system 102 may have a single feeder portion that conveys one or more items to a plurality of presentation faces. In other embodiments, as illustrated in FIG. 1, the kitting shelf system 102 has a single feeder portion for each presentation face (e.g., a one-to-one mapping of feeder portions to presentation faces). The feeder portion may be configured to convey an item to a presentation face. As an example, the conveyance of the item may be passive such as via gravity acting on an item disposed on the feeder portion (e.g., in the case that the feeder portion is configured to tilt towards the presentation face). As another example, the conveyance of the item may be at least partially active based on the feeder portion being configured with a conveyor that carries an item from an input location of the feeder portion to the presentation face. In various embodiments, the feeder portion configured to receive a succession of items on a receiving end (e.g., an input to the feeder portion) and convey the items to a destination end (e.g., an end that is operatively connected/coupled to a presentation face or that otherwise exits the feeder portion to the applicable presentation face). The succession of items may be manually loaded to the feeder portion or kitting shelf system (e.g., via a human operator 128), or the succession of items may be automatically loaded to the feeder portion (e.g., via a robotic arm/component, or based at least in part on the feeder portion being coupled to a chute that conveys items from a source flow/pile).

In some embodiments, kitting shelf system 102 includes a return portion. The return portion may include a shelf that is directed to a return area (e.g., having a slope that conveys items such as empty trays/receptacles to away from the workspace). According to various embodiments, an item can returned to a predetermined location via the return portion. The item may be returned in response to a determination that the item is empty (e.g., all objects within item have been kitted to corresponding receptacles); in response to a determination that the item is defective; in response to a determination that the item was not in a correct location (e.g., the item was improperly conveyed to the presentation face such as based at least in part on a type of objects within the item, etc.); etc.

In some embodiments, the kitting shelf system 100 includes one or more shelves that are stationary (e.g., that do not include a gate structure and/or a presentation face that moves based on whether an item is located on the presentation face).

In various embodiments, a robotic system as disclosed herein includes and/or does one or more of the following, e.g., by operation of a control computer such as control computer 124:

Computer vision information is generated by merging data from multiple sensors, including one or more of 2D cameras, 3D (e.g., RGBD) cameras, infrared, and other sensors to generate a three-dimensional view of a workspace that includes one or more kitting shelf systems (which may correspondingly include one or more shelves of the kitting shelf system). The robotic system determines characteristics of items and/or debris or other abnormalities in the tree-dimensional view of the workspace.

The robotic system coordinates operation of multiple robots to avoid collisions, getting in each other's way, and contending to pick up the same item and/or place an item in the same destination location (e.g., receptacle on the conveyor) as another robot. The robotic system coordinates operation of a plurality of robots operating within a same workspace to perform kitting with respect to a plurality of items/object (e.g., to kit items in different receptacles or within a same receptacle). As an example, in various embodiments, the plurality of robots operate independently to pick and place items. As another example, the plurality of robots operate to independently pick and place items for different orders (e.g., to place different sets of items in different receptacles). If a risk of collision is detected, responsive action is taken to ensure the plurality of robots do not collide with one another during kitting.

The robotic system coordinates operation of multiple robots to ensure all items are placed in corresponding receptacles. For example, if robot A drops an item system tasks robot B to pick it up; item placed but with improper orientation is picked up and adjusted or moved to another location by same or another robot; two or more items for different orders are placed in a single receptacle results in a downstream robot picking one of the two or more items from the receptacle and placing the item in a new receptacle; etc.

The robotic system continuously updates motion planning for each robot and all of the robots together to achieve a desired collective throughput (e.g., to maximize collective throughput, to attain a predefined threshold of collective throughput, etc.). In response to determining that two or more robots have collided or will collide if moving according to their respective plans for kitting items, the robotic system implements an active measure to ensure that the two or more robots avoid collision or otherwise reset independent operation of the two or more robots.

In response to a determination that two robots independently are tasked to acquire the same item, the system picks one at random to get that item and the other moves on to the next item (e.g., identify, select, determine grasp strategy, pick, move according to plan, and place).

The robotic system can manage the independent operation of a plurality of robots to ensure that the robots select items at different times to avoid the same item being selected for kitting by two different robots.

Controller conveyor movement and/or speed as needed to achieve a desired robot productivity (throughput) and to permit sufficient time for the robot to place an object into the desired receptacle.

In response to a determination that an item is misplaced or dropped, the robotic system assigns a robot or, if needed, a human worker to pick the misplaced item up and place the item back in the applicable kitting shelf system (e.g., on a shelf such as via the feeder portion) or, if available or more optimal, on a receptacle on the conveyor.

Upstream robots controlled to intentionally leave some receptacles open for downstream robots to place items on the conveyor (e.g., in the corresponding receptacles).

Downstream robots controlled to correct errors from an upstream placing an item in a receptacle on the conveyor (e.g., to correct the placement of an item that rests in more than one receptacle such as a tray, or that rests on the conveyor rather than the applicable receptacle, to update a data structure with an association between an identifier for the item or kit/order with the receptacle in which the upstream robot placed the item, etc.).

Failure that cannot be corrected by same or another robot results in an alert being communicated to obtain human (or other robotic) intervention to resolve.

In response to a determination that a grip strength (e.g., a pressure attained by the end effector) is abnormal (e.g., less than is expected during normal operation), perform a diagnostic process that includes testing the grip strength on a predefined surface and in connection with determining whether remedial action is necessary with respect to the end effector.

Move/remove the debris within the workspace, or to reconfigure an item to be kitted (e.g., to improve the likelihood that the item is successfully picked from the shelf, or the presentation face of the shelf, and placed on the conveyor such as in a receptacle on the conveyor).

Use sensor data from the workspace environment state system to detect one or more characteristics (e.g., attributes) of the item selected for kitting, determine that grasping or releasing of the item is expected to improve in response to implementation of an active measure, and implement the active measure to improve the grasping or releasing of the item.

Use sensor data to determine that the robotic arm has grasped a plurality of items in connection with kitting of one of the items, determine a plan for releasing the plurality of items in order to place each item singly in a corresponding location in one or more receptacles on the conveyor or to place one of the items back on the shelf/presentation face of the kitting shelf system (e.g., determine a strategy for operating the end effector to release a first subset of the plurality of items at a different time from a second subset of the plurality of items).

Use sensor data to determine whether to control a flow of items to the workspace, and in response to determining to control the flow of items, controlling the disrupter device (e.g., to move/re-orient the flow disrupter). A strategy for controlling the flow of items at the chute may be determined, and the system may implement the strategy, including communicating a signal or instruction to the disrupter device.

Select a path for kitting an item to a receptacle on the conveyor based on an attribute of the item (e.g., a size of the selected item, a weight of the item, etc.) and/or one or more attributes (e.g., characteristics) of an item within a receptacle on the conveyor.

Determine a movement and speed of the robotic arm that picks an item from the kitting shelf system and places the item in the applicable receptacle based at least in part on a speed of a conveyor belt.

Determine a trajectory of the item to be kitted based at least in part on one or more of a characteristic of the item, a characteristic of the workspace environment, and/or a characteristic of the conveyor (e.g., a speed of the conveyor belt).

Determine a probability of successful kitting corresponding to one or more paths/trajectories of an item to be kitted, and select a path/trajectory along which the item is to be kitted based on the corresponding probability of success.

Determine a positioning of a robot arm and/or an end effector of the robot arm to obtain a successful grasp (e.g., as determined based on a probability of grasp success, a type of packaging of the item, a dimension of the item, an expected grip strength in relation to a threshold value, etc.). The positioning of the end effector can include controlling the robot arm or a wrist of the robot arm to move in order for the end effector be orthogonal to a surface of the item.

Update the ability of the robotic system to detect an empty receptacle. For example, the definition of an empty receptacle used by the robotic system to identify an empty receptacle is updated over time.

Figure 2A:
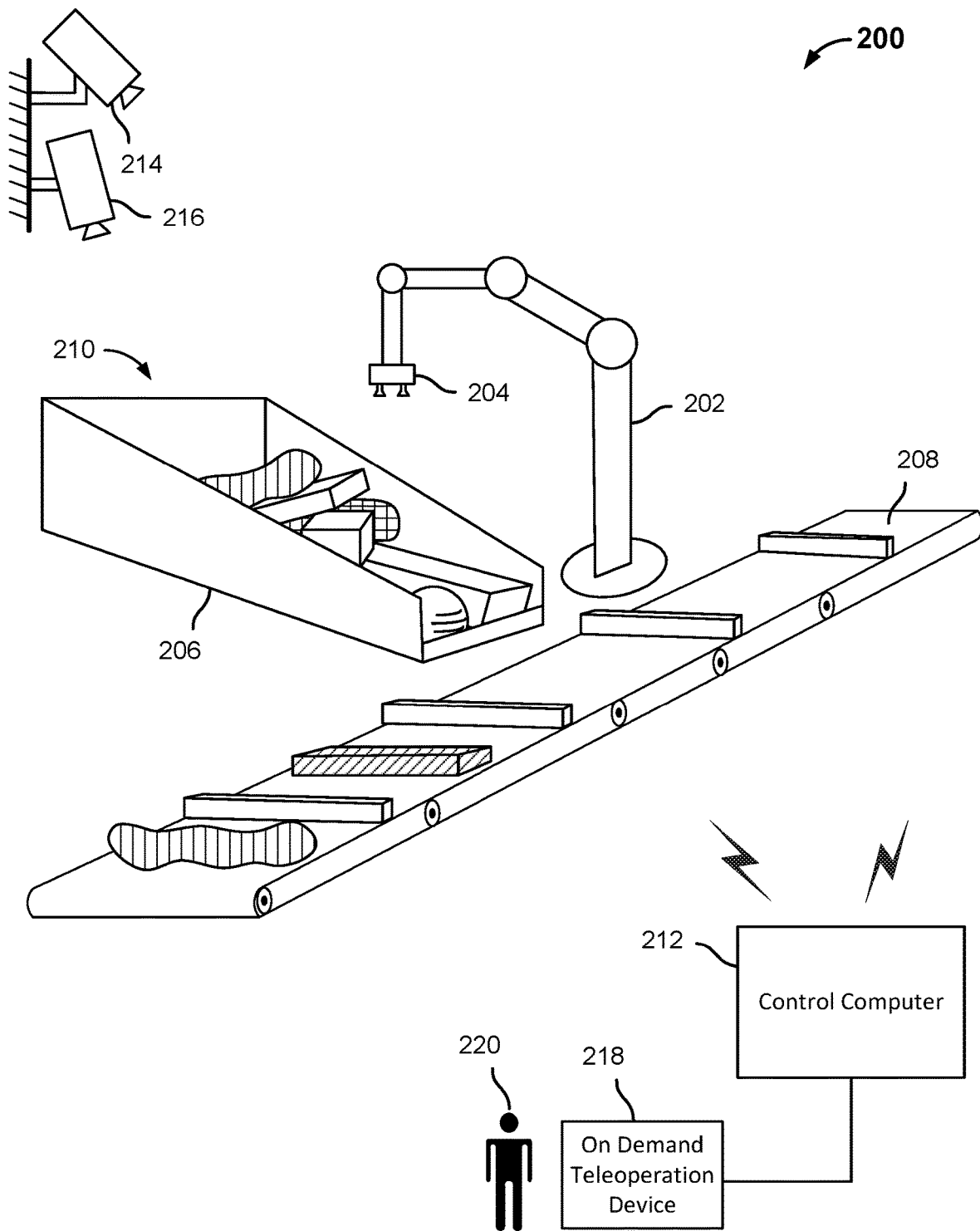
FIG. 2A is a diagram illustrating an embodiment of a robotic system to singulate an item.

FIG. 2A is a diagram illustrating an embodiment of a robotic system to singulate an item. In the example shown, system 200 includes a robotic arm 202 equipped with a suction-based end effector 204. While in the example shown the end effector 204 is a suction-based end effector, in various embodiments, one or more other types of end effectors may be used in a singulation system as disclosed herein, including without limitation a pinch-based end effector or other types of actuated grippers. In some embodiments, end effector 204 comprises one or more suction-based ends (e.g., one or more suction cups). In various embodiments, the end effector may be actuated by one or more of suction, air pressure, pneumatics, hydraulics, or other actuation. The robotic arm 202 and end effector 204 are configured to be used to retrieve parcels or other items that arrive via chute or bin 206 and place each item in a corresponding location on segmented conveyor 208. In this example, items are fed into chute 206 from an intake end 210. For example, one or more human and/or robotic workers may feed items into intake end 210 of chute 206, either directly or via a conveyor or other electro-mechanical structure configured to feed items into chute 206. Chute 206 may comprise or a conveyor that conveys items to the chute (e.g., via intake end 210) may comprise a disrupter device with which the flow of items may be controlled (e.g., by the control computer 212, etc.).

In the example shown, one or more of robotic arm 202, end effector 204, and conveyor 208 are operated in coordination by control computer 212. In various embodiments, a robotic singulation as disclosed herein may include one or more sensors from which an environment of the workspace is modeled. In the example shown in FIG. 2A, system 200 includes image sensors, including in this example 3D cameras 214 and 216. In various embodiments, other types of sensors may be used (individually or in combination) in a singulation system as disclosed herein, including a camera, an infrared sensor array, a laser array, a scale, a gyroscope, a current sensor, a voltage sensor, a power sensor, a force sensor, a pressure sensor, a weight sensor, and the like. In various embodiments, control computer 212 includes a workspace environment state system such as a vision system used to discern individual items, debris on the workspace, and each item's orientation based on sensor data such as image data provided by image sensors, including in this example 3D cameras 214 and 216. The workspace environment state system in some embodiments includes sensors in the robotic arm to detect a weight of an item (e.g., a grasped item) or to detect information from which an estimated weight is determined. For example, information pertaining to an amount of current, voltage, and/or power used by one or more motors driving movement of the robotic arm can be used to determine the weight (or an estimated weight) of the item. As another example, the chute includes a weight sensor, and the weight of the item is determined based on a difference of the weight on the chute as measured by the weight sensor before the item is picked up and after the item is picked up. As another example, information pertaining to an output from one or more sensor arrays can be used to determine a location of the item in the workspace, a location of the item while the item is grasped and/or being moved by the robotic arm, and/or a location of the robotic arm (e.g., based on a determination of an output from a subset of sensors of the one or more sensor arrays compared to another subset of sensors of the one or more sensor arrays). System 200 may use information obtained by the sensors (e.g., sensors within the workspace such as camera 214 and/or camera 216) to model the workspace, model the flow of items in the chute, determine properties of one or more items within the workspace/chute, determine a density of items within the chute/workspace, etc. In some embodiments, the information obtained by the sensors (e.g., sensors within the workspace such as camera 214 and/or camera 216) is used to control/regulate the flow of items to the workspace (e.g., to or within chute 216) such as to determine a manner by which a disrupter device is to be controlled.

The workspace environment state system produces output used by the robotic system to determine and implement a plan to autonomously operate a robotic structure to pick one or more items from the workspace and place each in a corresponding available defined location for machine identification and sorting, such as a partitioned section of segmented conveyor 208. In some embodiments, the workspace environment state system produces an output (e.g., sensor data or information otherwise characterizing the workspace and items within the workspace) used by the robotic system to detect a state or condition associated with one or more items in the workspace, and/or a state or condition associated with the robotic arm or other element of the workspace. According to various embodiments, in response to detecting (e.g., determining) the state or condition associated with one or more items in the workspace, the robotic system implements one or more active measures in connection with singulating an item. The active measure may include updating the plan to autonomously operate a robotic structure to pick one or more items from the workspace and place each item singly in a corresponding location in a singulation conveyance structure. In some embodiments, the active measure or the updating the plan can include operating the robotic structure to change or adapt to the detected state or condition (e.g., implement a change on how an item is singulated, implement to reconfigure items within the source pile/flow to make grasping a selected item easier, etc.).

In various embodiments, a robotic system as disclosed herein includes and/or does one or more of the following, e.g., by operation of a control computer such as control computer 212:

Computer vision information is generated by merging data from multiple sensors, including one or more of 2D cameras, 3D (e.g., RGBD) cameras, infrared, and other sensors to generate a three-dimensional view of a workspace that includes one or more sorting stations. The robotic system may determine characteristics of one or more items and/or debris or other abnormalities in the three-dimensional view of the workspace.

Robotic system coordinates operation of multiple robots to avoid collisions, getting in each other's way, and contending to pick up the same item and/or place an item in the same destination location (e.g., segmented part of the conveyor) as another robot. The robotic system may coordinate operation of a plurality of robots operating within the same workspace to singulate a plurality of items. For example, the robotic system may coordinate operation of the plurality of robots to enable the plurality of robots to operate independently to pick and place items. If a risk of collision is detected, responsive action is taken to ensure the plurality of robots do not collide with one another during singulation.

Robotic system coordinates operation of multiple robots to ensure all items are placed and only one per slot/location. For example, if robot A drops an item, the system tasks robot B to pick it up; item placed but with improper orientation is picked up and adjusted or moved to another location by the same or another robot; two or more items in a single destination slot result in the robot downstream station picking one of the two or more items off the conveyor and placing the item in a new location; etc.

Two or multiple robotic system coordinates to pick up objects that are too heavy or too large for one robotic system to handle.

The robotic system continuously updates motion planning for each robot and all of the robots together to achieve a desired collective throughput (e.g., to maximize collective throughput, to attain a predefined threshold of collective throughput, etc.). In response to determining that two or more robots have collided or will collide if moving according to their respective plans for singulation of items, the robotic system implements an active measure to ensure that the two or more robots avoid collision or otherwise reset independent operation of the two or more robots.

In the event two robots independently are tasked to acquire the same item, the system picks one at random to get that item and the other moves on to the next item (e.g., identify, select, determine grasp strategy, pick, move according to plan, and place).

The robotic system can manage the independent operation of a plurality of robots to ensure that the robots select items at different times to avoid the same item being selected for singulation by two different robots.

Control conveyor movement and/or speed as needed to avoid empty locations and achieve a desired robot productivity (throughput).

In response to a determination that an item is misplaced or dropped, the system assigns a robot or, if needed, a human worker to pick it up and place it back in the retrieving robot's own source pile or, if available or more optimal, on a next open slot on the conveyor.

Upstream robots are controlled to intentionally leave some slots open for downstream robots to place items on the conveyor.

Failure that cannot be corrected by the same or another robot results in an alert to obtain human (or other robotic) intervention to resolve.

In response to a determination that a grip strength (e.g., a pressure attained by the end effector) is abnormal (e.g., less than is expected during normal operation), perform a diagnostic process that includes testing the grip strength on a predefined surface and in connection with determining whether remedial action is necessary with respect to the end effector.

In response to a determination that debris is in the workspace and/or interfering with singulation of one or more items, perform an active measure to move/remove the debris, or to reconfigure an item to be singulated (e.g., to improve the likelihood that the item is successfully picked from the source pile/flow and placed on the conveyance structure).

In response to a detected state or condition, perform an active measure to move/remove the debris, or to reconfigure an item to be singulated (e.g., to improve the likelihood that the item is successfully picked from the source pile/flow and placed on the conveyance structure). For example, a chute conveyor is operated (e.g., under robotic control) to bring an item selected for singulation closer to a front of the chute for quicker and easier access by the robotic arm.

Use sensor data from workspace environment state system (e.g., from one or more sensors within the workspace) to model chute flow (or model the workspace environment), detect a deviation from an expected chute flow (or from an expected workspace environment), use the sensor data to detect a clog or abnormality within the chute flow or workspace environment, and to implement an active measure to clear the clog.

Use sensor data from the workspace environment state system to detect one or more characteristics of the item selected for singulation, determine that grasping or releasing of the item is expected to improve in response to implementation of an active measure, and implement the active measure to improve the grasping or releasing of the item.

Use sensor data to determine that the robotic arm has grasped a plurality of items in connection with singulation of one of the items, and determine a plan for releasing the plurality of items in order to place each item singly in a corresponding location in a singulation conveyance structure (e.g., selecting different locations in the singulation conveyance structure at which the corresponding items are to be placed, and/or determine a strategy for operating the end effector to release a first subset of the plurality of items at a different time from a second subset of the plurality of items).

Select a slot on the conveyance structure in which to place a selected item based on a size of the selected item and/or one or more characteristics of an item within a slot on the conveyance structure. For example, a slot is chosen to ensure that the selected item is not placed in a slot that is adjacent to a slot comprising a tall or large item.

Determine a movement and speed of the robotic arm that singulates an item based at least in part on a speed of a conveyor belt.

Use sensor data to determine whether to control a flow of items to the workspace, and in response to determining to control the flow of items, controlling the disrupter device (e.g., to move/re-orient the flow disrupter). A strategy for controlling the flow of items at the chute may be determined, and the system may implement the strategy, including communicating a signal or instruction to the disrupter device.

Determine a trajectory of the item to be singulated based at least in part on one or more of a characteristic of the item, a characteristic of the workspace environment, and/or a characteristic of the conveyance structure (e.g., a speed of the conveyor belt or the size of the item).

In various embodiments, an arbitrary mix of items to be singulated may include parcels, packages, and/or letters of a variety of shapes and sizes. Some items may be standard packages, one or more attributes of which may be known, others may be unknown. Sensor data such as image data is used, in various embodiments, to discern individual items (e.g., via image segmentation). The boundaries of partially occluded items may be estimated, e.g., by recognizing an item as a standard or known type and/or extending visible item boundaries to logical estimated extents (e.g., two edges extrapolated to meet at an occluded corner). In some embodiments, a degree of overlap (i.e., occlusion by other items) is estimated for each item, and the degree of overlap is taken into consideration in selecting a next item to attempt to grasp. For example, for each item a score may be computed to estimate the probability of grasp success, and in some embodiments the score is determined at least in part by the degree of overlap/occlusion by other items. Less occluded items may be more likely to be selected, for example, other considerations being equal.

The boundaries of the items may be used in connection with determining a density of the items within the workspace. Further, the boundaries of the items (or the density of the items within the workspace) may be used in connection with determining to control the flow of items to/within the workspace such as via controlling a disrupter device. In response to determining the boundaries of the items, the system may determine that an expected difficulty with which the robotic arm is expected to grasp an item from the workspace. The difficulty may correspond to a likelihood that the robotic arm successfully grasps/picks up an item from the workspace.

If a source pile/flow has an arbitrary mix of items to be singulated, the source pile/flow generally includes items that have different types of packaging, such as a cardboard box packaging, a paper envelope packaging, a polybag packaging (e.g., polyethylene bags), etc. The robotic system can determine the packaging of an item based on vision data obtained from the sensors, or based on a pressure attained between the end effector and the item when the robotic arm attempts to pick up the item. The sensor data can be used to discern a type of packaging corresponding to a particular item in the source pile/flow. In some embodiments, the robotic system determines a strategy for grasping the item based at least in part on the type of packaging corresponding to the item. For example, relatively heavier items packaged in a polybag will generally experience "tenting" between end effector suction cups. Tenting can cause sub-optimal suction from the end effector of the robotic arm, and thus the grasping of such an item is sub-optimal. According to various embodiments, in response to determining that the item is relatively heavy (e.g., that the weight exceeds a predefined threshold) and that the item is packaged in a poly-bag, or in response to determining that tenting is being caused while grasping the item, the robotic structure performs an active measure to change or adapt to the "tenting" or to the determination of the packaging of the item (e.g., a determination of a type of packaging, a material of the packaging, etc.). As an example, the robotic structure performs an active measure to partially lift the package and drag the package from the chute to the corresponding slot in the conveyance structure.

In various embodiments, multiple 3D and/or other cameras may be used to generate image data. A 3D view of the scene may be generated, and/or in some embodiments a combination of cameras is used to look at the scene from different angles and the camera that is least occluded, e.g., with respect to a workspace and/or one or more specific items in the workspace, is selected and used in connection with the grasping and moving of the one or more items. The image data can be used to detect debris on the chute or within the workspace, a clog in the chute flow of items through the workspace, a number of items grasped by the robotic structure during singulation of a selected item, a characteristic of one or more items occupying slots on the conveyance structure, etc.

According to various embodiments, the one or more cameras serve various purposes. The one or more cameras may provide a richer full 3D view into the scene (e.g., the workspace). In addition, or alternatively, the one or more cameras may operate in cohesion to minimize the errors due to package shininess when light reflecting off a package and into a camera may disrupt operation of such camera; in this case another camera disposed at a different location provides a backup. In some embodiments, the one or more cameras may be selectively triggered by a predictive vision algorithm that determines which camera has the best viewing angle and/or lowest error rate for picking a particular package. Accordingly, the robotic system may operate using information pertaining to an item that is obtained from the one or more cameras that are optimal (e.g., among the plurality of cameras within the workspace) for looking at the item. In some embodiments, one or more cameras are mounted on an actuated base, of which the system can change the position and orientation to provide a more optimal perception (e.g., view) of a package.

In some embodiments, the robotic system may select a field of view of one or more cameras. The field of view of each camera may be selected (e.g., determined) to increase the object segmentation quality by intentionally filtering out parts of the field of view as well as increasing the segmentation speed by reducing computation on a larger field of view.

Another purpose served by cameras, in various embodiments, is to detect any sort of unforeseen error in robot operation or any disruption to the environment. Cameras placed on the robot and on the environment have different error and accuracy profiles. The cameras on the robot can be more accurate since they are rigidly fixed to the robot but slower to use since using them requires the robot to slow down or stall. Cameras in the environment have a stable view and are effectively faster since the robot can multi-task and do something else while a camera is taking a photo. But if the camera stand is moved or shaken, the cameras may become out of sync with the robot and cause errors. In various embodiments, images from robot and non-robot cameras are combined (e.g., occasionally or on a package miss), to detect if the robot is in sync with non-robot cameras. If the cameras are determined to be out of sync, the robot takes corrective action, such as performing a calibration or synchronization process, alerting a human operator, etc. In some embodiments, a camera may not be mounted rigidly on a robotic arm, and in some such embodiments gyros and/or accelerometers on the cameras may be used to filter or compensate for the motion of the mounting base.

According to various embodiments, system 200 may include one or more sensors other than or in addition to a plurality of cameras, such as one or more of an infrared sensor array, a laser array, a scale, a gyroscope, a current sensor, a voltage sensor, a power sensor, and the like. Referring to FIG. 2A, in various embodiments, robotic arm 202 is driven by one or more motors, e.g., one or more motors at each movable joint or mount location. In some embodiments, the work required to drive robotic arm 202 (e.g., to move the robotic arm as the robotic arm attempts to singulate an item) is indicative of one or more characteristics of the item to be singulated. For example, in some embodiments, a weight of the item may be computed (or estimated) based on the work required to drive the robotic arm 202 while the item is in its grasp. In various embodiments, the work required to drive the robotic arm 202 is measured using a current sensor, a voltage sensor, a power sensor, and/or the like, or some combination thereof. In response to determining the weight of the item during singulation, the robotic system may perform an active measure to adapt to the weight of the item. In some embodiments, in response to determining that the weight of the item is greater than a predefined threshold, robotic system 200 adjusts the plan to singulate the item via partially picking up the item and dragging the item to the corresponding location on the conveyance structure (e.g., in contrast to wholly picking up the item and moving the arm to place the item on the conveyance structure). In some embodiments, in response to determining the weight of the item, the robotic structure adjusts the speed at which the robotic arm (and the item) is moved. For example, the larger the weight of the item, the greater the shear forces are between the item and end effector 204 as the robotic arm 202 is moved. Further, the shear forces can increase as the speed at which the robotic arm is operated increases (e.g., the speed at which the robotic arm moves the item). Accordingly, robotic system 200 can control the speed of the robotic arm 202 based at least in part on the weight of the item to ensure that the item remains firmly grasped by the robotic arm. Although the description hereof describes the weight being measured based on using a current sensor, a voltage sensor, a power sensor, and/or the like, the weight can also be measured using a force sensor configured in the robotic arm 202 or the end effector 204.

Referring further to FIG. 2A, in the example shown, system 200 further includes an on demand teleoperation device 218 usable by a human worker 220 to operate one or more of robotic arm 202, end effector 204, and conveyor 208 by teleoperation. In some embodiments, control computer 212 is configured to attempt to grasp and place items in a fully automated mode. However, if after attempting to operate in a fully automated mode control computer 212 determines it has no (further) strategies available to grasp one or more items, in various embodiments, control computer 212 sends an alert to obtain assistance from a human operator via teleoperation, e.g., by human operator 220 using teleoperation device 218. For example, in some embodiments, in response to detecting a state or condition affecting item flow through chute 206, control computer 212 may attempt to perform one or more actions to facilitate singulation. If fully automated attempts to respond to the detected state or condition are determined not to have resolved the state or condition, control computer may prompt human operator 220 to address the state or condition, e.g., via teleoperation using on-demand teleoperation device 218. In various embodiments, control computer 212 may display a user interface or other interface that identifies the state or condition and/or presents human selectable options to control the robotic arm 202, end effector 204, and/or other elements and instrumentalities as disclosed herein (e.g., blowers, shakers, chute conveyors, etc.) to alter the state or condition.

In various embodiments, control computer 212 uses image data from cameras such as cameras 214 and 216 to provide a visual display of the scene to human worker 220 to facilitate teleoperation. For example, control computer 212 may display a view of the pile of items in chute 206. In some embodiments, segmentation processing is performed by control computer 212 on image data generated by cameras 214 and 216 to discern item/object boundaries. Masking techniques may be used to highlight individual items, e.g., using different colors. The operator 220 may use the visual display of the scene to identify the item(s) to be grasped and use teleoperation device 218 to control the robotic arm 202 and end effector 204 to pick the item(s) from chute 206 and place each in a corresponding location on conveyor 208. In various embodiments, once the item(s) for which human intervention was prompted have been placed on the conveyor, the system 200 resumes fully automated operation. In various embodiments, in the event of human intervention, the robotic system observes the human worker (e.g., manual task completion, task completion using a robotic arm and end effector via teleoperation) and attempts to learn a strategy to (better) complete the task in an autonomous mode in the future. For example, the system may learn a strategy to grasp an item, e.g., by observing the places on the item at which a human worker grasps the item and/or by remembering how the human worker used the robotic arm and end effector to grasp the item via teleoperation.

In some embodiments, system 200 invokes assistance from human operator 220 in response to determining that an abnormality in the operation of system 200 exists. An example of an abnormality is a lack of a threshold pressure being attained between end effector 204 and the item during singulation of the item. In response to detecting that the pressure attained between end effector 204 and the item is less than a threshold pressure value, robot system 200 can perform a diagnostics process in connection with assessing whether robot system 200 is performing normally. For example, system 200 can perform a diagnostics of the ability of end effector 204 to engage an item and attain a predetermined threshold pressure value. In response to determining that system 200 is not performing normally (e.g., that the end effector 204 is not able to engage an item and attain a predetermined threshold pressure value), system 200 invokes assistance from human operator 220. In some embodiments, control computer 212 sends an alert to human operator 220. The alert can indicate the basis of the problem (e.g., an indication that the end effector is unable to engage the item and attain a predetermined threshold pressure value). For example, the alert can provide a recommended or requested remedial action to human operator 220.

Figure 2B:
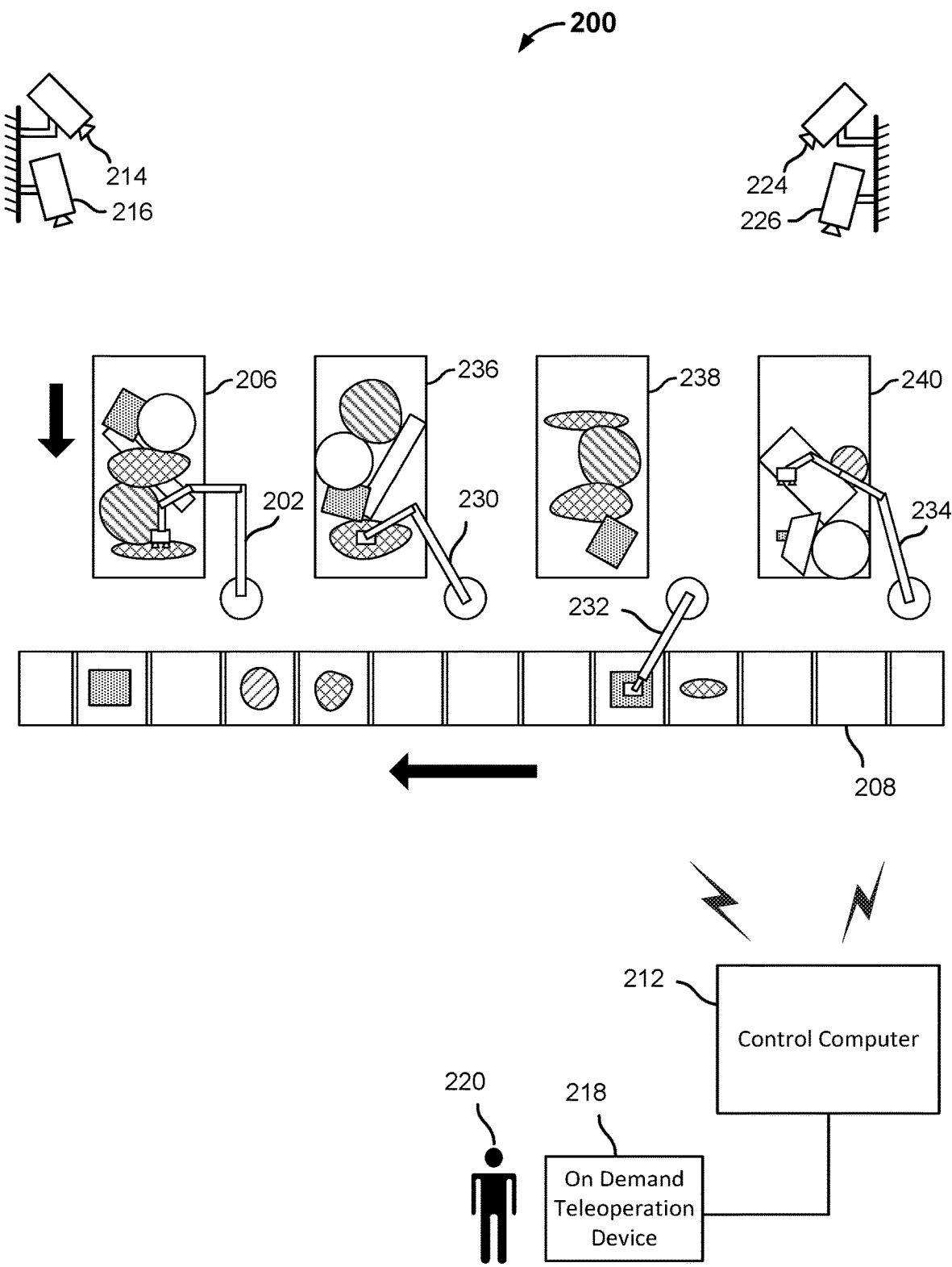
FIG. 2B is a diagram illustrating an embodiment of a robotic system to singulate an item.

FIG. 2B is a diagram illustrating an embodiment of a robotic system to singulate an item. In various embodiments, control computer 212 coordinates operation of the four robotic arms 202, 230, 232, and 234 and associated end effectors, along with conveyor 208, to pick/place items from the chutes 206, 236, 238, and 240 to conveyor 208 in a manner that achieves a desired collective throughput of the system (e.g., a collective throughput that satisfies a throughput threshold, etc.).

While in the example shown in FIG. 2B each station has one robotic arm, in various embodiments two or more robots may be deployed at a station, operated under control of an associated control computer, such as control computer 212 in the example shown in FIG. 2B, in a manner that avoids the robots interfering with each other's operation and movement and which maximizes their collective throughput, including by avoiding and/or managing contention to pick and place the same item. In some embodiments, a plurality of robotic arms operating at the same workspace work independently to singulate the plurality of items. One or more of the plurality of robotic arms can perform an active measure to avoid a collision between two robotic arms in response to detecting a collision or a potential for a collision between the two robotic arms. For example, control computer 212 can coordinate operation of the plurality of robots to enable the plurality of robots to operate independently while ensuring that the plurality of robots and/or the items grasped by the plurality of robots do not collide with one another during singulation. In some embodiments, control computer 212 implements/enforces "force fields" between two or more robots in order to prevent collisions between the two or more robots. As an example, the robots (or control computer 212) access information from which their respective positions and the positions of one or more other robots are determined, and the robots are controlled to avoid an intersection between their respective positions and the positions of the one or more other robots at a certain time. In some embodiments, a first robot reserves an airspace (e.g., a certain position) that is to be used by the first robot during singulation of an item. In connection with a second robot scheduling singulation of an item, the second robot determines the plan to singulate the item based at least in part on the airspace reserved by the first robot. For example, in connection with scheduling singulation of the item, the second robot determines that the plan cannot include movement through the airspace reserved by the first robot and the second robot determines a plan that does not require the second robot or the item to move through the airspace reserved by the first robot during the time at which the airspace is so reserved.

In various embodiments, a scheduler coordinates operation of a plurality of robots, e.g., one or more robots working at each of a plurality of stations, to achieve desired throughput without conflict between robots, such as one robot placing an item in a location the scheduler has assigned to another robot.

In some embodiments, each of at least a subset of a plurality of robots working at a workspace picks an item independent from the other robots of the plurality of robots and a corresponding plan for singulation of the item is determined. The at least the subset of the plurality of robots can pick in a predefined order such that no two robots select or pick an item at the same time. Each of the at least the subset of the plurality of robots can select or pick an item based on items that are currently available at the time of such selection. Accordingly, a second robot of the at least two subsets of the plurality of robots that picks after a first robot will select an item to singulate that is different from the item selected or picked by the first robot.

In various embodiments, a robotic system as disclosed herein coordinates operation of multiple robots to one by one pick items from a source bin or chute and place the items on an assigned location on a conveyor or other device to move items to the next stage of machine identification and/or sorting.

In some embodiments, multiple robots may pick from the same chute or other source receptacle. In the example shown in FIG. 2B, for example, robotic arm 202 may be configured to pick from either chute 206 or chute 236. Likewise, robotic arm 230 may pick from chute 236 or chute 238 and robotic arm 232 may pick from chute 238 or chute 240. In some embodiments, two or more robotic arms configured to pick from the same chute may have different end effectors. A robotic singulation system as disclosed herein may select the robotic arm most suitable to pick and singulate a given item. For example, the system determines which robotic arms can reach the item and selects one with the most appropriate end effector and/or other attributes to successfully grasp the item.

While stationary robotic arms are shown in FIG. 2B, in various embodiments one or more robots may be mounted on a mobile conveyance, such as a robotic arm mounted on a chassis configured to be moved along a rail, track, or other guide, or a robotic arm mounted on a mobile cart or chassis. In some embodiments, a robotic instrumentality actuator other than a robotic arm may be used. For example, an end effector may be mounted on and configured to be moved along a rail, and the rail may be configured to be moved in one or more axes perpendicular to the rail to enable the end effector to be moved to pick, translate, and place an item as disclosed herein.

According to various embodiments, system 200 manages a distributed data structure pertaining to the operation of a plurality of robots in system 200 and/or a state of the conveyance structure. For example, the distributed data structure may include one or more fields associated with each slot in the conveyance structure. According to various embodiments, the distributed data structure operates at a speed far in excess of the speed at which robots in system 200 operate. For example, the distributed data structure operates (e.g., is updated) on the order of 1 µs or 1 ms, and time at which the robots physically operate/move is on the order of 100 ms. Because the speed at which the robots operate is slower than the speed at which the distributed data structure operates, the distributed data structure is updated to reflect changes in the state of the workspace (e.g., the state of the conveyance structure) relatively quickly and the distributed data structure is likely to have been updated with the latest state by the time the robotic obtains and/or uses information from the distributed data structure in connection with determining a plan/strategy for singulating an item (e.g., selecting/claiming a slot in the conveyor). In some implementations, the relative speed of the distributed data structure reduces the likelihood that two robots would claim a slot on the conveyor at the same time and cause a fault in the distributed data structure. Accordingly, the distributed data structure can be updated based on operation of a robot or a plan for singulation associated with a robot. In various embodiments, each (mostly) independently operated singulation robot comprising a system associated with an output conveyor updates the distributed data structure with information pertaining to a plan or with information pertaining to one or more characteristics associated with the workspace (e.g., whether a slot in the conveyor is occupied or claimed for use by a robot in the system as a planned destination to place an item on the conveyor). In some embodiments, if the robot receives an error in connection with an attempt to write information to the distributed data structure, e.g., to claim a slot on the conveyor for its use, the robot waits a predetermined interval and re-attempt to write such information to the distributed data structure. If the data cannot be written because another robot has already written data to that location, e.g., already claimed an associated slot on the output conveyor, the robot chooses another slot determined to be available by reading another location in the data structure. According to various embodiments, in response to the data structure being updated by one robot, the data structure is automatically updated with respect to one or more other robots within system 200. For example, in response to determining that an update (e.g., a write or delete operation) is performed, the update is distributed to the other robots within system 200. The distributed data structure may be a shared structure that all robots read, or a robot (e.g., each robot) may store a local copy and disseminate updates across the system to other robots. For example, the robotics may synchronize modifications to the data structure (e.g., updates such as plans or reserved slots on the conveyor) to other robots within the system.

According to various embodiments, the distributed data structure comprises a field associated with a slot in the conveyance structure that is used to indicate whether the slot is occupied or reserved for an item in connection with singulation of the item by the robot. For example, a value in the field associated with a slot is indicative of whether the slot can be reserved or used by another robot for scheduling an item. In some embodiments, when a robot is determining (or updating) a plan to singulate an item, a slot on the conveyance structure is reserved. The slot in the conveyance structure is reserved based at least in part on the distributed data structure pertaining to the state of the conveyance structure. For example, a slot associated with a field indicating that the slot is empty or unreserved can be reserved for singulation of an item. Occasionally, a robot arm can erroneously release an item in a slot different from a slot that corresponded to the singulation plan, or in a manner that the item straddles two slots (e.g., adjacent slots). The corresponding robot (or a downstream robot) can detect that a slot has an item therein in contradiction to the corresponding field in the distributed data structure (e.g., such field indicating that the slot is empty or not reserved). In response to detecting that the slot has an item therein in contradiction to the corresponding field in the distributed data structure, the robot system updates the data structure to indicate that the slot is occupied or reserved.

According to various embodiments, the distributed data structure includes information pertaining to a timestamp, a speed of the conveyor, and one or more characteristics of a slot in the conveyor (e.g., an indication of whether the slot is occupied or reserved). The robot system can determine a plan for singulating an item from a source pile/flow to a slot in the conveyor based at least in part on the distributed data structure. For example, system 200 determines, based on the timestamp and the speed of the conveyor, a set of slots in which an item picked from the source pile/flow can be placed. System 200 can select a slot, from among the set of slots, that is empty or not reserved as a slot in which the item is to be singulated. The timestamp and the speed of the conveyor are used because system 200 can determine one or more slots with which the item being singulated can be caused to intersect based on operating the corresponding robot.

Figure 3A:
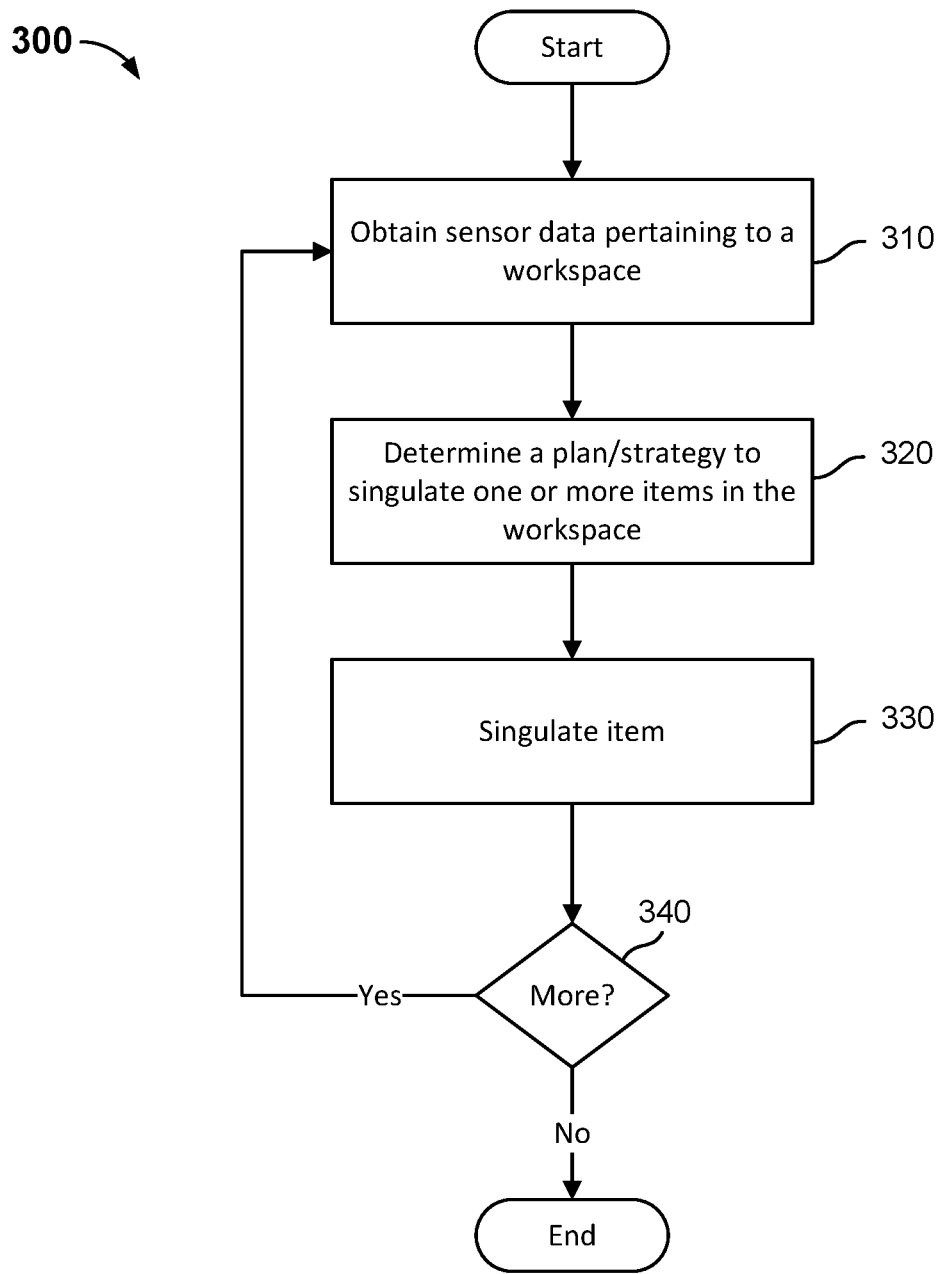
FIG. 3A is a flow chart illustrating an embodiment of a process to singulate an item.

FIG. 3A is a flow chart illustrating an embodiment of a process to singulate an item. In some embodiments, process 300 is implemented by a robot system operating to singulate one or more items within a workspace, such as system 200 of FIG. 2A and FIG. 2B. The robot system includes one or more processors (e.g., in control computer 212 in the examples shown in FIGS. 2A and 2B) which operate, including by performing the process 300, to cause a robotic structure (e.g., a robotic arm) to pick and place items for sorting.

At 310, sensor data pertaining to the workspace is obtained. In some embodiments, a robotic system obtains the sensor data pertaining to the workspace from one or more sensors operating within the system. As an example, the sensor data is obtained based at least in part on outputs from image sensors (e.g., 2D or 3D cameras), an infrared sensor array, a laser array, a scale, a gyroscope, a current sensor, a voltage sensor, a power sensor, a force sensor, a pressure sensor, and the like.

According to various embodiments, the obtained sensor data pertaining to the workspace comprises information from which a model of the workspace may be generated. For example, one or more characteristics associated with the workspace is determined based at least in part on the sensor data. The sensor data can be used in connection with determining at least one characteristic of one or more items within the workspace such as items in the source pile/flow of the chute, or an item grasped by the robotic arm. In some embodiments, the sensor data is used in connection with determining one or more characteristics of the conveyor such as determining the slots on the conveyor that are empty or unreserved, determining a speed of the conveyor, and/or determining the characteristics of at least one slot or of at least one item already on the conveyor.

At 320, a plan or strategy to singulate one or more items in the workspace is determined. In some embodiments, a robotic system determines the plan or strategy to pick at least one item from a source pile/flow in the workspace and to singly place the at least one item in a slot on the conveyor. The plan or strategy to singulate the one or more items is determined in various embodiments on a robot by robot basis such that if the robotic system includes a plurality of robots, each robot operates independent of the other robot(s).

According to various embodiments, the plan or strategy to singulate the one or more items in the workspace is determined based at least in part on the sensor data. For example, the plan or strategy to singulate the one or more items includes selecting an item within the source pile/flow that is to be singulated. The selected item can be identified from among other items or objects within the workspace based at least in part on the sensor data (e.g., the boundaries of the item and other items or objects within the workspace can be determined). As an example, one or more characteristics pertaining to the selected item is determined based at least in part on the sensor data. The one or more characteristics pertaining to the selected item can include a dimension of the item, a packaging of the item, one or more identifiers or labels on the item (e.g., an indicator that the item is fragile, a shipping label on the item, etc.), an estimated weight of the item, and the like, or any combination thereof. As another example, the plan to singulate the one or more items includes determining a location on the conveyance structure (e.g., a slot on the conveyor) at which the robotic structure (e.g., the robotic arm) is to singly place the item. The location on the conveyor at which the item is to be placed can be determined based at least in part on a timestamp, a speed of the conveyor, and one or more characteristics of a slot in the conveyor (e.g., an indication of whether the slot is occupied or reserved), and the like, or any combination thereof. As another example, the plan or strategy to singulate the one or more items includes determining a path or trajectory of the item along which the robotic arm is to move the item during singulation. The path or trajectory of the item along which the item is to be moved can be determined based at least in part on a location of one or more other objects within the workspace such as a frame of the chute, other items in the source pile/flow, items on the conveyor, other robots operating within the workspace, a reserved airspace for operation of other robots, sensors within the workspace, etc. For example, the path or trajectory of the item is determined to move a part of the item comprising an identifier (e.g., a shipping label) to an area at which a scanner is able to scan the identifier, or the path or trajectory of the item is determined to maximize a likelihood that the identifier on the item is read by one or more scanners along the path or trajectory.

According to various embodiments, the plan or strategy to singulate the one or more items is determined based at least in part on a cost associated with moving the one or more items. The system may determine the plan or strategy for moving an item based at least in part a cost of moving the item such as by determining a plan or strategy that minimizes a cost of moving the item. To minimize the cost of moving the item may include optimizing the cost subject to one or more predetermined conditions or constraints. In some embodiments, the system determines the plan or strategy for moving the item in a manner that moving the item according to the plan or strategy is expected to cost less than a cost value threshold. The costs associated with moving the item may be based at least in part on an attribute associated with the item (e.g., a size of the item), a location in the workspace from which the item is to be picked (e.g., a location on the chute), a destination location on the conveyor at which the item is to be placed, etc. In some embodiments, the presence of one or more other items or objects in the workspace (e.g., an item already on the conveyor) may impact a cost of moving an item according to a path/trajectory, etc.

In some embodiments, the plan or strategy to singulate the one or more items in the workspace comprises determining whether to control/regulate the flow of items at the chute or otherwise in being provided to the workspace. The plan or strategy may further comprise a determination of a manner by which the flow of items is to be controlled. For example, the system may determine to control to improve the flow of items (e.g., to increase the rate of items being provided to the workspace, to increase the number of items provided to the workspace, etc.). As another example, the system may determine to control to decrease or impede the flow of items (e.g., to decrease the rate of items being provided to the workspace, to decrease the number of items provided to the workspace, etc.). The system may determine whether to control/regulate the flow of items based at least in part on the sensors data such as information pertaining to items in the workspace (e.g., a quantity of items, a density of items, an indication of whether a threshold number of items are occulated, a likelihood that a threshold number of items can/cannot be grasped, etc.).

At 330, the item is singulated. In some embodiments, the item is singulated in response to the plan or strategy for singulating the item being determined. For example, a robotic arm is operated to pick one or more items from the workspace and place each item singly in a corresponding location in a singulation conveyor. The singulation of the item comprises picking the item from the workspace (e.g., from the source pile/flow) and singly placing the item on the conveyor. The robot system singulates the item based at least in part on the plan or strategy for singulating the item.

At 340, a determination is made as to whether further items are to be singulated. If there are more items, a further iteration of steps 310, 320, 330, and 340 is performed, and successive iterations are performed until it is determined at 340 that there are no more items in the chute (or other receptacle or source) to be picked and placed.

Figure 3B:
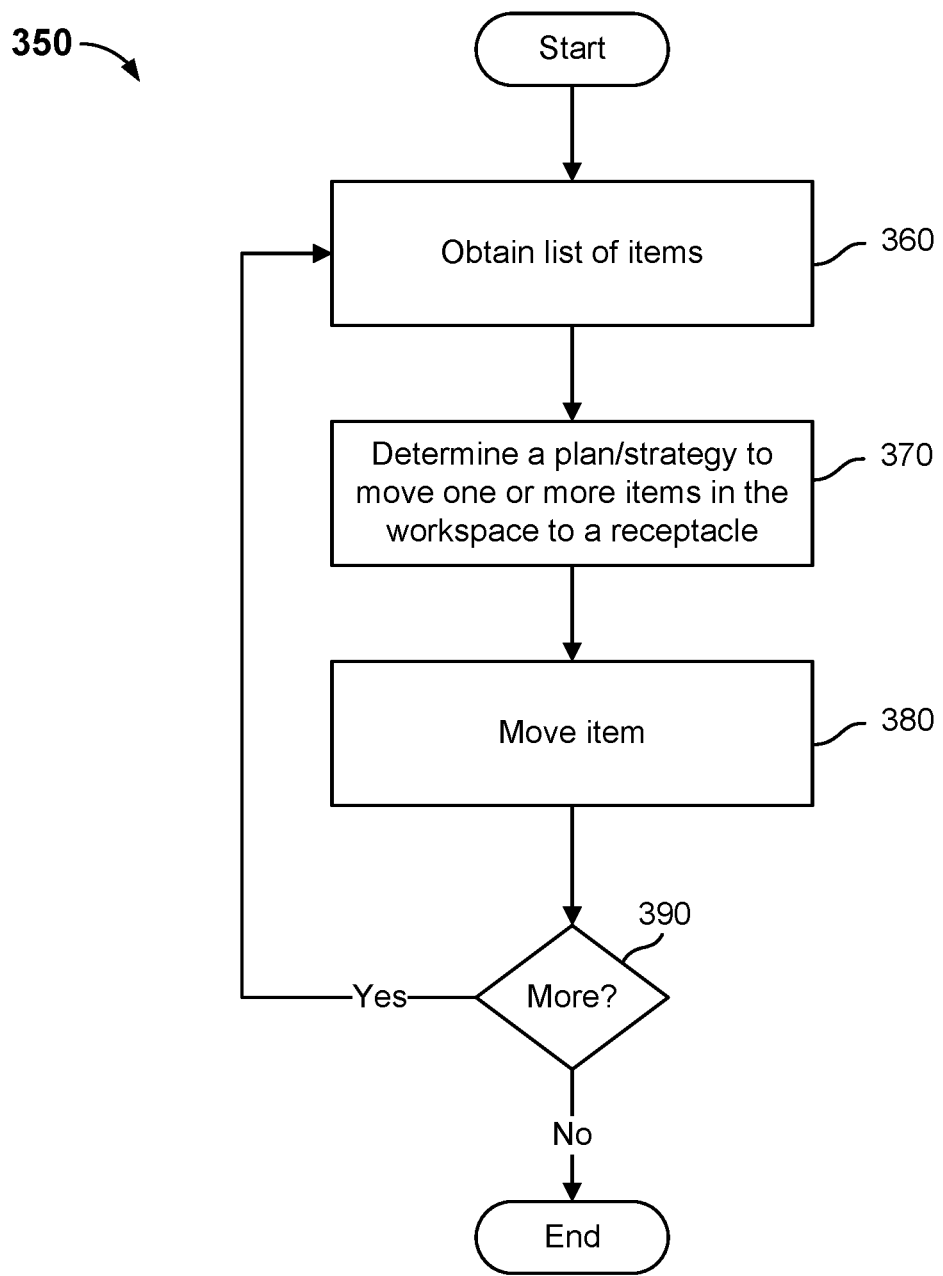
FIG. 3B is a flow chart illustrating an embodiment of a process to move an item.

FIG. 3B is a flow chart illustrating an embodiment of a process to move an item. In some embodiments, process 350 is implemented by a robot system operating to kit one or more items within a workspace. The robot system includes one or more processors which operate, including by performing the process 350, to cause a robotic structure (e.g., a robotic arm) to pick and place items for assembling a set of items into a kit.

At 360, a list of items is obtained. In some embodiments, a robotic system obtains a list of items to assembly into one or more kits. The list of items may be obtained from an invoice or manifest such as an invoice or manifest corresponding to an order, or otherwise obtained from an order or information indicating that a set of items is to be provided to another location. The list of items may be obtained from a data structure such as a data structure shared with a warehouse system or with another robotic system.

At 370, a plan or strategy to move one or more items in the workspace is determined. In some embodiments, a robotic system determines the plan or strategy to pick at least one item from a shelf (e.g., a shelf of a shelf machine) in the workspace and to place the at least one item in a receptacle such as a box, tray, tote, bag, or other receptacle. The receptacle may be on a conveyor. The plan or strategy to singulate the one or more items may be determined in various embodiments on a robot by robot basis such that if the robotic system includes a plurality of robots, each robot operates independent of the other robot(s).

The plan or strategy to move the one or more items may be determined based at least in part on sensor data pertaining to the workspace. In some embodiments, a robotic system obtains the sensor data pertaining to the workspace from one or more sensors operating within the system. As an example, the sensor data is obtained based at least in part on outputs from image sensors (e.g., 2D or 3D cameras), an infrared sensor array, a laser array, a scale, a gyroscope, a current sensor, a voltage sensor, a power sensor, a force sensor, a pressure sensor, and the like.

According to various embodiments, the obtained sensor data pertaining to the workspace comprises information from which a model of the workspace may be generated. For example, one or more characteristics associated with the workspace is determined based at least in part on the sensor data. The sensor data can be used in connection with determining at least one characteristic of one or more items within the workspace such as items on a shelf or on a shelf system, or an item grasped by the robotic arm. In some embodiments, the sensor data is used in connection with determining one or more characteristics of the conveyor such as determining the slots or receptacles on the conveyor that are empty or unreserved, determining a speed of the conveyor, and/or determining the characteristics of at least one slot or of at least one item already on the conveyor.

According to various embodiments, the plan or strategy to move the one or more items in the workspace is determined based at least in part on the sensor data. For example, the plan or strategy to move the one or more items includes selecting an item within that is to be moved. The selected item can be identified from among other items or objects within the workspace (e.g., other items on shelves) based at least in part on the list of items and/or sensor data (e.g., the boundaries of the item and other items or objects within the workspace can be determined). As an example, one or more characteristics pertaining to the selected item is determined based at least in part on the sensor data. The one or more characteristics pertaining to the selected item can include a dimension of the item, a packaging of the item, one or more identifiers or labels on the item (e.g., an indicator that the item is fragile, a shipping label on the item, etc.), an estimated weight of the item, and the like, or any combination thereof. As another example, the plan to move the one or more items includes determining a location on the conveyor (e.g., a slot or receptacle on the conveyor) at which the robotic structure (e.g., the robotic arm) is to place the item. The location on the conveyor at which the item is to be placed can be determined based at least in part on a timestamp, a speed of the conveyor, and one or more characteristics of a slot or receptacle in the conveyor (e.g., an indication of whether the slot is occupied or reserved, an identifier associated with the slot or receptacle such as in the case that an identifier on a receptacle is mapped to a manifest, etc.), and the like, or any combination thereof. As another example, the plan or strategy to move the one or more items includes determining a path or trajectory of the item along which the robotic arm is to move the item. The path or trajectory of the item along which the item is to be moved can be determined based at least in part on a location of one or more other objects within the workspace such as a frame of the chute, other items in on a shelf or shelf system, items on the conveyor, other robots operating within the workspace, a reserved airspace for operation of other robots, sensors within the workspace, etc. For example, the path or trajectory of the item is determined to move a part of the item comprising an identifier (e.g., a shipping label) to an area at which a scanner is able to scan the identifier, or the path or trajectory of the item is determined to maximize a likelihood that the identifier on the item is read by one or more scanners along the path or trajectory.

According to various embodiments, the plan or strategy to move the one or more items is determined based at least in part on a cost associated with moving the one or more items. The system may determine the plan or strategy for moving an item based at least in part a cost of moving the item such as by determining a plan or strategy that minimizes a cost of moving the item. To minimize the cost of moving the item may include optimizing the cost subject to one or more predetermined conditions or constraints. In some embodiments, the system determines the plan or strategy for moving the item in a manner that moving the item according to the plan or strategy is expected to cost less than a cost value threshold. The costs associated with moving the item may be based at least in part on an attribute associated with the item (e.g., a size of the item), a location in the workspace from which the item is to be picked (e.g., a location on the shelf or shelf system), a destination location on the conveyor at which the item is to be placed, a particular receptacle in which to place the item (e.g., different receptacles may be located on different conveyors), etc. In some embodiments, the presence of one or more other items or objects in the workspace (e.g., an item or receptacle already on the conveyor, an item already in the receptacle to which the current item is to be moved, etc.) may impact a cost of moving an item according to a path/trajectory, etc.

In some embodiments, the plan or strategy to move the one or more items in the workspace comprises determining whether to control/regulate the flow of items at the chute or otherwise in being provided to the workspace. The plan or strategy may further comprise a determination of a manner by which the flow of items is to be controlled. For example, the system may determine to control to improve the flow of items (e.g., to increase the rate of items being provided to the workspace, to increase the number of items provided to the workspace, etc.). As another example, the system may determine to control to decrease or impede the flow of items (e.g., to decrease the rate of items being provided to the workspace, to decrease the number of items provided to the workspace, etc.). The system may determine whether to control/regulate the flow of items based at least in part on the sensors data such as information pertaining to items in the workspace (e.g., a quantity of items, a density of items, an indication of whether a threshold number of items are occulated, a likelihood that a threshold number of items can/cannot be grasped, etc.).

At 380, the item is moved. In some embodiments, the item is picked and placed in response to the plan or strategy for singulating the item being determined. For example, a robotic arm is operated to pick one or more items from the workspace and place each item in a corresponding location in a receptacle. The singulation of the item comprises picking the item from the workspace (e.g., from the corresponding shelf) and placing the item on the conveyor or otherwise in the applicable receptacle. The robot system picks and places the item based at least in part on the plan or strategy for moving the item.

At 390, a determination is made as to whether further items are to be singulated. If there are more items, a further iteration of steps 360, 370, and 380 is performed, and successive iterations are performed until it is determined at 390 that there are no more items in the chute (or other receptacle or source) to be picked and placed.

Figure 4:
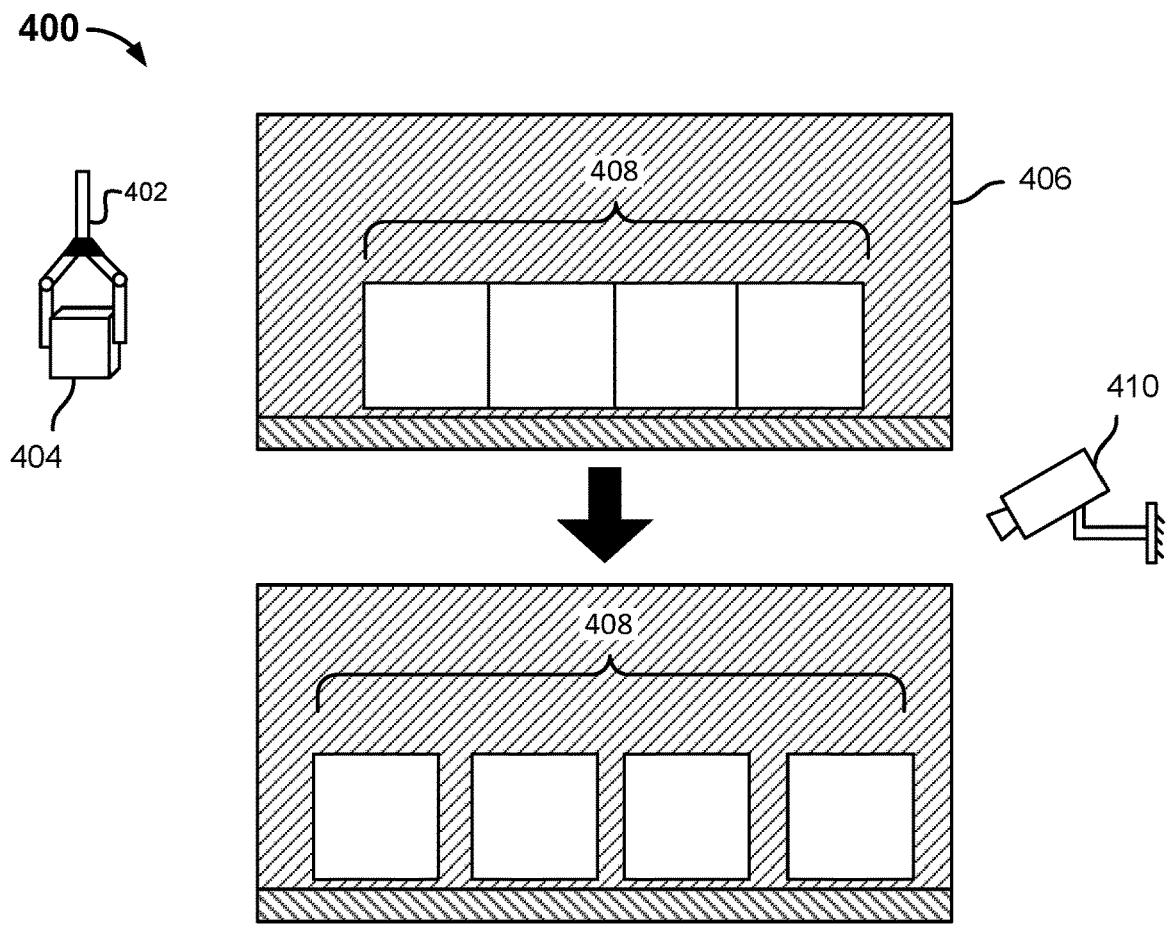
FIG. 4 illustrates an example of a pick-up zone in an embodiment of a robotic kitting system.

FIG. 4 illustrates an example of a pick-up zone in an embodiment of a robotic kitting system. In various embodiments, the robotic kitting system 100 of FIG. 1 is included in an integrated kitting system. In the example shown, a robotic arm terminating in a gripper 402 is used to retrieve items such as item 404 from a pick-up zone 406. In various embodiments, the pick-up zone 406 may comprise a table, ramp, a presentation face of a shelf of a kitting shelf system, a receptacle disposed on a presentation face of a shelf of a kitting shelf system, or other surface; one or more sidewalls; and/or a bin or other receptacle.

In the example shown, a plurality of items 408 has not yet been retrieved from pick-up zone 406. In the upper image the items 408 are clumped together, which in some embodiments may leave a kitting system into which robotic kitting system 400 is integrated without a strategy to successfully retrieve one of the items 408 from the pick-up zone 406 using robotic arm and gripper 402. For example, with the items 408 clumped as shown in the upper drawing of FIG. 4, a processor comprising the robotic kitting system (not shown) may not have a strategy to pick up one of the items 408 because there is not room to place the digits of gripper 402 on opposite sides of any one of them to pick it up, due to the presence of other items 408 or structures comprising the pick-up zone 406 adjacent to at least two sides of each item 408.

In the example shown in FIG. 4, camera 410 is positioned to generate an image of items in pick-up zone 406, such as items 408 as shown. In some embodiments, a processor comprising and/or associated with kitting system 400 receives image data generated by camera 410 and uses the image data to determine whether a strategy is available to retrieve a next item, e.g., one of the items 408, from the pick-up zone without human intervention. In some embodiments, the processor is configured to manipulate structures comprising the pick-up zone 406 to redistribute or otherwise reposition items in the pick-up zone 406, e.g., items 408. Examples of structures manipulated by the processor in various embodiments include without limitation linear motors to shake a surface comprising pick-up zone 406 in the x- and/or y-direction(s); vibrators or other structures to impart vibration to the pick-up zone 406; structures to move one or more corners, sides, etc. of the pick-up zone 406 up and/or down in the z-direction; and using the robotic arm and gripper 402 to push items 408 around until a more spaced out distribution is achieved.

In various embodiments, a processor comprising robotic kitting system 400 manipulates the pick-up zone 406 to achieve a distribution such as shown in the lower drawing of FIG. 4, in which items 408 are spaced apart sufficiently for the gripper 402 to be used to retrieve individual ones of the items 408, e.g., by picking them up from above. In various embodiments, the processor iteratively manipulates the pick-up zone 406, processes image data from camera 410 to determine if a strategy is available to pick up a next one of the items 408, until a strategy is available and/or the processor determines a prescribed number of attempts have been made. In some embodiments, if after a prescribed number of iterations no strategy to retrieve an item has become available, the processor invokes on demand human teleoperation (or, in some embodiments, other human intervention). A human operator may use the robotic arm and gripper 402 to move items apart to retrieve them, for example. In some embodiments, the robotic kitting system continues to process image data from camera 410. Once the human teleoperation (or other intervention) is determined by the processor to have resulted in conditions in which fully automated operation can be resumed, in various embodiments the processor resumes automated operation and/or provides an indication to the human operator that automated operation can resume. For example, once based on the image data from camera 410 the robotic kitting system determines a strategy exists to pick up a next one of the items 408 without further human intervention, the processor in some embodiments resumes (or indicates readiness to resume) automated operation.

In some embodiments, a processor comprising robotic kitting system 400 uses image data generated by camera 410 to anticipate a resulting quantity, distribution, and/or position of items in the pick-up zone 406, and to manipulate based on such processing one or more mechanisms configured to participate in delivering items such as items 408 to pick-up zone 406. For example, disrupter devices, conveyors, powered rollers, movable paddles or baffles, etc., may be manipulated in various embodiments to achieve or increase the likelihood of achieving a less densely packed distribution, as in the lower drawing of FIG. 4.

Figure 5:
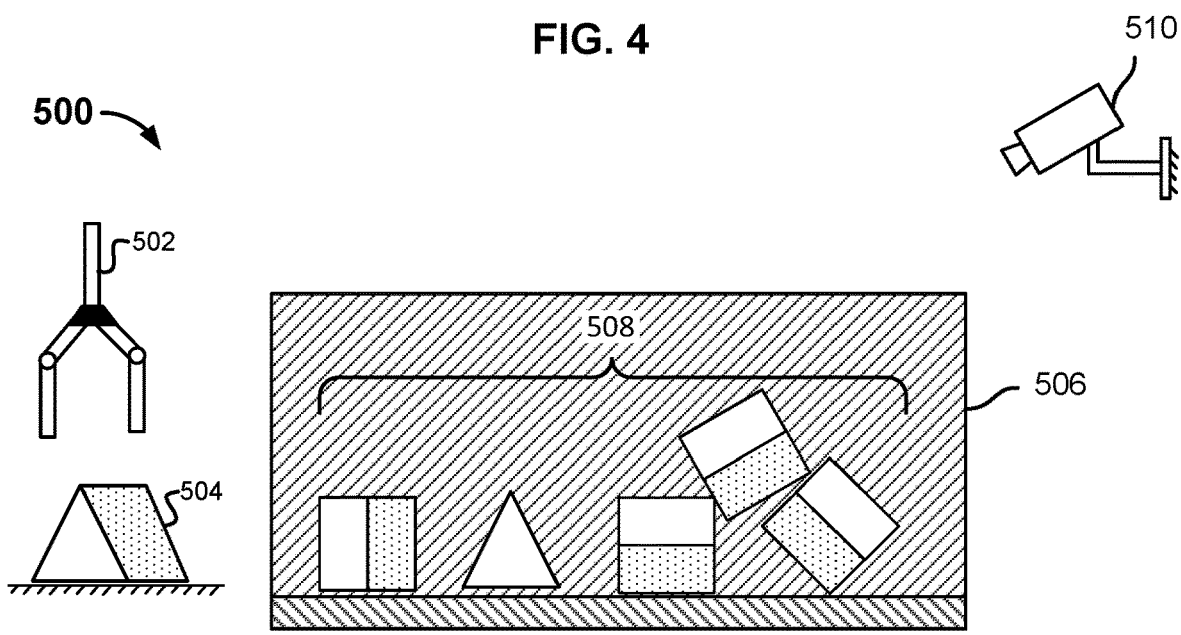
FIG. 5 illustrates an example of a pick-up zone in an embodiment of a robotic kitting system.

FIG. 5 illustrates an example of a pick-up zone in an embodiment of a robotic kitting system. In the example shown, robotic kitting system 500 uses a robotic arm terminating in gripper 502 to retrieve items such as item 504 from pick-up zone 506. Additional items 508 are shown in pick-up zone 506. In this example, the item 504 and items 508 comprise right triangular prisms, each with two opposite triangular sides joined by three rectangular faces. In this example, robotic kitting system 500 may have (more) strategies to retrieve on of the items 504, 508 by using the gripper 502 to engage and provide inward pressure on the opposite triangular sides, as opposed to angled rectangular sides. In the example shown, a processor (not shown) comprising robotic kitting system 500 may use image data generated by camera 510 to determine that strategies (or higher confidence strategies) exist to retrieve one or more of the three items 508 on the right hand side of pick-up zone 506, as shown, than are available to retrieve the two items 508 on the left. In various embodiments, automated processing may be performed to retrieve the three items 508 on the right. If not strategy otherwise exists to retrieve the remaining items, in various embodiments, the processor (not shown) is configured to manipulate the pick-up zone 506 to change the position and/or orientation of the items 508 on the left and then use image data generated by camera 510 to determine if a strategy has become available to retrieve one or more of the repositioned items. If so, the item(s) is/are retrieved. If not, further iterations of manipulation and evaluation may be performed, as described above, and in some embodiments human intervention (e.g., through teleoperation) may be invoked, if needed.

Figure 6:
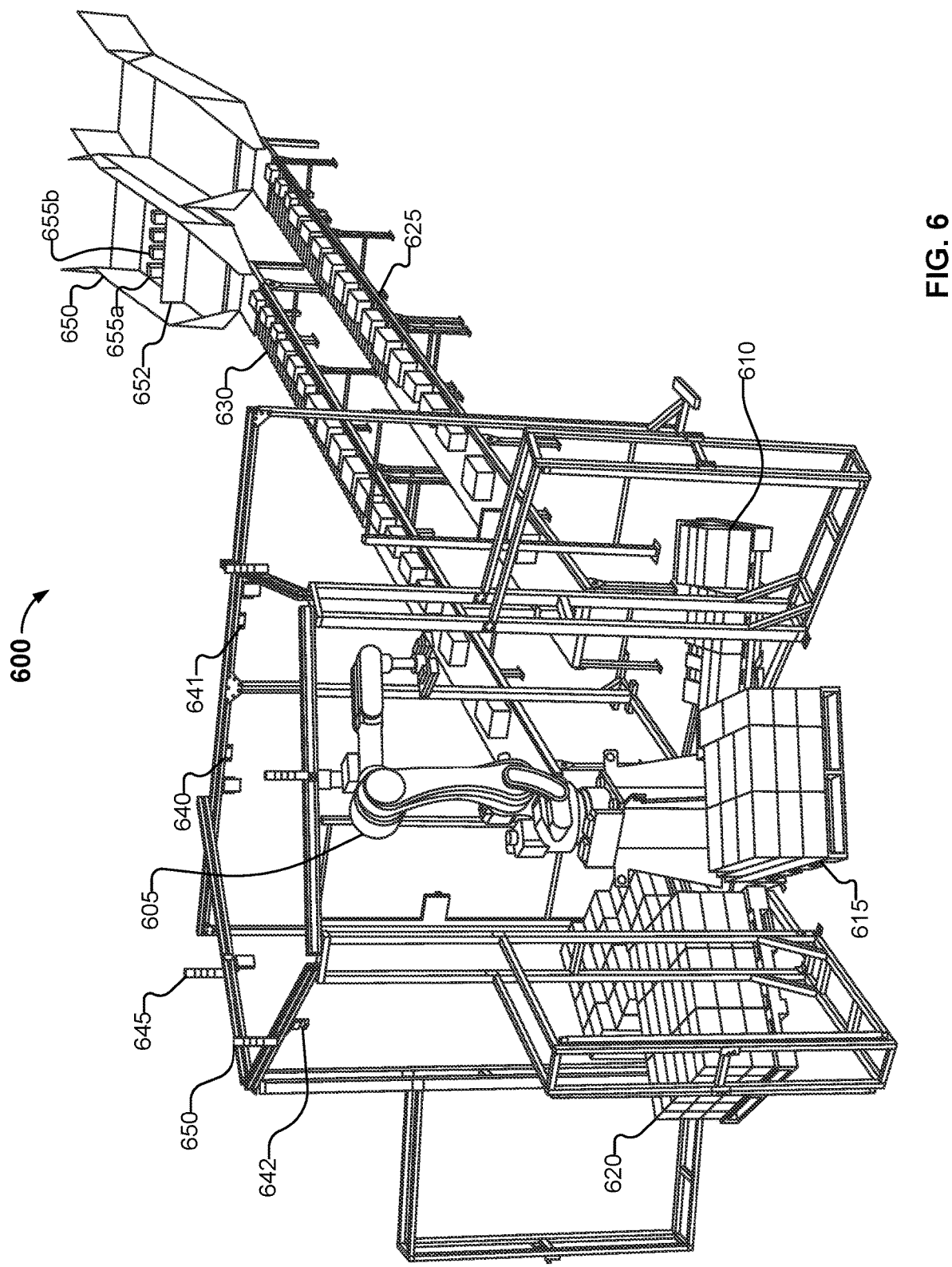
FIG. 6 is a diagram illustrating an embodiment of a robotic system to palletize and/or depalletize heterogeneous items.

FIG. 6 is a diagram illustrating an embodiment of a robotic system to palletize and/or depalletize heterogeneous items.

In various embodiments, 3D cameras, force sensors, and other sensors and/or sensor arrays are used to detect and determine attributes of items to be picked and/or placed. Items the type of which is determined (e.g., with sufficient confidence, as indicated by a programmatically determined confidence score, for example) may be grasped and placed using strategies derived from an item type-specific model. Items that cannot be identified are picked and placed using strategies not specific to a given item type. For example, a model that uses size, shape, and weight information may be used. The sensors and/or sensor arrays may be disposed in or around a workspace of a robotic arm.

In various embodiments, a library of item types, respective attributes, and grasp strategies is used to determine and implement a strategy to pick and place each item. The library is dynamic in some embodiments. For example, the library may be augmented to add newly-encountered items and/or additional attributes learned about an item, such as grasp strategies that worked or did not work in a given context. In some embodiments, human intervention may be invoked if the robotic system gets stuck. The robotic system may be configured to watch (e.g., using sensors) and learn (e.g., updating a library and/or model) based on how a human teleoperator intervenes to use the robotic arm, for example, to pick and place an item via teleoperation. In some embodiments, teleoperation may include higher-level forms of feedback, such as a human indicating a particular point in a 2D RGB image at which the robot should grasp an object.

In some embodiments, a robotic system as disclosed herein may engage in a process to gather and store (e.g., add to library) attributes and/or strategies to identify and pick/place an item of unknown or newly-discovered type. For example, the system may hold the item at various angles and/or locations to enable 3D cameras and/or other sensors to generate sensor data to augment and/or create a library entry that characterizes the item type and stores a model of how to identify and pick/place items of that type.

In various embodiments, a high level plan to pick and place items on or in a pallet is made. Strategies are applied, e.g., based on sensor information, to implement the plan by picking and placing individual items according to the plan. Deviations from the plan and/or re-planning may be triggered, e.g., the robotic system gets stuck, the stack of items on the pallet is detected (e.g., by computer vision, force sensors, etc.) to have become unstable), etc. A partial plan may be formed based on known information (e.g., next N items visible on a conveyor, next N items on an invoice or manifest, etc.) and adjustments made as additional information is received (e.g., next items visible, etc.). In some cases, the system is configured to stage (e.g., set aside, within reach) items determined less likely to be suitable to be stacked in a layer or container the system is currently building, such as a lower (or higher) layer in a pallet or container, etc. Once more information is known about next items to be picked/placed, a strategy that takes into account the staged (buffered) items and next items is generated and implemented.

Various embodiments include the simultaneous (e.g., concurrent or contemporaneous) palletization or depalletization of a set of one or more items. One or more robotic arms may be controlled to concurrently stack (or de-stack) a set of items on a plurality of pallets. For example, a plurality of pallets may be disposed within range of a robotic arm, and the robotic arm may contemporaneously stack one or more items on at least a subset of the plurality of pallets (e.g., a set of two or more pallets). A pallet on which an item is to be placed (e.g., stacked) may be selected based at least in part on one or more of the item (e.g., an attribute of the item, a type of item, etc.), a characteristic of the pallet, an identifier of the pallet, a state of a stack of one or more items on the pallet, a manifest or order (e.g., an order in association with which the item is being packed and shipped), etc. A mix of items may be stacked on one or more pallets of the plurality of pallets.

In various embodiments, a robotic system determines a high level plan to pick an item from a conveyance structure (hereinafter "conveyor") of one or more conveyors, and to place the item on a pallet of one or more pallets disposed within range of a robotic arm. The robotic system determines the pallet on which to place the item. For example, the robotic system determines the pallet on which to place the item based at least in part on an order and/or manifest associated with the pallet. As another example, in the case of a plurality of pallets being delivered to a same address (e.g., a same customer), or being associated with a same manifest or order, the robotic system may determine the pallet on which to place the item based at least in part on a state of the pallet and/or a state of the plurality of pallets. The robotic system may determine a state of a stack on one or more of the plurality of pallets, and determine the pallet on which to place the item based at least in part on a determination of a stack for which the item has a best fit. The determination that the stack for which the item has a best fit may be based at least in part on a stability of the stack, a model of the stack and/or a model of the stack comprising the item (e.g., after the item is placed on the stack), an expected one or more items that remain to be stacked (e.g., based at least in part on an order and/or manifest), etc. One or more attributes or characteristics pertaining to the item may be used in connection with determining the pallet on which to place the item (e.g., a size, shape, type of packaging, type of item, etc. may be used in connection with modelling the stack and/or determining where to place the item on a stack).

In some embodiments, the robotic system determines that place an item in a buffer or predefined staging area. The robotic system may determine that a fit of the item on a stack on one or more pallets associated with the manifest and/or order to which the item corresponds is not currently ideal (e.g., that a threshold fit or threshold stability would not be achieved if the item were to be placed on the stack). Alternatively, or in addition, the robotic system may determine that the item would fit better on the stack after one or more expected items are placed on the corresponding pallet. For example, the robotic system may determine that an expected fit of a current item or expected stability of the stack would be better (e.g., higher than the threshold fit or the threshold stability) if one or more expected items were first placed on the corresponding pallet. As an example, the one or more expected items may be determined based at least in part on one or more items on the conveyor. As another example, the one or more expected items may be determined based at least in part on a manifest and/or order with which the current item is associated. The one or more expected items may be determined based at least in part on a threshold number of subsequent items on the conveyor or to be stacked on the one or more pallets (e.g., to be delivered to the robotic arm for stacking), and/or manifest and/or order with which the current item is associated. The buffer or predefined staging area may correspond to one of the predefined zones disposed within range of the robotic arm. In some embodiments, in response to a determination that the buffer or predefined staging area is full (e.g., a number of items in the buffer/staging area exceeds a threshold number, or that the current item does not fit in the buffer/staging area), the robotic system may determine whether to place the current item or an item currently in the buffer/staging area. The robotic system may determine whether placing an item from the buffer/staging area to a corresponding pallet (e.g., and thereby freeing up space in the buffer/staging area for the current item) would result in a better fit (e.g., a more stable stack) than placing the current item on a pallet. In response to determining that placing an item from the buffer/staging area to a corresponding pallet is expected to result in a better fit, the robotic system controls the robotic arm to pick the item from the buffer/staging area and place the item on a pallet corresponding to a manifest and/or order to which the item belongs. The robotic arm then places the current item in the buffer and/or staging area until the robotic system determines that placing the item on a corresponding stack is ideal (e.g., that a threshold fit or threshold stability would not be achieved if the item were to be placed on the stack).

According to various embodiments, system 600 implements a machine learning process to model a state of a pallet such as to generate a model of a stack on the pallet. The machine learning process may include an adaptive and/or dynamic process for modeling the state of the pallet. The machine learning process may define and/or update/refine a process by which system 600 generates a model of the state of the pallet. The model may be generated based at least in part on input from (e.g., information obtained from) one or more sensors in system 600 such as one or more sensors or sensor arrays within workspace of robotic arm 605. The model may be generated based at least in part on a geometry of the stack, a vision response (e.g. information obtained by one or more sensors in the workspace), and the machine learning processes, etc. System 600 may use the model in connection with determining an efficient (e.g., maximizing/optimizing an efficiency) manner for palletizing/depalletizing one or more items, and the manner for palletizing/depalletizing may be bounded by a minimum threshold stability value. The process for palletizing/depalletizing the one or more items may be configurable by a user administrator. For example, one or more metrics by which the process for palletizing/depalletizing is maximized may be configurable (e.g., set by the user/administrator).

In the context of palletizing one or more items, system 600 may generate the model of the state of the pallet in connection with determining whether to place an item on the pallet (e.g., on the stack), and selecting a plan for placing the item on the pallet, including a destination location at which the item is to be placed, a trajectory along which the item is to be moved from a source location (e.g., a current destination such as a conveyor) to the destination location. System 600 may also use the model in connection with determining a strategy for releasing the item, or otherwise placing the item on the pallet (e.g., applying a force to the item to snug the item on the stack). The modelling of the state of the pallet may include simulating placement of the item at different destination locations on the pallet (e.g., on the stack) and determining corresponding different expected fits and/or expected stability (e.g., a stability metric) that is expected to result from placement of the item at the different locations. System 600 may select a destination location for which the expected fit and/or expected stability satisfies (e.g., exceeds) a corresponding threshold value. Additionally, or alternatively, system 600 may select a destination location that optimizes the expected fit (e.g., of the item on the stack) and/or expected stability (e.g., of the stack).

In the example shown, system 600 includes a robotic arm 605. In this example the robotic arm 605 is stationary, but in various alternative embodiments robotic arm 605 may be a fully or partly mobile, e.g., mounted on a rail, fully mobile on a motorized chassis, etc. In other implementations system 600 may include a plurality of robotic arms with a workspace. As shown, robotic arm 605 is used to pick arbitrary and/or dissimilar items from one or more conveyor belts (or other source) 625 and 630, and the items on a pallet (e.g., platform or other receptacle) such as pallet 610, pallet 615, and/or pallet 620. In some embodiments, other robots not shown in FIG. 6 may be used to push pallet 610, pallet 615, and/or pallet 620 into position to be loaded/unloaded and/or into a truck or other destination to be transported, etc.

As illustrated in FIG. 6, system 600 may comprise one or more predefined zones. For example, pallet 610, pallet 615, and pallet 620 are shown as located within the predefined zones. The predefined zones may be denoted by marking or labelling on the ground or otherwise structurally such as via the frame shown in system 600. In some embodiments, the predefined zones may be located radially around robotic arm 605. In some cases, a single pallet is inserted into a predefined zone. In other case, one or pallets are inserted into a predefined zone. Each of the predefined zones may be located within range of robotic arm 605 (e.g., such that robotic arm 605 can place items on a corresponding pallet, or depalletize items from the corresponding pallet, etc.). In some embodiments, one of the predefined zones or pallets located within a predefined zone is used as a buffer or staging area in which items are temporarily stored (e.g., such as temporary storage until the item is to be placed on a pallet in a predefined zone).

One or more items may be provided (e.g., carried) to the workspace of robotic arm 605 such as via conveyor 625 and/or conveyor 630. System 600 may control a speed of conveyor 625 and/or conveyor 630. For example, system 600 may control the speed of conveyor 625 independently of the speed of conveyor 630, or system 600 may control the speeds of conveyor 625 and/or conveyor 630. In some embodiments, system 600 may pause conveyor 625 and/or conveyor 630 (e.g., to allow sufficient time for robotic arm 605 to pick and place the items. In some embodiments, conveyor 625 and/or conveyor 630 carry items for one or more manifests (e.g., orders). For example, conveyor 625 and conveyor 630 may carry items for a same manifest and/or different manifests. Similarly, one or more of the pallets/predefined zones may be associated with a particular manifest. For example, pallet 610 and pallet 615 may be associated with a same manifest. As another example, pallet 610 and pallet 620 may be associated with different manifests.

System 600 may control robotic arm 605 to pick an item from a conveyor such as conveyor 625 or conveyor 630, and place the item on a pallet such as pallet 610, pallet 615, or pallet 620. Robotic arm 605 may pick the item and move the item to a corresponding destination location (e.g., a location on a pallet or stack on a pallet) based at least in part on a plan associated with the item. In some embodiments, system 600 determines the plan associated with the item such as while the item is on the conveyor, and system 600 may update the plan upon picking up the item (e.g., based on an obtained attribute of the item such as weight, or in response to information obtained by a sensor in the workspace such as an indication of an expected collision with another item or human, etc.). System 600 may obtain an identifier associated with the item such as a barcode, QR code, or other identifier or information on the item. For example, system 600 may scan/obtain the identifier as the item is carried on the conveyor. In response to obtaining the identifier, system 600 may use the identifier in connection with determining the pallet on which the item is to be placed such as by performing a look up against a mapping of item identifier to manifests, and/or a mapping of manifests to pallets. In response to determining one or more pallets corresponding to the manifest/order to which the item belongs, system 600 may select a pallet on which to place the item based at least in part on a model or simulation of the stack of items on the pallet and/or on a placing of the item on the pallet. System 600 may also determine a specific location at which the item is to be placed on the selected pallet (e.g., the destination location). In addition, a plan for moving the item to the destination location may be determined, including a planned path or trajectory along which the item may be moved. In some embodiments, the plan is updated as the robotic arm 605 is moving the item such as in connection with performing an active measure to change or adapt to a detected state or condition associated with the one or more items/objects in the workspace (e.g., to avoid an expected collision event, to account for a measured weight of the item being greater than an expected weight, to reduce shear forces on the item as the item moved, etc.).

According to various embodiments, system 600 comprises one or more sensors and/or sensor arrays. For example, system 600 may include one or more sensors within proximity of conveyor 625 and/or conveyor 630 such as sensor 640 and/or sensor 641. The one or more sensors may obtain information associated with an item on the conveyor such as an identifier or information on label on the item, or an attribute of the item such as a dimensions of the item. In some embodiments, system 600 includes one or more sensors and/or sensor arrays that obtain information pertaining to a predefined zone and/or a pallet in the zone. For example, system 600 may include a sensor 642 that obtains information associated with pallet 620 or the predefined zone within which pallet 620 is located. Sensors may include one or more 2D cameras, 3D (e.g., RGBD) cameras, infrared, and other sensors to generate a three-dimensional view of a workspace (or part of a workspace such as a pallet and stack of items on the pallet). The information pertaining to a pallet may be used in connection with determining a state of the pallet and/or a stack of items on the pallet. As an example, system 600 may generate a model of a stack of items on a pallet based at least in part on the information pertaining to the pallet. System 600 may in turn use the model in connection with determining a plan for placing an item a pallet. As another example, system 600 may determine that a stack of items is complete based at least in part on the information pertaining to the pallet.

According to various embodiments, system 600 determines a plan for picking and placing an item (or updates the plan) based at least in part on a determination of a stability of a stack on a pallet. System 600 may determine a model of the stack for one or more of pallets 610, 615, and/or 620, and system 600 may use the model in connection with determining the stack on which to place an item. As an example, if a next item to be moved is relatively large (e.g., such that a surface area of the item is large relative to a footprint of the pallet), then system 600 may determine that placing the item on pallet 610 may cause the stack thereon to become unstable (e.g., because the surface of the stack is non-planar). In contrast, system 600 may determine that placing the relatively large (e.g., planar) item on the stack for pallet 615 and/or pallet 620 may result in a relatively stable stack. The top surfaces of the stacks for pallet 615 and/or pallet 620 are relatively planar and the placement of a relatively large item thereon may not result in the instability of the stack. System 600 may determine that an expected stability of placing the item on pallet 615 and/or pallet 620 may be greater than a predetermined stability threshold, or that placement of the item on pallet 615 or pallet 620 may result in an optimized placement of the item (e.g., at least with respect to stability).

System 600 may communicate a state of a pallet and/or operation of the robotic arm 605 within a predefined zone. The state of the pallet and/or operation of the robotic arm may be communicated to a user or other human operator. For example, system 600 may include a communication interface (not shown) via which information pertaining to the state of system 600 (e.g., a state of a pallet, a predetermined zone, a robotic arm, etc.) to a terminal such as on demand teleoperation device and/or a terminal used by a human operator. As another example, system 600 may include a status indicator within proximity of a predefined zone, such as status indicator 645 and/or status indicator 650.

Status indicator 650 may be used in connection with communicating a state of a pallet and/or operation of the robotic arm 605 within the corresponding predefined zone. For example, if system 600 is active with respect to the predefined zone in which pallet 620 is located, the status indicator can so indicate such as via turning on a green-colored light or otherwise communicating information or an indication of the active status via status indicator 650. System 600 may be determined to be in an active with respect to a predefined zone in response to determining that robotic arm 605 is actively palletizing one or more items on the pallet within the predefined zone. As another example, if system 600 is inactive with respect to the predefined zone in which pallet 620 is located, the status indicator can so indicate such as via turning on a red-colored light or otherwise communicating information or an indication of the active status via status indicator 650. System 600 may be determined to be inactive in response to a determination that robotic arm 605 is not actively palletizing one or more items on the pallet within the predefined zone, for example in response to a user pausing that predefined zone (or cell), or in response to a determination that a palletization of items on pallet 620 is complete. A human operator or user may use the status indicator as an indication as to whether entering the corresponding predefined zone is safe. For example, a user working to remove completed pallets, or inserting empty pallets, to/from the corresponding predefined zone may refer to the corresponding status indicator and ensure to enter the predefined zone when the status indicator indicates that operation within the predefined zone is inactive.

According to various embodiments, system 600 may use information obtained by one or more sensors within the workspace to determine an abnormal state pertaining to the pallet and/or items stacked on the pallet. For example, system 600 may determine that a pallet is misaligned relative to robotic arm 605 and/or the corresponding predefined zone based at least in part on the information obtained by the sensor(s). As another example, system 600 may determine that a stack is unstable, that items on a pallet are experiencing a turbulent flow, etc. based at least in part on the information obtained by the sensor(s). In response to detecting the abnormal state, system may communicate an indication of the abnormal state such as an on-demand teleoperation device or other terminal used by an operator. In some embodiments, in response to detecting the abnormal state, system 600 may automatically set the pallet and/or corresponding zone to an inactive state. In addition to, or as an alternative to, notifying an operator of the abnormal state, system 600 may perform an active measure. The active measure may include controlling the robotic arm 605 to at least partially correct the abnormal state (e.g., restack fallen items, realign the pallet, etc.). In some implementations, in response to detecting that an inserted pallet is misaligned (e.g., incorrectly inserted to the predefined zone), system 600 may calibrate the process for modelling a stack and/or for placing items on the pallet to correct for the misalignment. For example, system 600 may generate and use an offset corresponding to the misalignment when determining and implementing a plan for placing an item on the pallet. In some embodiments, system 600 performs the active measure to partially correct the abnormal state in response to determining that an extent of the abnormality is less than a threshold value. Examples of determining that an extent of the abnormality is less than a threshold value include (i) a determination that the misalignment of the pallet is less than a threshold misalignment value, (ii) a determination that a number of dislodged, misplaced, or fallen items is less than a threshold number, (iii) a determination that a size of a dislodged, misplaced, or fallen item satisfies a size threshold, etc.

A human operator may communicate with system 600 via a network such as a wired network and/or a wireless network. For example, system 600 may comprise a communication interface via which system 600 is connected to one or more networks. In some embodiments, a terminal connected via network to system 600 provides a user interface via which human operator can provide instructions to system 600, and/or via which the human operator may obtain information pertaining to a state of system 600 (e.g., a state of robotic arm, a state of a particular pallet, a state of a palletization process for a particular manifest, etc.). The human operator may provide an instruction to system 600 via an input to the user interface. For example, a human operator may use the user interface to pause the robotic arm, pause a palletization process with respect to a particular manifest, pause a palletization process for a particular pallet, toggle a status of a pallet/predefined zone between active/inactive, etc.

In various embodiments, elements of system 600 may be added, removed, swapped out, etc. In such an instance, a control computer initializes and registers the new element, performs operational tests, and begins/resumes kitting operations, incorporating the newly added element, for example.

The overall cost (e.g., the aggregated resulting value for moving the various items in the set of items) may be different according to an order in which the items are moved from the source location to the destination location because a height of the stack of items changes as the set of items are palletized/de-palletized. As an example, if a robotic system comprises a plurality of conveyors corresponding to possible destination locations (e.g., to carry items away from a pallet in connection with a depalletization process) and at least a subset of the conveyors have different heights, then the cost function with respect to moving an item to a conveyor having a relatively greater height will have a different result than the cost function with respect to moving the item to a conveyor having a relatively lesser height. In such an example, if the stack of items on the pallet has a height that is closer to the conveyor having the relatively greater height, then the cost function will have a result such that moving the item to the conveyor having the relatively greater height may be associated with a lesser cost (e.g., a result of the cost function) than moving the same item to the conveyor having a relatively smaller height. In some embodiments, moving an item down a predetermined distance may be associated with a lesser cost than moving an item up the same predetermined distance (e.g., the robotic arm may have to exert more work to move an item up than to move the item down, the robotic arm may be able to more quickly move the item down than up).

In some embodiments, items are picked and placed to/from a pallet such as in connection with a palletization/depalletization process. In connection with palletizing a set of items, the system may determine to pick items from a source location having a height relatively closer to the height of the pallet (e.g., as compared to other possible source locations), or height of the stack of items on the pallet, and moving the item and placing the item on the pallet. A determination of a source location may be made on an item by item basis (e.g., so that as the stack of items on the pallet grows higher, a source location having a closer relative height is selected as the source location). In connection with depalletizing a set of items, the system may determine to move items from a source location (e.g., the pallet or stack of items on the pallet) to a destination location having a height relatively close to the height of the pallet (e.g., as compared to other possible destination locations such as other conveyors) and moving the item and placing the item at the selected destination location. A determination of a source location may be made on an item by item basis (e.g., so that as the stack of items on the pallet grows higher, a source location having a closer relative height is selected as the source location).

In some embodiments, the height of the conveyor or other area corresponding to a source location/destination location is adjustable. As an example, in connection with palletizing an item, the source location (e.g., the conveyor) can be adjusted based at least in part on the destination location (e.g., a current height of the stack of items on the pallet), the item, and/or the plan for palletizing the item(s). As an example, in connection with depalletizing an item, a destination location (e.g., the conveyor) may be adjusted based at least in part on the source location (e.g., a height of the stack from which the item is picked), the item, and/or the plan for depalletizing the item(s). As an example, a motor may be controlled to raise the conveyor such by as causing one or more pinions to traverse a gear rack.

In some embodiments, a plurality of conveyors may have different corresponding heights. System 600 may determine the conveyor with which to use for palletizing/depalletizing an item base at least in part on a height of the conveyor. For example, system 600 may use a cost associated with palletizing/depalletizing an item with respect to the various conveyors to determine the conveyor to be used.

According to various embodiments, system 600 may comprise a chute that provides items to a conveyor. In the example illustrated in FIG. 6, items are provided to conveyor 630 via chute 650. System 600 may comprise a disrupter device with which the flow of items (e.g., from the chute to the conveyor) is controlled and/or regulated. For example, chute 650 includes disrupter device 652. As illustrated, disrupter device 652 may be controlled to block/impede the flow of items, such as items 655*a* and/or 655*b*, from chute 650 to conveyor 630.

In some embodiments, system 600 may control disrupter device 652 to (i) permit items to flow from chute 650 to conveyor 630 without impediment (e.g., the disrupter device may be fully retracted or moved out of the way of items flowing from the chute), (ii) to slow the flow of items such as by partially blocking or impeding items flowing from chute 650 to conveyor 630 (e.g., the disrupter device 652 may be oriented to be partially raised to create a cliff/ramp along which items travel and creating resistance to the flow of item), (iii) fully cease the flow of items from chute 650 to conveyor 630 (e.g., the disrupter device may be fully extended to prevent items from flowing from chute 650 to conveyor 630), and/or (iv) dislodge or otherwise disrupt a blockage or jam among items or objects in chute 650 (e.g., the disrupter device may be manipulated to apply force against one or more items/objects in chute 650 to clear a jam of items/objects). System 600 may control disrupter device 652 by providing a control signal or instruction to disrupter device 652 (e.g., to an actuation device of the disrupter device). In response to disrupter device 652 receiving the control signal or instruction, the disrupter device 652 may control an actuation device that actuates a flow disrupter (e.g., moves or otherwise changes an orientation or configuration of a flow disrupter).

According to various embodiments, system 600 may control the disrupter device 652 based at least in part on sensor data. The sensor data may be obtained based at least in part on information obtained by one or more sensors in the workspace and/or system 600. In response to determining that a flow of items is to be controlled or regulated, system 600 may control the disrupter device 652. For example, system 600 may determine that the flow of items is to be sped up, slowed, or stopped (e.g., temporarily stopped). System 600 may determine to increase the speed of the flow of items in response to a determination that robotic arm 605 is palletizing items arriving on conveyor(s) more quickly than items are arriving within range of the robotic arm 605 or a pickup location of the conveyor(s). Conversely, system 600 may determine to decrease the speed of the flow of items in response to a determination that robotic arm 605 is palletizing items arriving on conveyor(s) slower than items are arriving within range of the robotic arm 605 or a pickup location of the conveyor(s). Various other factors may be used in connection with determining to control/regulate the flow of items, including density of items on the conveyor or pickup area, number of items on the conveyor or pickup area, a palletization process being paused or stopped (e.g., during removal of a pallet, determination that a human is within a predefined zone, etc.), orientation of an item on the conveyor or pickup area, an object type (e.g., a bag, a box, an envelope, etc.), a presence of an irregular object (e.g., an object that the system deems irregular based on one or more stored patterns or profiles of objects, an object that the system determines is to be removed, etc.), etc.

Figure 7A:
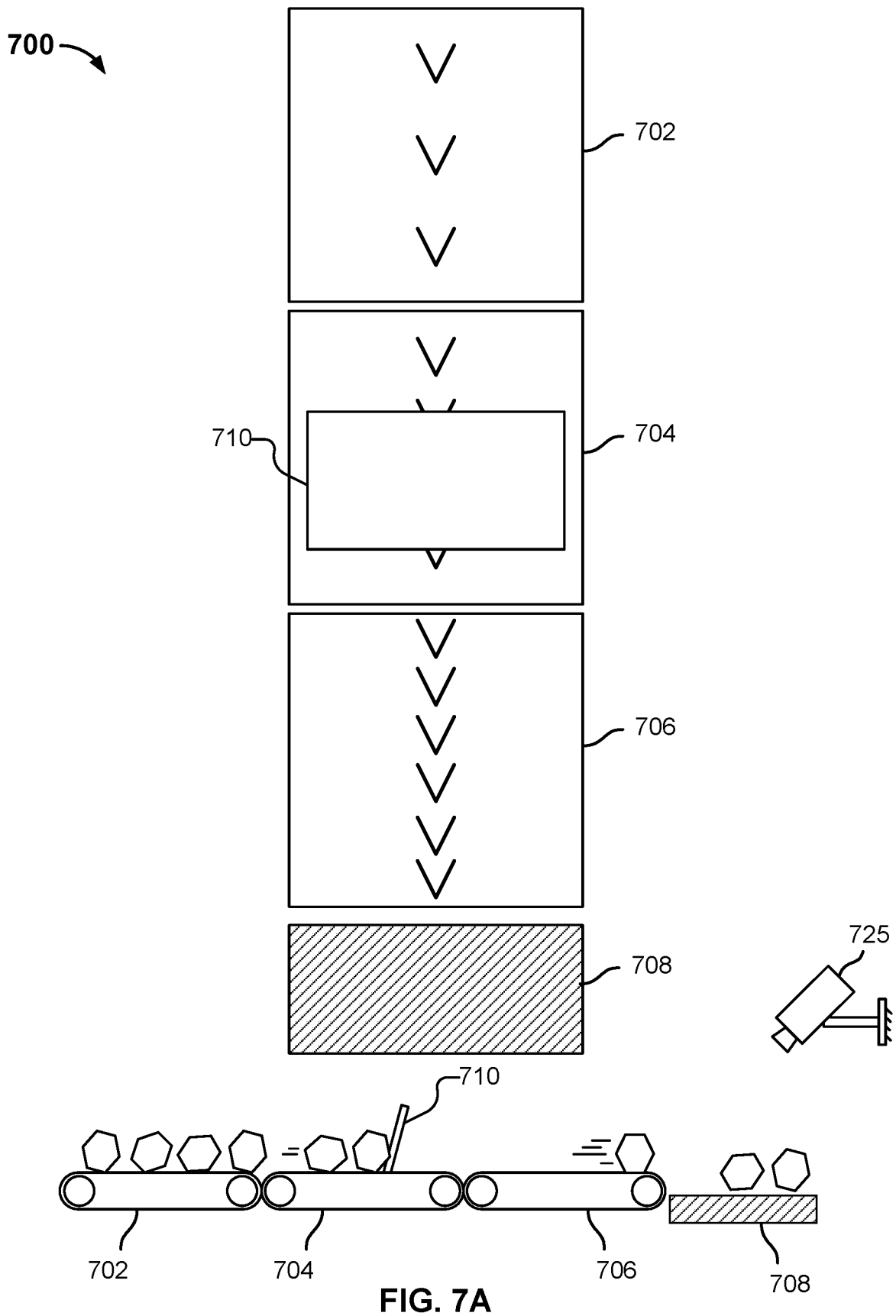
FIG. 7A is a diagram illustrating an embodiment of a robotic system to control a flow of items.

FIG. 7A is a diagram illustrating an embodiment of a robotic system to control a flow of items. In the example shown, robotic kitting system 700 includes a chute comprising a multistage conveyor comprising computer-controlled conveyor belts 702, 704, and 706, positioned and configured to deliver items to pick-up zone 708 (e.g., in the workspace of a robotic arm) for retrieval by a robotic arm and gripper (not shown). The lower drawing shows a side view illustrating the conveyors 702, 704, and 706 being operated at different speeds, in this example each faster than the one preceding it, to create a desired spacing/timing in the arrival at the pick-up zone 708 of items to be retrieved from the pick-up zone 708. In the example shown, camera 710 generates image data showing one or both of the pick-up zone 708 and (at least portions of) the conveyors 702, 404, and 706. In some embodiments, multiple cameras 710 and/or other sensors (for example, and without limitation, additional cameras, optical scanners, and other optical sensors; pressure sensors, weight sensors, limit switches, and other contact sensors; etc.) may be used to monitor the pick-up zone 708 and/or the conveyors 702, 704, and 706. The conveyors 702, 704, and 706 may be started/stopped and/or operated at increased or decreased speed, as needed, to achieve a desired density, distribution, position, etc. of items in the pick-up zone 708. For example, if too many items are already present in the pick-up zone 708, one or more of the conveyors 702, 704, and 706 may be stopped or slowed considerably. Alternatively, if items are being clumped too densely in the pick-up zone 708, the conveyors 704 and/or 406 may be operated more quickly and/or more quickly relative to conveyor 702, e.g., to create greater spacing between items as they arrive at the pick-up zone 708.

In various embodiments, the conveyors 702, 704, and 706 are operated under computer control based on inputs such as packing list data indicating the quantity and/or type of item(s) required to be packed in a kit (e.g., box) that is currently being assembled, etc. For example, if the items supplied by the robotic kitting system 700 have already been packed in the current kit/box, or if no (further) items supplied by the elements shown in FIG. 7A are required, then in some embodiments the elements shown in FIG. 7A may be stopped until more items supplied by the robotic kitting system 700 of FIG. 7A are required, e.g., for a next kit (box).

In various embodiments, system 700 comprises disrupter device 710. As illustrated in FIG. 7, the disrupter device may be comprised in one of the conveyors such as conveyor 704. System 700 may control to move disrupter device 710, or otherwise change the orientation of disrupter device 710, in response to a determination that the flow of items at the chute is to be controlled/regulated. System 700 may determine to control/regulate the flow of items at the chute based on information obtained by one or sensors (e.g., camera 726), such as information pertaining the workspace. System 700 may determine that after the item on conveyor 706 moves to the pick-up zone 708, the density of the items on the pickup area (or other value pertaining to one or more items in the pickup area such as quantity, spacing, etc.) exceeds a threshold value such as a threshold density value, and in response to such a determination, system 700 may determine to control the flow of items at the chute. Although the example illustrated in FIG. 7 provides the items moving at the chute based on a conveyor that may actively drives the items towards the pick-up zone 708, the chute may be static that conveys the items based on gravity, or a combination of gravity and active driving. The disrupter device 710 may be controlled to be positioned with various degrees of incline relative to a top surface of the chute (e.g., conveyor 704). For example, disrupter device 710 may be oriented to be substantially parallel/flat with the top surface when system 700 determines to increase flow of the items or otherwise permit the items to flow freely to the pick-up zone 708. As other example, disrupter device 710 may be oriented to be perpendicular to the top surface (e.g., form a right angle between the disrupter device and the top surface) when system 700 determines to stop (e.g., at least temporarily halt) the flow of items to the pick-up zone 708. As another example, disrupter device 710 may be oriented to be at less than a right angle relative to the top surface such that the disrupter device 710 serves as an upwards slope/ramp that the items travel (e.g., thereby causing an impediment/resistance to the flow of items at the chute). Flow disrupter 710 may also be controlled to clear/unclog a jam of items at the chute.

Figure 7B:
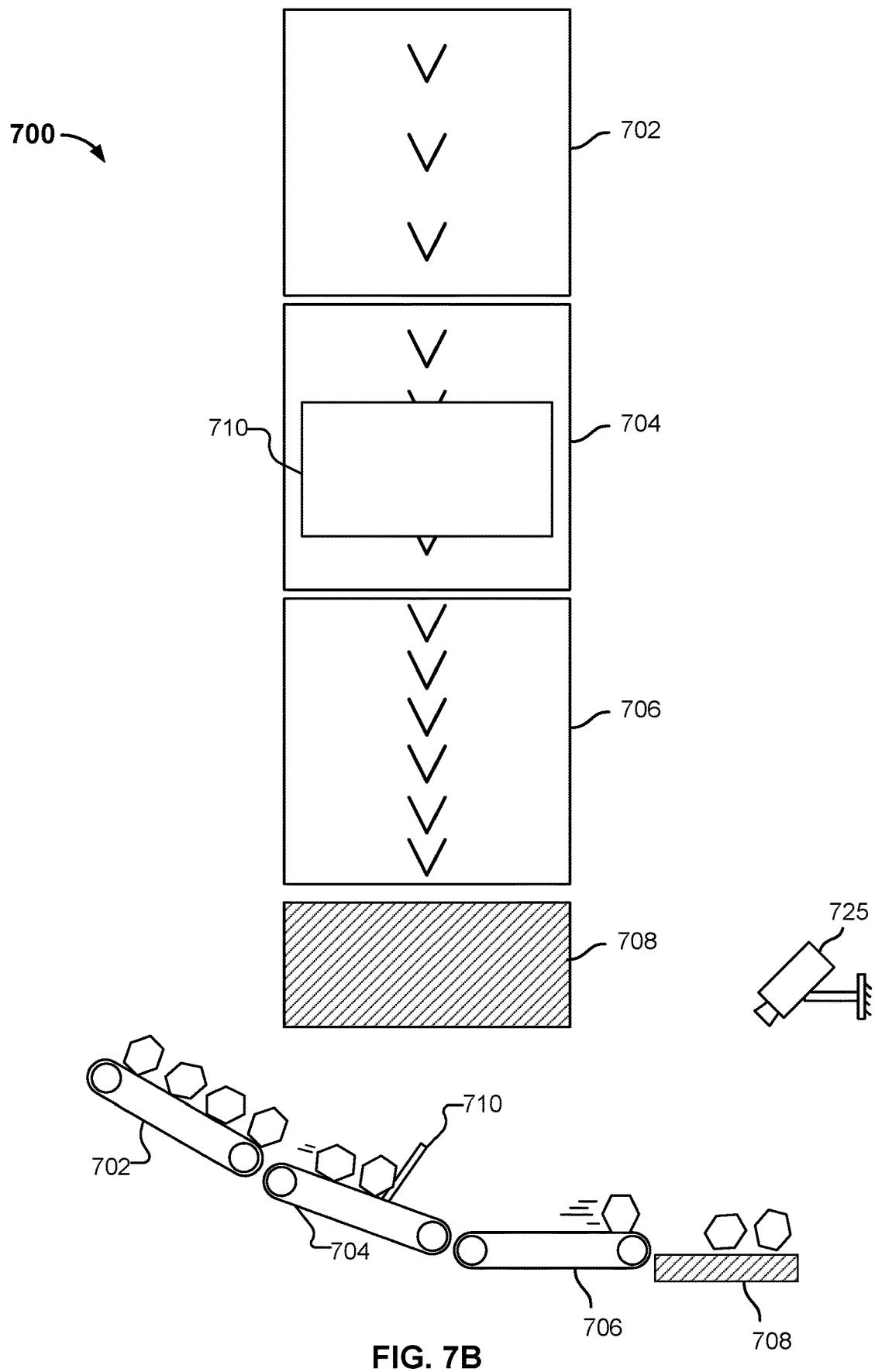
FIG. 7B is a diagram illustrating an embodiment of a robotic system to control a flow of items.

FIG. 7B is a diagram illustrating an embodiment of a robotic system to control a flow of items. In some embodiments, as illustrated in FIG. 7B, a chute may be oriented in a manner such that gravity acts on the items such as in a direction towards the workspace. In the example shown, robotic kitting system 700 includes a chute comprising a multistage conveyor comprising computer-controlled conveyor belts 702, 704, and 706, positioned and configured to deliver items to pick-up zone 708 (e.g., in the workspace of a robotic arm) for retrieval by a robotic arm and gripper (not shown). In contrast to FIG. 7A, conveyor belts 702 and 704 are not positioned to be linear with respect to conveyor belt 706. Flow disrupter 710 may be controlled to regulate flow of items (e.g., a flow of items from conveyor belts 702 and 704 to conveyor belt 706 or the workspace such as pick-up zone 708). Similar to flow disrupter 710 of FIG. 7A, flow disrupter 710 of FIG. 7B may be controlled to be positioned at different orientations (e.g., substantially flat with the chute, perpendicular to the top surface of the chute, or another acute or obtuse angle relative to the top surface of the chute) based on a type of control/regulation of flow to be implemented.

Figure 7C:
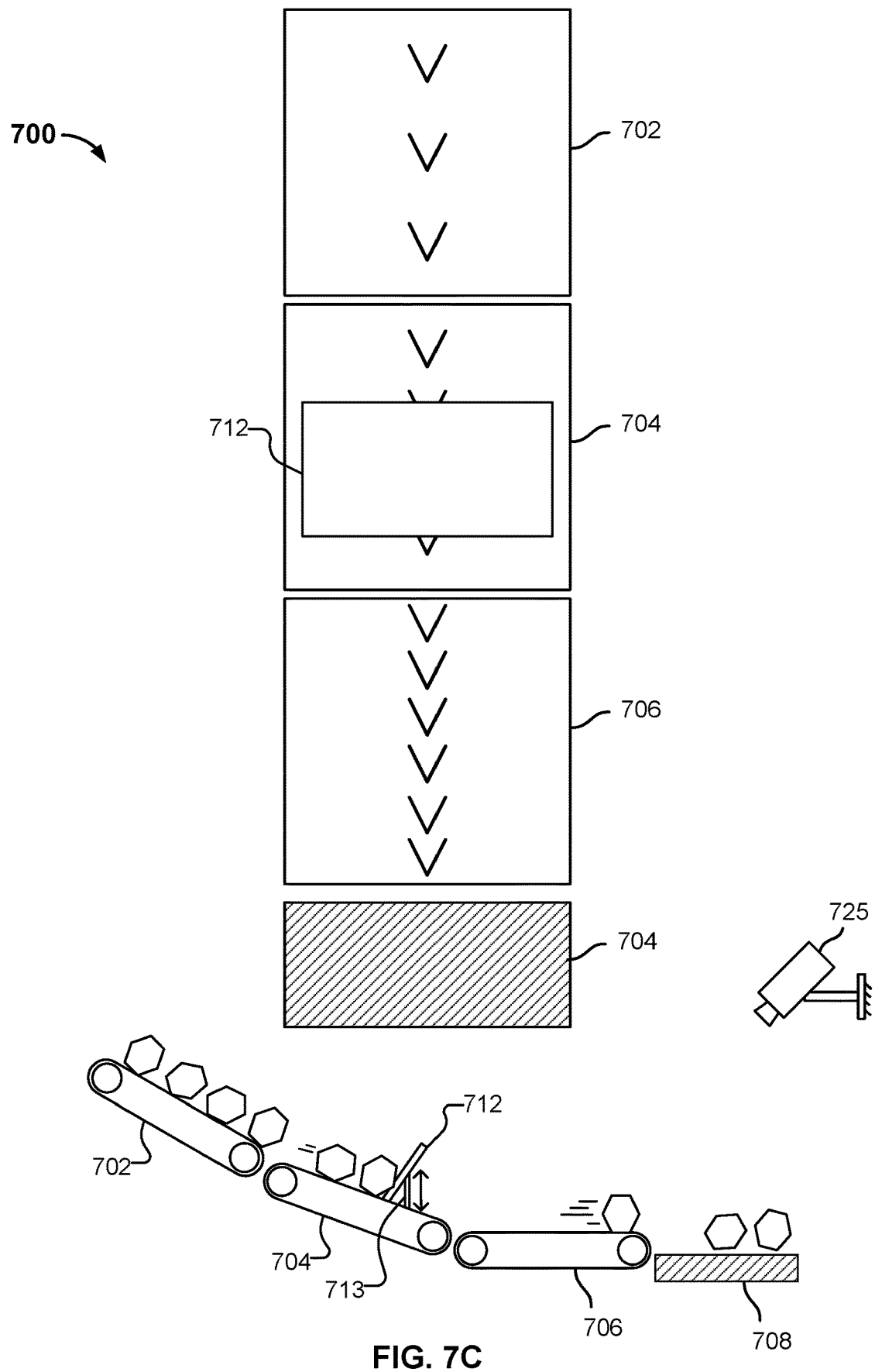
FIG. 7C is a diagram illustrating an embodiment of a robotic system to control a flow of items.

FIG. 7C is a diagram illustrating an embodiment of a robotic system to control a flow of items. According to various embodiments, the disrupter device comprises a flow disrupter and an actuation device. The actuation device may be used in connection with controlling a configuration of the flow disrupter, such as an orientation of the flow disrupter. In the example illustrated in FIG. 7C, the disrupter device comprises flow disrupter 712 and actuation device 713. The disrupter device may be comprised in the chute (e.g., at conveyor belt 704). The actuation device 713 may be a piston that is operatively connected to the flow disrupter 712, and the actuation device 713 may control a position/orientation of the flow disrupter 712 based on a received control signal/instruction (e.g., a control signal/instruction sent by a control computer of system 700). Various other types of actuation devices may be implemented to control the position/orientation of the flow disrupter 712.

Figure 7D:
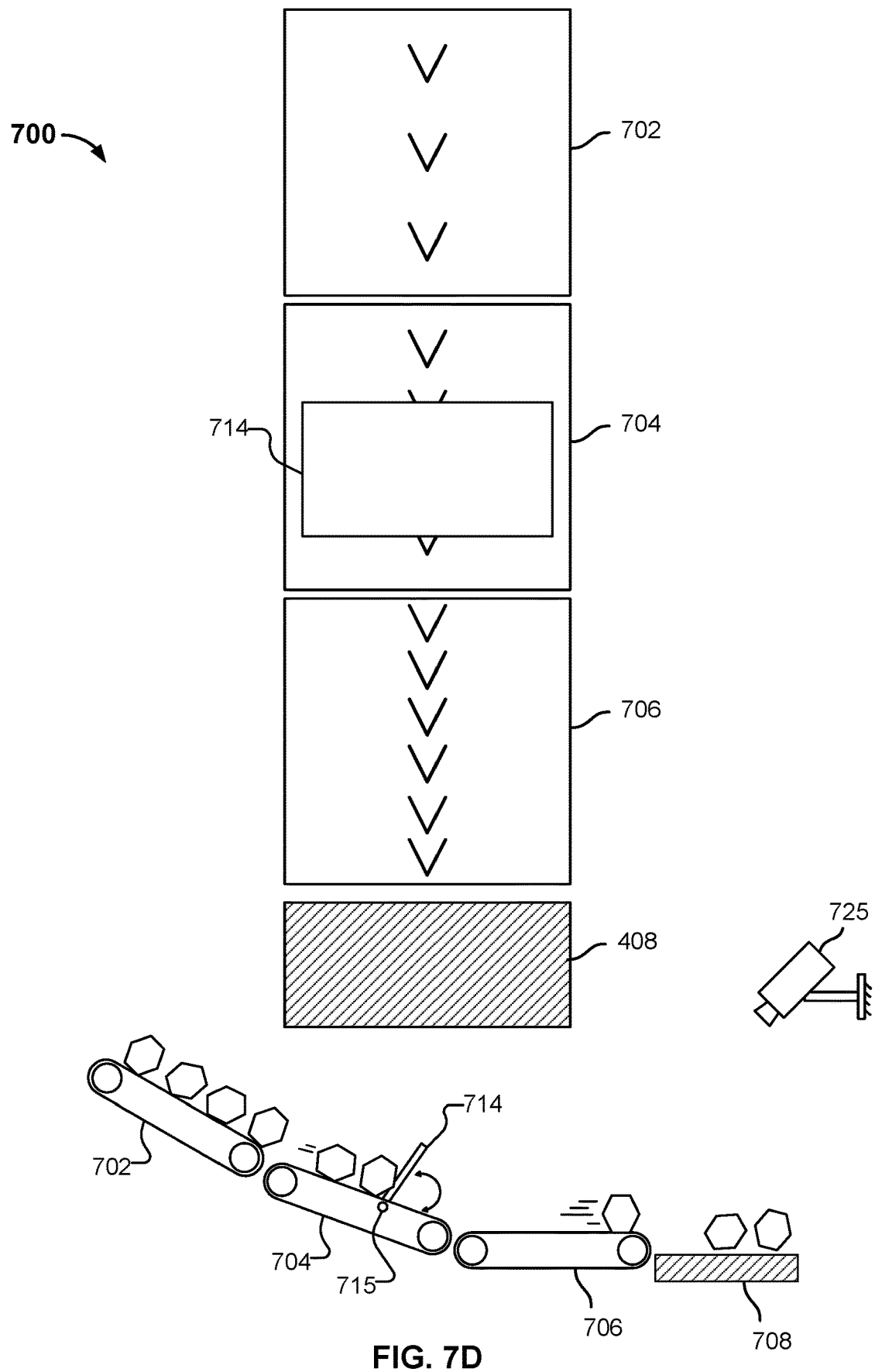
FIG. 7D is a diagram illustrating an embodiment of a robotic system to control a flow of items.

FIG. 7D is a diagram illustrating an embodiment of a robotic system to control a flow of items. According to various embodiments, the disrupter device comprises a flow disrupter and an actuation device. The actuation device may be used in connection with controlling a configuration of the flow disrupter, such as an orientation of the flow disrupter. In the example illustrated in FIG. 7D, the disrupter device comprises flow disrupter 714 and actuation device 715. The disrupter device may be comprised in the chute (e.g., at conveyor belt 704). The actuation device 715 may be a motor that is operatively connected to the flow disrupter 714, and the actuation device 715 may control a position/orientation of the flow disrupter 714 based on a received control signal/instruction (e.g., a control signal/instruction sent by a control computer of system 700). The actuation device 715 may be configured to rotate flow disrupter 714 around a defined axis such as an axis substantially defined by (or parallel to) the width of the top surface of conveyor belt 704. Various other types of actuation devices may be implemented to control the position/orientation of the flow disrupter 714.

Figure 7E:
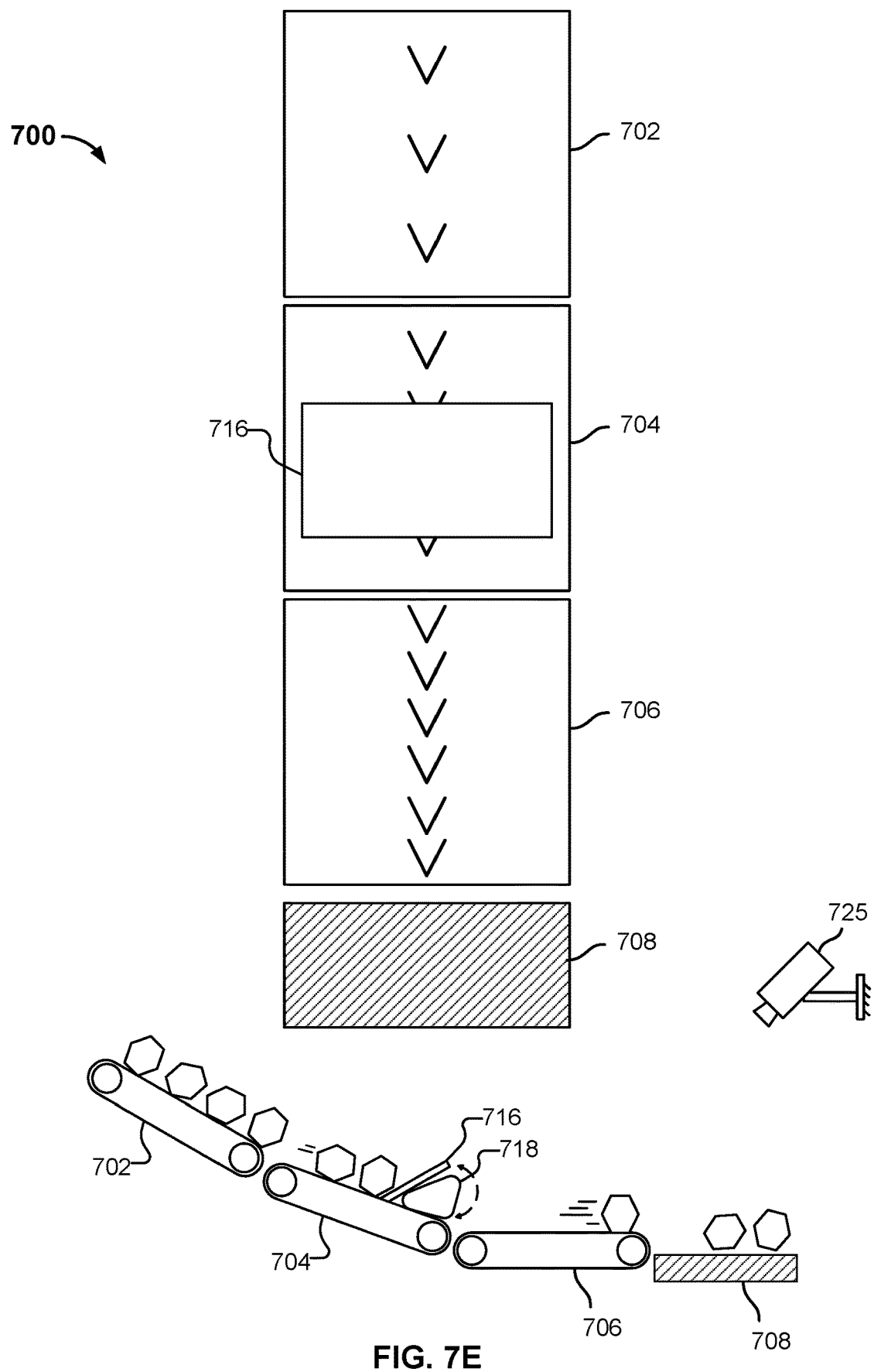
FIG. 7E is a diagram illustrating an embodiment of a robotic system to control a flow of items.

FIG. 7E is a diagram illustrating an embodiment of a robotic system to control a flow of items. According to various embodiments, the disrupter device comprises a flow disrupter and an actuation device. The actuation device may be used in connection with controlling a configuration of the flow disrupter, such as an orientation of the flow disrupter. In the example illustrated in FIG. 7E, the disrupter device comprises flow disrupter 714 and actuation device 718. The disrupter device may be comprised in the chute (e.g., at conveyor belt 704). The actuation device 718 may be a bladder that is operatively connected to the flow disrupter 716, and the actuation device 718 may control a position/ orientation of the flow disrupter 716 based on a received control signal/instruction (e.g., a control signal/instruction sent by a control computer of system 700). The actuation device 718 may be configured to rotate flow disrupter 714 around a defined axis such as an axis substantially defined by (or parallel to) the width of the top surface of conveyor belt 704. The bladder may be configured to control the position/orientation of flow disrupter 716 based at least in part on a control of the shape of the bladder. For example, the bladder 718 may comprise an inner cavity within which a fluid may be inserted/removed to change a configuration or shape of the bladder. System 700 (or more specifically, the actuation device 718) may further comprise a pump to insert/remove fluid to/from the bladder. In response to a threshold amount of fluid being inserted into the bladder, the bladder expands thereby exerting force on the flow disrupter 716. In the example shown in FIG. 7E, in response to the bladder expanding, the flow disrupter 716 pivots to impede/stop the flow of items from conveyor belt 704 to conveyor belt 706 (and the pick-up zone 708/workspace). The greater the extent the bladder is expanded the greater impediment the flow disrupter 716 is to the flow of items. Various other types of actuation devices may be implemented to control the position/orientation of the flow disrupter 716.

According to various embodiments, the flow disrupter may be oriented to partially impede flow to the flow of items. For example, the disrupter device may be controlled to vary a slope of the chute. The partial impediment to the flow of items may be used in connection with regulating flow and/or reducing the flow rate of items. For example, when the flow disrupter is positioned to partially impede the flow of items, such as flow disrupter 716 in FIG. 7E, items may flow over the flow disrupter 716 (e.g., use flow disrupter 716 as a ramp). The flow up the incline and the increased distance of travelling across the flow disrupter 716 may serve to decrease the speed and rate of the flow of items. In some embodiments, the control of the disrupter device to vary the slope of the chute (e.g., by varying the slope of the flow disrupter) may permit the system to regulate the flow rate and/or burden depth of items such as to a single layer of items on the chute and/or workspace. The control of the disrupter device to vary the slope of the chute may be used to cause the flow of items to be configured as a waterfall whereby a reduced number of items pass the flow disrupter at a time. For example, items may waterfall one-by-one over the edge of flow disrupter 716.

According to various embodiments, the disrupter device (e.g., the flow disrupter) may be actuated to iteratively cycle the flow disrupter up and down to shake items onto a downstream segment of the chute (e.g., shake items from conveyor belt 704 to conveyor belt 706). The cycling of the flow disrupter (e.g., a flap or other similar structure) up and down may singly provide items to the downstream segment or otherwise create a one layer of items (e.g., to eliminate/prevent items from being disposed/piled on one another.

Figure 8A:
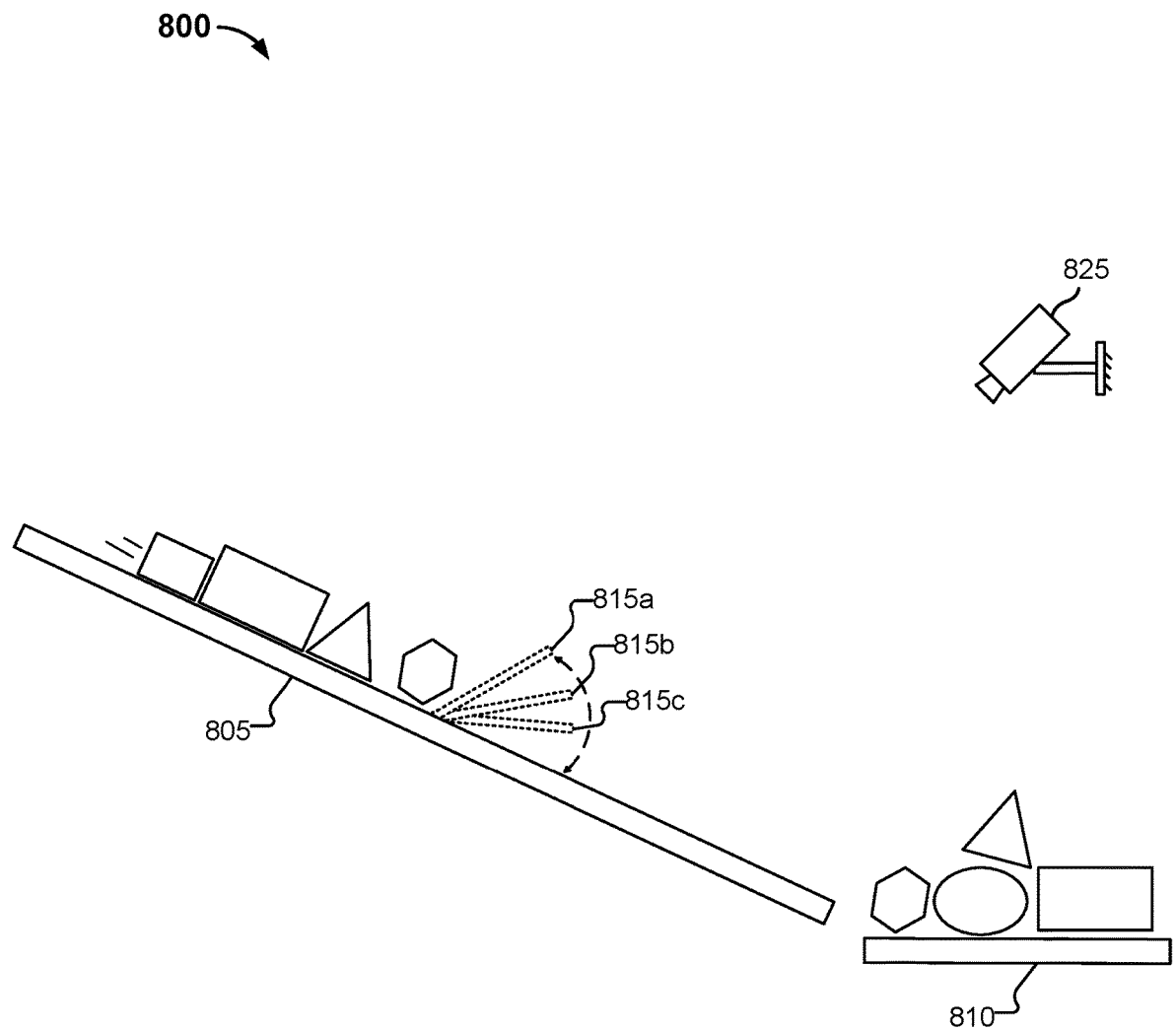
FIG. 8A is a diagram illustrating an embodiment of a robotic system to control a flow of items.

FIG. 8A is a diagram illustrating an embodiment of a robotic system to control a flow of items. In the example illustrated in FIG. 8A, system 800 comprises a chute 805 that provides items to a workspace 810, and one or more sensors such as camera 825. System 800 may comprise various sensors including one or more of a camera, an infrared sensor array, a laser array, a scale, a gyroscope, a current sensor, a voltage sensor, a power sensor, a force sensor, a pressure sensor, a weight sensor, and the like. According to various embodiments, system 800 may control/regulate flow of items from chute 805 to workspace 810. System 800 may control/regulate flow of the items based at least in part on sensor data (e.g., information obtained by the one or more sensors). System 800 may control the flow of the items from chute 805 to workspace 810 based on a control of the disrupter device. As illustrated in FIG. 8A, the disrupter device may be controlled to vary an orientation/position of a flow disrupter. The flow disrupter may be a flap or other such structure. The flow disrupter may be controlled to be positioned across varying positions such as position 815*a*, position 815*b*, and position 815*c*.

According to various embodiments, system 800 may control the flow disrupter to be oriented at a particular position based on an extent or type of control/regulation to be implemented. System 800 may store a mapping of positions of the flow disrupter to an extent or type of control/regulation of the flow of items. For example, various positions may be mapped to various speeds of the flow or profiles of the flow (e.g., permitting items to singly flow over the flow disrupter, causing the flow to be distributed as a single layer of item(s) such as without overlap or piling of items, etc.). As another example, a position of the flow disrupter may be mapped to a halting the flow of items such as if the flow disrupter is positioned to be perpendicular to the surface of the chute, or if the angle of the flow disrupter is too steep for an item to flow up/over the flow disrupter. In the example illustrated in FIG. 8A, position 815*a* of the flow disrupter may correspond to a more restrictive control/regulation of the flow if items compared to position 815*b* and position 815*c*. For example, controlling the disrupter device to orient the flow disrupter at position 815*a* may cause the speed of the flow of items and/or quantity of items in the flow that progresses to workspace 810 to be less than if the flow disrupter were in position 815*b* or position 815*c*. Similarly, controlling the disrupter device to orient the flow disrupter at position 815*b* may cause the speed of the flow of items and/or quantity of items in the flow that progresses to workspace 810 to be less than if the flow disrupter were in oriented position 815*c*.

System 800 may further comprise a robotic arm (not shown) that moves the items from the workspace 810 to a destination location. In the context of a system that singulates items from the workspace 810, the destination location may be a segmented conveyor or a tray on a conveyor, etc. In the context of a system that kits items from workspace 810, the items on the workspace 810 may be further routed/conveyed to a kitting shelf system such as to a feeder portion to a kitting shelf system. In the context of a system that palletizes the items, the destination location may be a pallet (e.g., the workspace 810 may be an area from which the robotic arm picks the items, or the workspace 810 may be a conveyor that further conveys the items to within range of the robotic arm).

In various embodiments, system 800 may control the disrupter device based at least in part data associated with a plurality within the workspace 810. The data associated with a plurality within the workspace 810 may correspond to, or be obtained based on, sensor data. The sensor data may be obtained based at least in part on information obtained by one or more sensors in system 800 such as a sensor(s) within proximity of workspace 810 (e.g., camera 825). In some embodiments, system 800 determines (e.g., generates) a model of the workspace, including a model of the plurality of items within workspace 810. The model may include information pertaining to one or more items within the workspace 810, information pertaining to the robotic arm, etc. The information pertaining to one or more items may include one or more attributes of at least one item (e.g., a size, shape, identifier, barcode, expected weight, expected center of gravity, type of packaging, etc.), a position of at least one item (e.g., a position relative to the workspace, a position relative to another item(s), etc.), a boundary or edge of at least one item, etc. System 800 may determine a characteristic/property associated with an item in the workspace 810, a set of items in the workspace 810, and/or a pile of items in the workspace 810. For example, system 800 may determine one or more of a density of items on at least part of workspace 810, a depth of items on at least part of the workspace 810 (e.g., an indication of whether an item is on top of another item, or whether an item at least partially occludes another item on the workspace, etc.), a stability of a set of items on the workspace (e.g., a stability of a pile of items in the workspace), a spacing between a set of items, an amount of empty space or space available for a further item(s), an expected number of items that may be added to the workspace before a threshold associated with the workspace (e.g., a threshold associated with one or more of the foregoing characteristics of the workspace and/or item(s) in the workspace), etc. System 800 may store one or more predefined thresholds associated with a characteristic/property associated with the workspace 810, an item in the workspace 810, a set of items in the workspace 810, and/or a pile of items in the workspace 810. For example, system 800 may store one or more predefined thresholds respectively associated with the foregoing characteristics/properties (e.g., density, spacing, and/or quantity of items, space available for further items, expected further/additional items that may be introduced to the workspace, etc.).

According to various embodiments, system 800 may determine to control the flow of items (e.g., control the disrupter device) based at least in part the sensor data and/or one or more threshold associated with a characteristic/property associated with the workspace and/or one or more items within the workspace. The determination to control the flow of items may be based on a determination that a flow regulation condition has been satisfied (e.g., one of the one or more threshold associated with a characteristic/property associated with the workspace and/or one or more items within the workspace being satisfied, such as the threshold being exceeded, etc.). For example, in response to determining that a density of items in the workspace exceeds a threshold density value, system 800 may determine to control the flow of items (e.g., to at least temporarily halt or otherwise slow the flow of items). A flow regulation condition may exist for as long as the density of items exceeds the threshold density value. As another example, in response to determining that the workspace has space available for a certain number of items, system 800 may control the disrupter device to regulate the flow of items (e.g., to permit the certain number of items to pass the flow disrupter and thereafter halt the flow of the items until additional space clears, to slow the flow of items such as to permit the robotic arm to reduce the number of items in the workspace or to clear additional space for more items, etc.). A flow regulation condition may exist for as long as space is still available for additional items to be introduced to the workspace, or for as long as space available is greater than a threshold space value, or smaller than threshold space value, as applicable. In some embodiments, in response to a determination that a flow regulation condition has cleared (e.g., no longer exists), system 800 may determine to change the control of the flow of items such as cease the control of the flow of items that was implemented in response to the flow regulation condition occurring, etc.

Figure 8B:
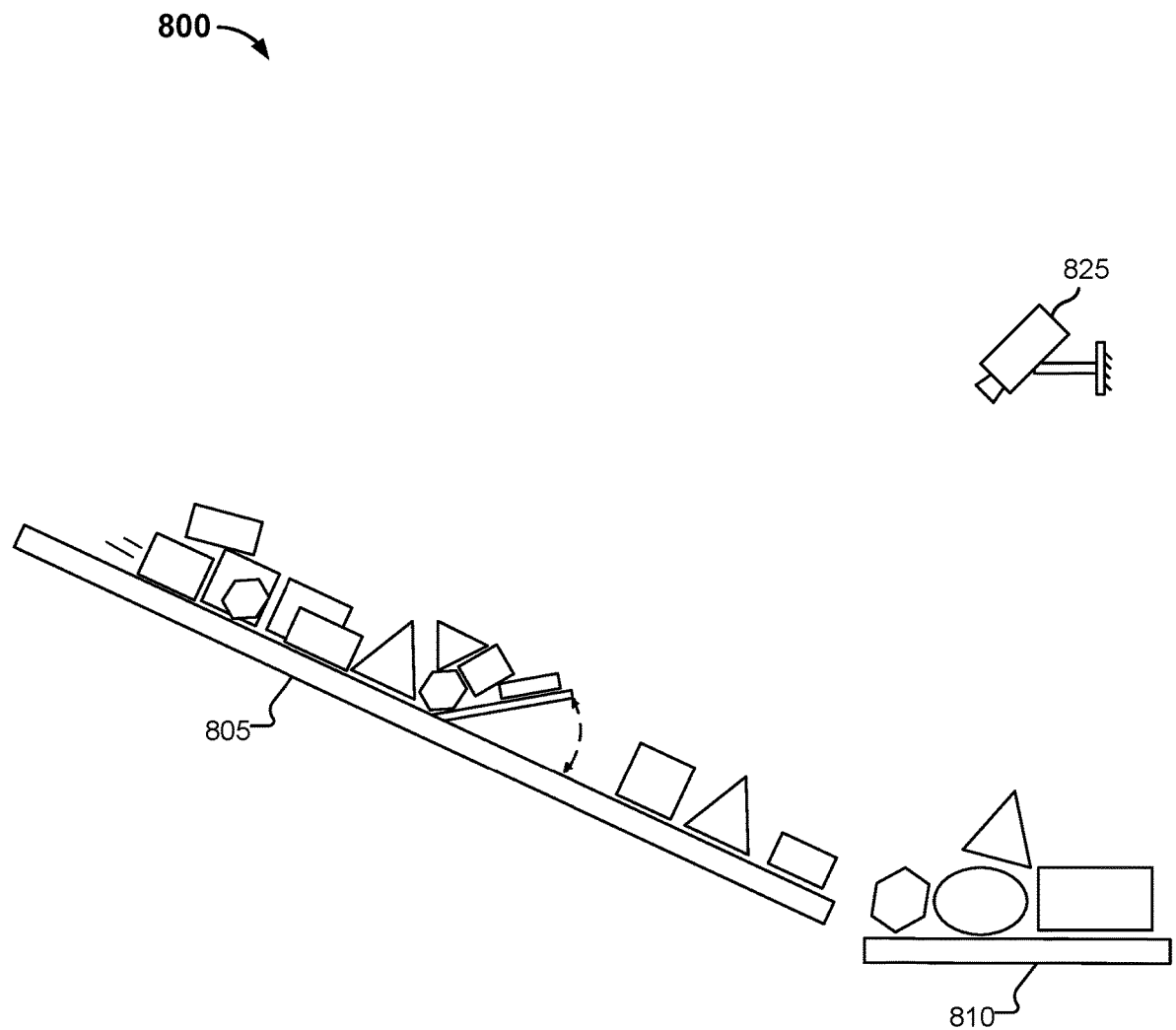
FIG. 8B is a diagram illustrating an embodiment of a robotic system to control a flow of items.

FIG. 8B is a diagram illustrating an embodiment of a robotic system to control a flow of items. In the example illustrated in FIG. 8B, system 800 may control/regulate the flow of items from chute 805 to workspace 810.

According to various embodiments, system 800 may control the flow disrupter to singly distribute items on the chute (e.g., into cause items to be singly provided to the workspace 810). System 800 may control a pitch of the flow disrupter in a manner to cause the items to be so singly distributed. For example, as illustrated in FIG. 8B, upstream of the flow disrupter, several items are densely distributed on chute 805. The densely distributed items upstream of the flow disrupter may have items overlapping one another, items piled on each other, etc. However, downstream of the flow disrupter, the items are carried down the chute in a less densely distributed manner (e.g., the distribution of the items may be such that the items are singly placed on the chute, or are singly provided to the workspace, etc.).

According to various embodiments, the flow of the items on chute 805 may be controlled based on raising the flow disrupter (e.g., a flapper) such as by increasing a pitch of the flow disrupter. In the unimpeded state, the flow disrupter may be substantially flush with chute 805, and when system 800 is controlling the flow based on actuation of the flow disrupter, the flow disrupter is raised in a manner that at least part of the flow disrupter is no longer flush with the surface of the chute on which items flow.

The flow of items on the chute 805 may be controlled to cause a waterfall of items that flow over an edge of the flow disrupter. For example, the waterfall of items may be controlled so that items are singly distributed on a part of chute 805 downstream from the flow disrupter (e.g., to singly convey/provide the items to workspace 810). The singly distributed items may make grasping of the corresponding items (e.g., by a robot) easier in the workspace/pickup area. In some embodiments, the flow disrupter is actuated to move the flow disrupter up and down (e.g., to vary a pitch of the flow disrupter such as cycling from a relatively low pitch of the flow disrupter to a relatively high pitch of the flow disrupter, etc.). The flow disrupter may be cycled up/down to effectively shake the items onto a downstream segment of the chute, such as in a manner that items are one-by-one distributed to the downstream segment, or otherwise at a rate that cause a one-layer distribution of items at the downstream segment (e.g., to prevent items from overlapping or otherwise resting on one another).

Figure 9A:
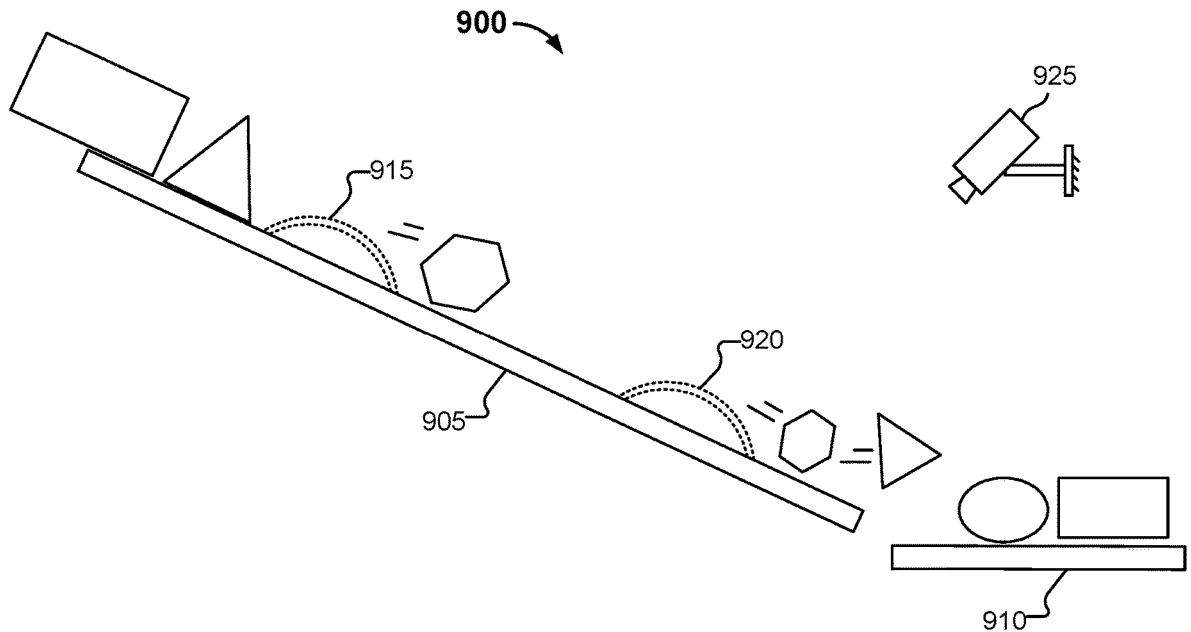
FIG. 9A is a diagram illustrating an embodiment of a robotic system to control a flow of items.
Figure 9B:
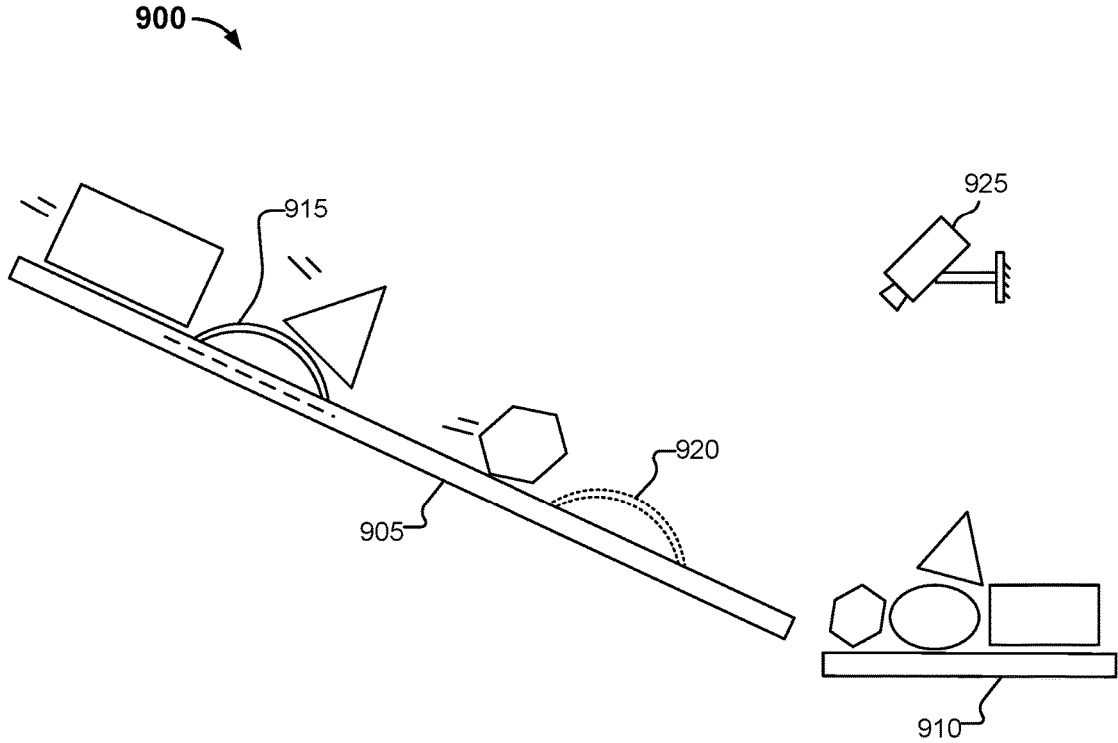
FIG. 9B is a diagram illustrating an embodiment of a robotic system to control a flow of items.

FIG. 9A is a diagram illustrating an embodiment of a robotic system to control a flow of items. FIG. 9B is a diagram illustrating an embodiment of a robotic system to control a flow of items. In the examples illustrated in FIG. 9A and FIG. 9B, system 900 comprises a chute 905 that provides items to a workspace 910, and one or more sensors such as camera 925. System 900 may comprise various sensors including one or more of a camera, an infrared sensor array, a laser array, a scale, a gyroscope, a current sensor, a voltage sensor, a power sensor, a force sensor, a pressure sensor, a weight sensor, and the like. According to various embodiments, system 900 may control/regulate flow of items from chute 905 to workspace 910. System 900 may control/regulate flow of the items based at least in part on sensor data (e.g., information obtained by the one or more sensors). System 900 may control the flow of the items from chute 905 to workspace 910 based on a control of the disrupter device. As illustrated in FIG. 9A, the disrupter device may be controlled to vary an orientation/position of a flow disrupter. The flow disrupter may be a bladder or other such structure that may be integrated into the surface of chute 905.

In various embodiments, the system may comprise a plurality of flow disrupters. In some implementations, a single disrupter device controls a single flow disrupter, and in other implementations, a single disrupter device may control a plurality of flow disrupters. As illustrated in FIG. 9A, system 900 may comprise flow disrupter 915 and/or flow disrupter 920. Additional flow disrupters may be implemented. Flow disrupter 915 and flow disrupter 920 may be bladders that may be respectively integrated with chute 905.

In some embodiments, flow in a chute is regulated by system 900 via robotic control of a series of bladders positioned in (e.g., integrated with) the chute 905. One or more of the series of bladders are inflated and deflated, as sensed conditions indicate. The inflating/deflating of the series of bladders may create a reduced slope in some areas and an increased slope in other areas. The varying of the slopes of the series of bladders (e.g., of the chute), or parts of bladders, controls the flow of items such as reducing, increasing, or unjamming the flow of items within the chute, as needed.

According to various embodiments, the system dynamically controls the flow of items based on sensed conditions. For example, the system obtains the sensor data and dynamically determines whether to (and how to) control the flow of items at the chute. In response to the system determining to control the flow of items at the chute, the system may implement a determined control (e.g., based on a determined plan to control the flow of items), and the system may monitor a state of the workspace and/or items within the workspace and determine whether to (and how to) update the control of the flow of items, and the system may implement the update. The system may iteratively and/or continuously update the control of the flow of items based at least in part on the sensor data (e.g., a state of the workspace). The system may additionally, or alternatively, control the flow of items based at least in part on sensor data associated with the chute and/or items within the chute.

According to various embodiments, the system uses sensor feedback (e.g., updated monitoring of the sensor data and/or state of the workspace) in connection with controlling the flow of items. The system may control the flow of items/adjust the control of the flow of items based at least in part on items within the workspace and/or chute (e.g., a type of item, a weight of the item, a rigidity of the item, a type of packing, an indication of whether the item is fragile, etc.), a flow volume, a flow velocity, a flow rate, a burden depth, etc. The items within the workspace and/or chute (e.g., a type of item, a weight of the item, a rigidity of the item, a type of packing, an indication of whether the item is fragile, etc.), a flow volume, a flow velocity, a flow rate, a burden depth, etc. may be determined based on a computer vision (e.g., based on image data captured by a camera), and/or other sensor data.

As illustrated in FIG. 9A, flow disrupter 915 and flow disrupter are illustrated hashed lines, which denote that the bladders are deflated and at least substantially level with chute 905. However, as illustrated in FIG. 9B, flow disrupter is illustrated with a solid line, which denotes that the corresponding bladder is inflated. The flow of items is correspondingly impeded by flow disrupter 915. System 900 may determine to inflate the bladder corresponding to flow disrupter 915 in response determining that the workspace 910, or items within workspace 910, satisfies flow regulation condition. For example, as illustrated in FIG. 9A and FIG. 9B, the workspace 910 of FIG. 9B is denser, has a greater number of items, has less room available for additional items, and is less stable because of the burden depth (e.g., the triangle item stacked on the oval item).

According to various embodiments, system 900 may control the flow disrupter to be oriented at a particular configuration (e.g., inflated, deflated, or an extent in which the bladder is inflated) based on an extent or type of control/regulation to be implemented. System 900 may store a mapping of configurations of the flow disrupter to an extent or type of control/regulation of the flow of items. For example, various configurations (e.g., various degrees of inflation) may be mapped to various speeds of the flow or profiles of the flow (e.g., permitting items to singly flow over the flow disrupter, causing the flow to be distributed as a single layer of item(s) such as without overlap or piling of items, etc.). As another example, a configuration of the flow disrupter may be mapped to a halting the flow of items such as if the flow disrupter is positioned to be perpendicular to the surface of the inflated completely or beyond a threshold inflation value, or if the angle of the flow disrupter is too steep for an item to flow up/over the flow disrupter.

System 900 may further comprise a robotic arm (not shown) that moves the items from the workspace 910 to a destination location. In the context of a system that singulates items from the workspace 910, the destination location may be a segmented conveyor or a tray on a conveyor, etc. In the context of a system that kits items from workspace 910, the items on the workspace 910 may be further routed/conveyed to a kitting shelf system such as to a feeder portion to a kitting shelf system. In the context of a system that palletizes the items, the destination location may be a pallet (e.g., the workspace 910 may be an area from which the robotic arm picks the items, or the workspace 910 may be a conveyor that further conveys the items to within range of the robotic arm).

In various embodiments, system 900 may control the disrupter device based at least in part data associated with a plurality within the workspace 910, and update the control to the disrupter device based on updated information or feedback from one or more sensors. The data associated with a plurality within the workspace 910 may correspond to, or be obtained based on, sensor data. The sensor data may be obtained based at least in part on information obtained by one or more sensors in system 900 such as a sensor(s) within proximity of workspace 910 (e.g., camera 925). In some embodiments, system 900 determines (e.g., generates) a model of the workspace, including a model of the plurality of items within workspace 910. The model may include information pertaining to one or more items within the workspace 910, information pertaining to the robotic arm, etc. The information pertaining to one or more items may include one or more attributes of at least one item (e.g., a size, shape, identifier, barcode, expected weight, expected center of gravity, type of packaging, etc.), a position of at least one item (e.g., a position relative to the workspace, a position relative to another item(s), etc.), a boundary or edge of at least one item, etc. System 900 may determine a characteristic/property associated with an item in the workspace 910, a set of items in the workspace 910, and/or a pile of items in the workspace 910. For example, system 900 may determine one or more of a density of items on at least part of workspace 910, a depth of items on at least part of the workspace 910 (e.g., an indication of whether an item is on top of another item, or whether an item at least partially occludes another item on the workspace, etc.), a stability of a set of items on the workspace (e.g., a stability of a pile of items in the workspace), a spacing between a set of items, an amount of empty space or space available for a further item(s), an expected number of items that may be added to the workspace before a threshold associated with the workspace (e.g., a threshold associated with one or more of the foregoing characteristics of the workspace and/or item(s) in the workspace), etc. System 900 may store one or more predefined thresholds associated with a characteristic/property associated with the workspace 910, an item in the workspace 910, a set of items in the workspace 910, and/or a pile of items in the workspace 910. For example, system 900 may store one or more predefined thresholds respectively associated with the foregoing characteristics/properties (e.g., density, spacing, and/or quantity of items, space available for further items, expected further/additional items that may be introduced to the workspace, etc.).

Figure 10A:
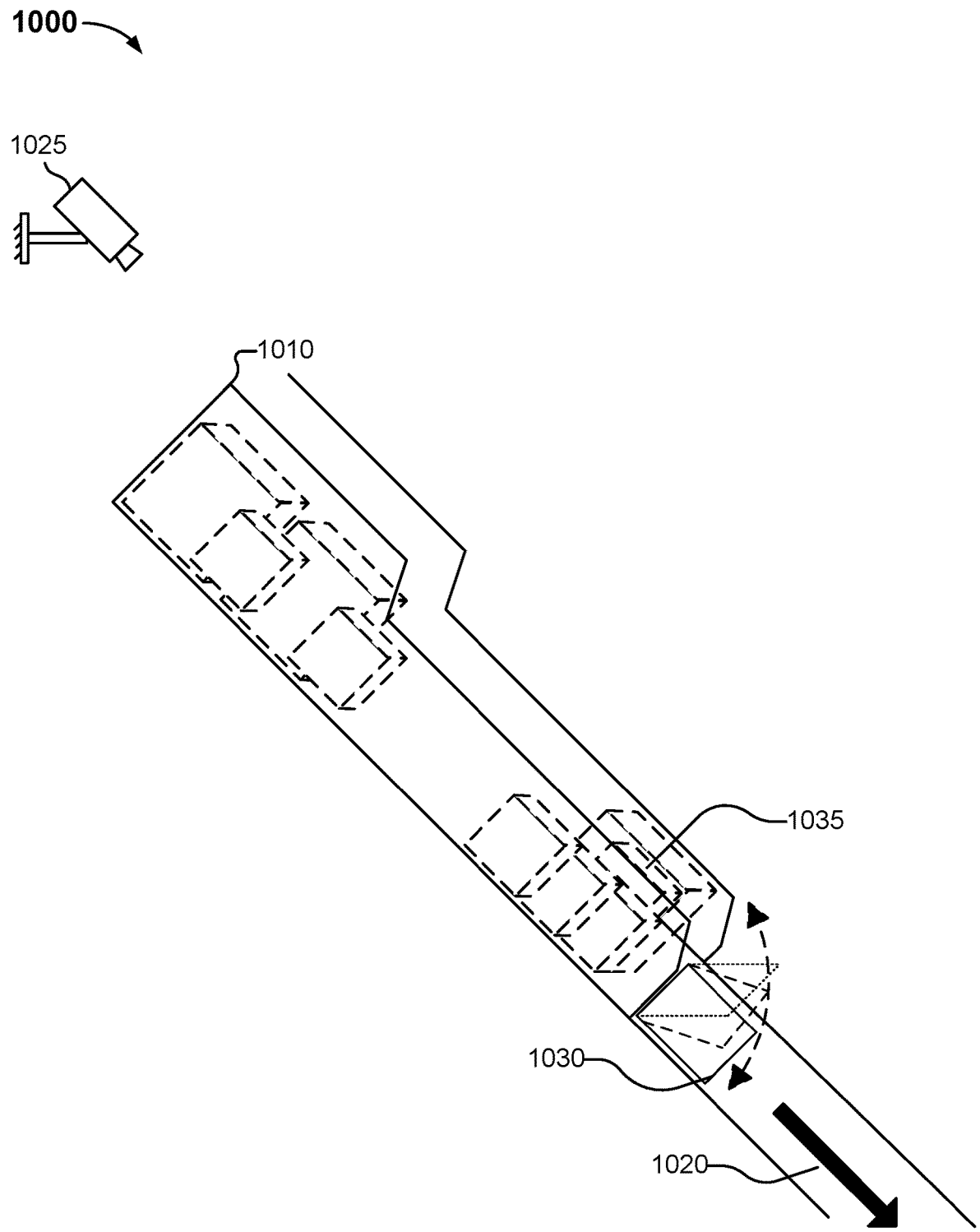
FIG. 10A is a diagram illustrating an embodiment of a robotic system to control a flow of items.
Figure 10B:
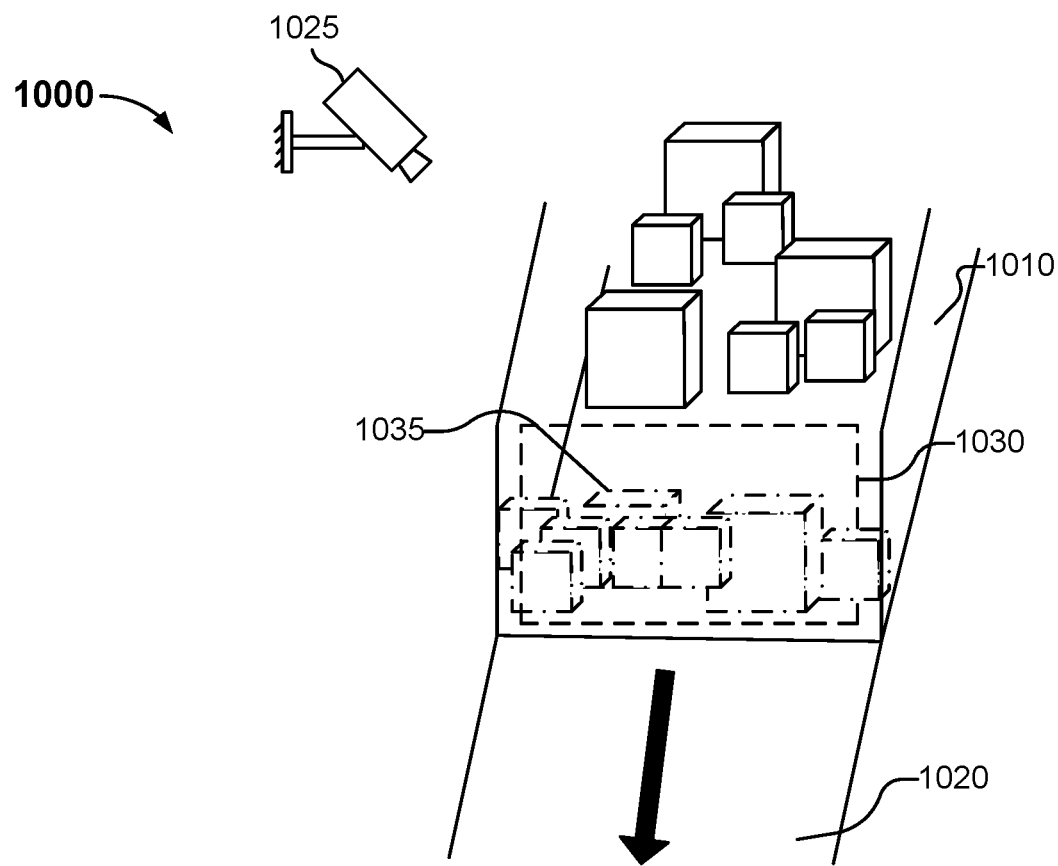
FIG. 10B is a diagram illustrating an embodiment of a robotic system to control a flow of items.

FIG. 10A is a diagram illustrating an embodiment of a robotic system to control a flow of items. FIG. 10B is a diagram illustrating an embodiment of a robotic system to control a flow of items. In the example illustrated in FIG. 10A, system 1000 comprises a first chute component 1010, a second chute component 1020, and a flow disrupter 1030. The items may flow through the chute from the first chute component 1010 to the second chute component 1020 as the items are provided to the workspace (not shown) and/or robotic arm (not shown).

As items flow through the chute, the items may be become jammed within the chute, as illustrated by 1035 in FIG. 10A and FIG. 10B. For example, in the cases of a chute that funnels items, the items may become jammed between the walls of the chute. Accordingly, the flow if items through the chute and/or to the workspace may be impeded by the jamming of items 1035. In response to determining that items in the chute are jammed, system 1000 may robotically control flow disrupter 1030 to attempt to clear the jam. In some embodiments, system 1000 controls the flow disrupter 1030 to move to apply force on one or more of the items in attempt to dislodge the jam of items.

According to various embodiments, in response to determining that the flow of items is to be controlled (e.g., that the flow disrupter is to be used to dislodge a jam of items), system 1000 (e.g., a control computer of the system) determines a strategy for controlling the flow and/or implements the strategy for controlling the flow. The strategy for controlling the flow may include moving the flow disrupter 1030 to a position to apply force on the jammed items in attempt to dislodge the items. In some implementations, the strategy for controlling the flow includes iteratively moving, or cycling, the flow disrupter 1030 back and forth in attempt to dislodge the items. System 1000 may continue to update the strategy or determine new strategies for controlling the flow, or to dislodge the items, until the items are dislodged and/or the flow of items is normalized (or consistent with an expected flow). If system 1000 determines that a predefined number of attempts to dislodge the items has been implemented and/or that the system has no further strategies for controlling the flow, system 1000 may alert a human operator (e.g., by sending a notification to a terminal such as a teleoperation device).

According to various embodiments, system 1000 comprises one or more sensors such as camera 1025. The one or more sensors may be disposed in or around the workspace and/or in or around the chute. System 1000 may comprise various sensors including one or more of a camera, an infrared sensor array, a laser array, a scale, a gyroscope, a current sensor, a voltage sensor, a power sensor, a force sensor, a pressure sensor, a weight sensor, and the like. The one or more sensors may obtain information pertaining to a state of the workspace, a state of the chute, one or more items within the workspace, and/or one or more items within the chute. System 1000 may determine a model of the chute (e.g., items within the chute) and/or a model of the workspace (e.g., items within the workspace) based at least in part on the information obtained by the one or more sensors. According to various embodiments, system 1000 may control/regulate flow of items from chute to workspace. System 1000 may control/regulate flow of the items based at least in part on sensor data (e.g., information obtained by the one or more sensors). System 1000 may control the flow of the items from the chute to the workspace based on a control of the disrupter device (e.g., flow disrupter 1030). As illustrated in FIG. 10A and FIG. 10B, the disrupter device may be controlled to vary an orientation/position of a flow disrupter 1030. The flow disrupter may be a flap or other such structure. The flow disrupter may be controlled to be positioned across varying positions.

System 1000 may determine that the items are jammed and/or that the system is to implement a plan to dislodge the items in connection with controlling the flow based at least in part on the sensor data. The sensor data may include information pertaining to the workspace and/or items within the workspace. For example the sensor data my include an image of the workspace, or information from which system 1000 may determine one or more properties of one or more items within the workspace/chute, determine a density of items within the chute/workspace, a quantity of items in the workspace, an indication of whether a threshold number of items are occulated, a likelihood that a threshold number of items can/cannot be grasped, a flow rate of items to the workspace, a flow volume of items to the workspace, a flow velocity of items to the workspace, an attribute of one or more items (e.g., in the workspace or the chute), a position of at least one item, a boundary or edge of at least one item, a depth of items on at least part of the workspace 810 (e.g., an indication of whether an item is on top of another item, or whether an item at least partially occludes another item on the workspace, etc.), a stability of a set of items on the workspace (e.g., a stability of a pile of items in the workspace), a spacing between a set of items, an amount of empty space or space available for a further item(s), an expected number of items that may be added to the workspace before a threshold associated with the workspace (e.g., a threshold associated with one or more of the foregoing characteristics of the workspace and/or item(s) in the workspace), etc. The attributes of an item may include a size, shape, identifier, barcode, expected weight, expected center of gravity, type of packaging, a rigidity of the item, a fragility of the item, etc. The attribute of the item may be obtained based at least in part on attributes mapped to an identifier on the item, and in response to the identifier being obtained from the item such as via an image of the item, or a scanning of the identifier on the item.

System 1000 may store one or more predefined thresholds associated with a characteristic/property associated with the workspace, an item in the workspace, a set of items in the workspace, and/or a pile of items in the workspace, an item within the chute, a set of items within the chute, etc. For example, system 1000 may store one or more predefined thresholds respectively associated with the foregoing characteristics/properties (e.g., density, spacing, and/or quantity of items, space available for further items, expected further/additional items that may be introduced to the workspace, etc.).

According to various embodiments, system 1000 may determine to control the flow of items (e.g., control the disrupter device) based at least in part the sensor data and/or one or more threshold associated with a characteristic/property associated with the workspace, one or more items within the workspace, a characteristic/property associated with the chute, and/or one or more items within the chute. The determination to control the flow of items may be based on a determination that a flow regulation condition has been satisfied (e.g., one of the one or more threshold associated with a characteristic/property associated with the workspace and/or one or more items within the workspace being satisfied, such as the threshold being exceeded, etc.). For example, in response to determining that a density of items in the workspace is lower than a threshold density value, system 800 may determine to control the flow of items (e.g., to at least temporarily increase the flow item items at the chute, or to clear a jam of items). A flow regulation condition may exist for as long as the density of items exceeds the threshold density value. As another example, in response to determining that the workspace has space available for a number of items that exceeds a threshold number of items, system 1000 may control the disrupter device to regulate the flow of items. A flow regulation condition may exist for as long as space is still available for additional items to be introduced to the workspace, or for as long as space available is greater than a threshold space value, etc. In some embodiments, in response to a determination that a flow regulation condition has cleared (e.g., no longer exists), system 1000 may determine to change the control of the flow of items such as cease the control of the flow of items that was implemented in response to the flow regulation condition occurring, etc.

System 1000 may determine that items 1035 are jammed at the chute based at least in part on a flow velocity of items to/within the workspace, a flow rate of items to/within the workspace, a number of items in the workspace, etc. For example, system 1000 may determine that items are being provided to the workspace less frequently or in less quantity than system 1000 expects under normal operation of the chute or flow of the items. As other example, system 1000 may determine that the items within the chute are jammed based on image data associated with the chute. For example, system 1000 may model information obtained by sensors associated with the chute and determine that a set of items are not moving within the chute, or that the flow of items is less than an expected or threshold flow of items. In response to determining that items 1035 are jammed, system 1000 may determine to control the flow of items, such as by controlling flow disrupter 1030 to dislodge the jamming of the items and/or to normalize flow of items.

Figure 11:
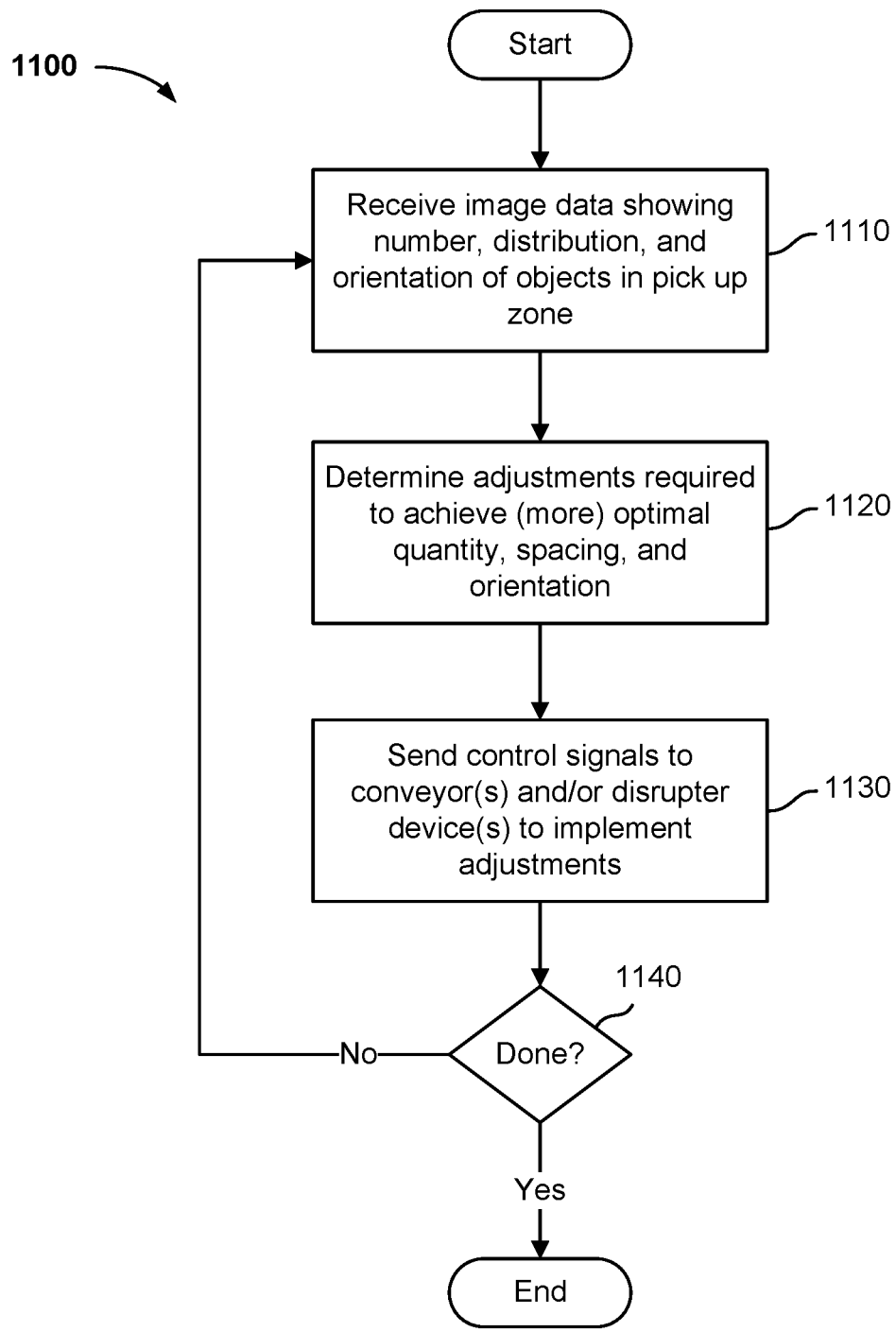
FIG. 11 is a flow chart illustrating an embodiment of a process to control a flow of items.

FIG. 11 is a flow chart illustrating an embodiment of a process to control a flow of items. In various embodiments, the process 1100 of FIG. 11 is implemented by a computer or other processor configured to control a robotic system as disclosed herein, such as control computer 124 in the example shown in FIG. 1, control computer 212 of FIG. 2A, etc. In some embodiments, for example, the process of FIG. 11 is implemented by a processor comprising or otherwise associated with a robotic kitting system, a robotic singulation system, a robotic palletization/depalletization process, etc.

In the example shown in FIG. 11, image data showing a number, distribution, and orientation of objects in a pick-up zone is received (1110). For example, a camera comprising and/or otherwise associated with a robotic system as disclosed herein may have generated and provided the image data to the processor. In various embodiments, data from one or more other and/or different sensors may be received, for example and without limitation data from one or more other cameras providing image data from other than the pick-up zone (e.g., from conveyors or other structures configured to deliver items to the pick-up zone), weight sensors, pressure sensors, LIDAR, infrared sensors, RF sensors, optical sensors, contact switches or sensors, etc. may be received and processed.

Adjustments to achieve a (more) optimal quantity, spacing, and orientation of items in the pick-up zone (1120). In various embodiments, the adjustments are determined without human intervention, e.g., based on a machine learning-generated model by which the processor has been configured to determine adjustments to achieve a (more) optimal quantity, spacing, and orientation of items in the pick-up zone based on image and other sensor data showing a current state and/or context. In some embodiments, context data such as a current set of kitting requirements (e.g., invoices, orders, etc. currently being fulfilled) is taken into consideration, for example to anticipate upcoming needs as to which items and which quantities are anticipated to be required to be available to be retrieved from the pick-up zone. In various embodiments, adjustments may include starting/stopping feed mechanisms, such as conveyor belts, powered rollers, etc.; increasing/decreasing the speed of operation of feed mechanisms; adjusting mechanism provided to disrupt or alter the trajectory of items being translated to the pick-up zone or workspace (e.g., flow disrupters 710, 712, 714, 716, 915, and 920); etc.

In some embodiments, adjustments are determined based at least in part on the strategies determined to be available to retrieve items from the pick-up zone/workspace. If no or limited strategies are determined to be available based on a current state of items in the pick-up zone, adjustments expected (e.g. based on machine learning, a programmed model, etc.) to alter the conditions to (potentially) make (more) strategies available to retrieve items without human intervention are determined and implemented.

Control signals to implement the determined adjustments are sent to conveyance and/or disruption devices, as applicable (1130). For example, conveyor belts, powered rollers, etc. may be started or stopped, or increased or decreased in speed. Or, disrupter devices such as flow disrupters 710, 712, 714, 716, 915, and 920 may be repositioned or dynamically adjusted, etc.

Image or other sensor data continues to be monitored (1130) and further adjustments determined and implemented (1120, 1130) as the robotic operation of moving items from the pick-up zone or workspace continues (1140). Once the operation of moving items from the pick-up zone or workspace is done (1140), the process ends.

In some embodiments, if an adjustment cannot be determined to provide a strategy to retrieve items from the pick-up zone through automated processing a prompt or other action to obtain human intervention is generated. For example, conveyance structures and/or disruptor devices may be operated by a human operator, such as through teleoperation, to provide the quantity, spacing, or orientation required to retrieve items from the pick-up zone, or a human operator may operate a robotic arm/gripper to move items around in the pick-up zone, or a human operator in the vicinity may physically rearrange items to provide a context in which fully automated operation may resume.

Figure 12:
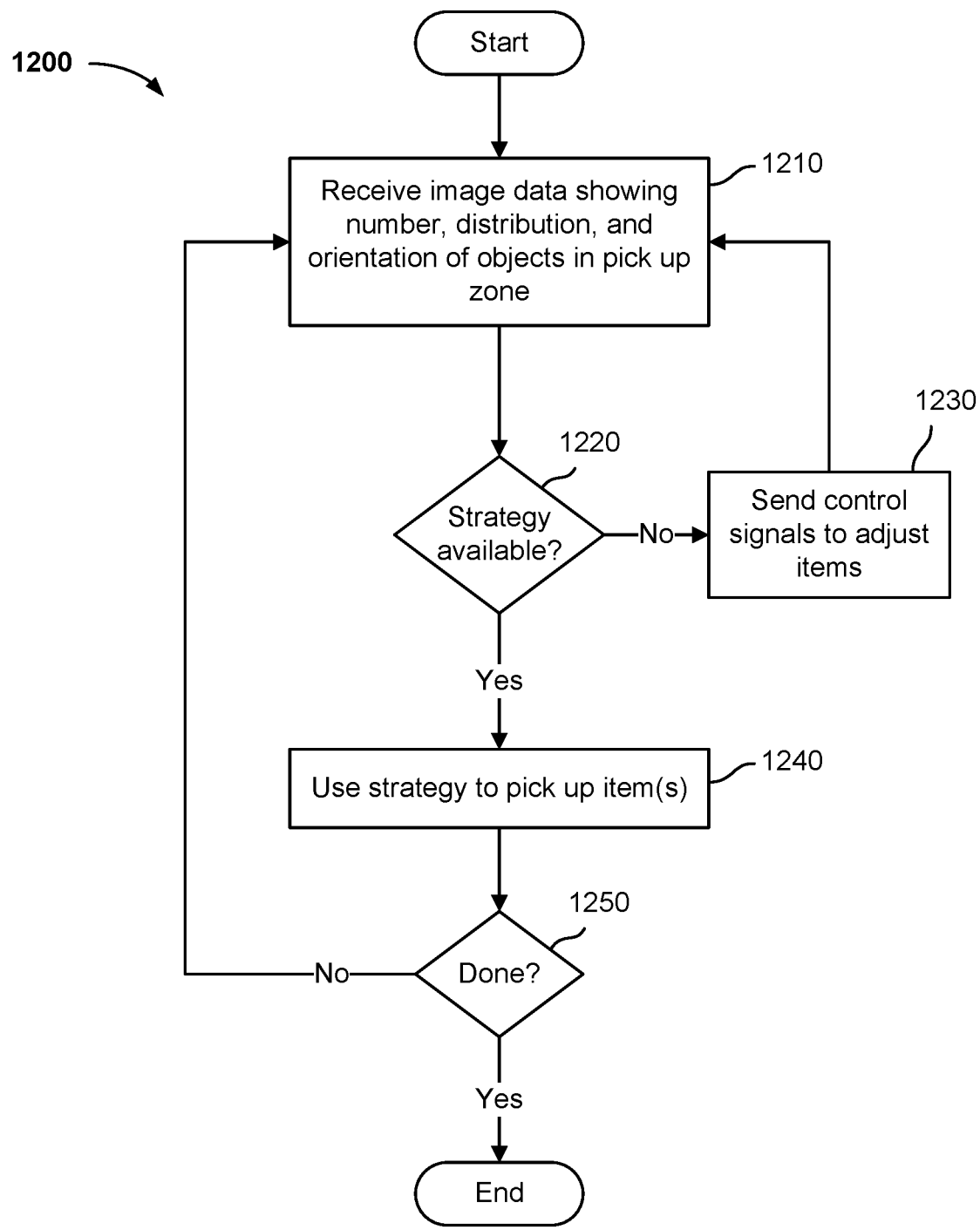
FIG. 12 is a flow chart illustrating an embodiment of a process to control a flow of items.

FIG. 12 is a flow chart illustrating an embodiment of a process to control a flow of items. In various embodiments, the process 1200 is implemented by a processor comprising or otherwise associated with a robotic system for picking and placing items (e.g., singulating items, kitting items, palletizing/depalletizing items, etc.) based at least in part on the availability of strategies to retrieve items from a pick-up zone/workspace. In the example shown, image (and/or other sensor data) indicating a number, distribution, and/or orientation of items in a pick-up zone is received (1210). If a strategy is available to use a robotic arm or other robotic retrieval device to retrieve a required item through automated operation (1220), the strategy is used to retrieve the item (1240). If no strategy is (or is anticipated to become) available (1220), one or more control signals are determined and sent to adjust items in the pick-up zone/workspace, or to adjust the providing of items to the pick-up zone such as via control of a flow disrupter that controls the flow of items in the chute (1230). In various embodiments, the control signal(s) is/are determined to create a context in which a strategy to retrieve the required item(s) will be (or is more likely to be) available. Once the control signals have been sent, further image (and/or other sensor data is processed (1210), and if a strategy to retrieve the item(s) has become available (1220) the strategy is implemented (1240). If not, a further iteration of adjustment may be performed (1220, 1230) unless/until a strategy becomes available (1220) or, in some embodiments, if no strategy becomes available after a timeout or prescribed number of attempts human intervention, such as by teleoperation, is invoked.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A robotic system, comprising:
 a communication interface;
 a robotic arm; and
 one or more processors coupled to the communication interface and configured to:
  receive, via the communication interface, data associated with a plurality of items within a workspace;
  obtain a model of the workspace, wherein the model is determined based at least in part on obtaining sensor data and determining based on the sensor data a set of boundaries for the plurality of items within the workspace on the sensor data;
  determine, based at least in part on the model, a successful grasp likelihood that the robotic arm can successfully grasp an item from the plurality of items within the workspace;
  determine whether to control a flow of items on a chute based at least in part on the successful grasp likelihood;
  in response to determining to control the flow of items, implement to control the flow of items at least by controlling a flow disrupter to move in a manner that causes the flow of items to change, wherein the flow disrupter is flush with the chute when the flow disrupter is not deployed to impede the flow of items;
  determine a plan to pick up an item and place the item at a destination location; and
  implement the plan at least by controlling the robotic arm to pick the item from a pickup zone of the workspace and place the item at the destination location according to the plan.

2. The robotic system of claim 1, wherein the workspace comprises one or more of the chute and a pickup zone of the workspace.

3. The robotic system of claim 1, wherein the one or more processors are further configured to determine a strategy for controlling the flow of items, and the controlling of the flow disrupter is based at least in part on the strategy.

4. The robotic system of claim 1, wherein:
 to determine to control the flow of items comprises determining that the flow of items within the chute is blocked;
 the one or more processors are further configured to determine a strategy for controlling the flow of items;
 the one or more processors control the flow disrupter based at least in part on the strategy; and
 the strategy comprises moving the flow disrupter in a manner that improves a blockage of the flow of items within the chute.

5. The robotic system of claim 1, wherein:
 the one or more processors determine, based on the data associated with the plurality of items within the workspace, to stop a flow of items within the chute;
 the one or more processors are further configured to determine a strategy for increasing the flow of items;
 the one or more processors control the flow disrupter based at least in part on the strategy; and
 the strategy comprises moving the flow disrupter in a manner that increases the flow of items within the chute.

6. The robotic system of claim 1, further comprising:
 a flow disrupter device comprising the flow disrupter and an actuation device that moves the flow disrupter in response to an input communicated by the one or more processors.

7. The robotic system of claim 6, wherein the flow disrupter device is configured to rotate the flow disrupter around an axis that is defined by a width of the chute.

8. The robotic system of claim 6, wherein the actuation device is a motor configured to rotate the flow disrupter at least partially around an axis.

9. The robotic system of claim 6, wherein the actuation device is a piston configured to rotate the flow disrupter at least partially around an axis.

10. The robotic system of claim 6, wherein:
 the actuation device is a bladder configured to rotate the flow disrupter at least partially around an axis; and
 the bladder rotates the flow disrupter in response to a fluid being introduced into an inner cavity of the bladder.

11. The robotic system of claim 10, wherein in response to the fluid being introduced into the inner cavity of the bladder, the bladder inflates and causes the flow disrupter to move.

12. The robotic system of claim 6, wherein the flow disrupter forms a surface of the chute.

13. The robotic system of claim 6, wherein the flow disrupter forms a surface of the chute, and the actuation device comprises a bladder that moves the flow disrupter in response to a fluid being introduced into an inner cavity of the bladder.

14. The robotic system of claim 1, wherein the one or more processors determine to control the flow of the items in the chute based at least in part on a state of a pickup zone of the workspace.

15. The robotic system of claim 14, wherein the one or more processors determine to control the flow of the items in the chute based at least in part on a determination that a density of items in the pickup zone exceeds a predefined density threshold.

16. The robotic system of claim 1, wherein the one or more processors determine to control the flow of the items in the chute based at least in part on a state of the chute.

17. The robotic system of claim 1, wherein in response to the flow disrupter being controlled to cause the flow of items to change, at least part of the flow disrupter is not flush with the chute.

18. The robotic system of claim 1, wherein the flow disrupter is removably attached to the chute.

19. The robotic system of claim 18, wherein the flow disrupter comprises a conveyor that is placed on an existing chute, wherein the existing chute conveys items to a pickup zone of the workspace.

20. A method to control a robotic system, comprising:
receiving, via a communication interface, data associated with a plurality of items within a workspace;
obtaining a model of the workspace, wherein the model is determined based at least in part on obtaining sensor data and determining based on the sensor data a set of boundaries for the plurality of items within the workspace on the sensor data;
determining, based at least in part on the model, a successful grasp likelihood that a robotic arm can successfully grasp an item from the plurality of items within the workspace;
determining, by one or more processors, whether to control a flow of items on a chute based at least in part on the successful grasp likelihood;
in response to determining to control the flow of items, implementing to control the flow of items at least by controlling a flow disrupter to move in a manner that causes the flow of items to change, wherein the flow disrupter is flush with the chute when the flow disrupter is not deployed to impede the flow of items;
determining a plan to pick up an item and place an item at a destination location, wherein the item is comprised in the plurality of items; and
controlling a robotic arm to pick the item from a pickup zone of the workspace and place the item at the destination location according to the plan.

21. A computer program product to control a robot, the computer program product being embodied in a non-transitory computer readable medium and comprising computer instructions for:
receiving, via a communication interface, data associated with a plurality of items within a workspace;
obtaining a model of the workspace, wherein the model is determined based at least in part on obtaining sensor data and determining based on the sensor data a set of boundaries for the plurality of items within the workspace on the sensor data;
determine, based at least in part on the model, a successful grasp likelihood that the robotic arm can successfully grasp an item from the plurality of items within the workspace;
determining, by one or more processors, whether to control a flow of items on a chute based at least in part on the successful grasp likelihood;
in response to determining to control the flow of items, implementing to control the flow of items at least by controlling a flow disrupter to move in a manner that causes the flow of items to change, wherein the flow disrupter is flush with the chute when the flow disrupter is not deployed to impede the flow of items;
determining a plan to pick up an item and place an item at a destination location, wherein the item is comprised in the plurality of items; and
controlling a robotic arm to pick the item from a pickup zone of the workspace and place the item at the destination location according to the plan.

22. A robotic system, comprising:
a communication interface; and
one or more processors coupled to the communication interface and configured to:
receive, via the communication interface, data associated with a plurality of items within a workspace;
determine whether to control a flow of items on a chute based at least in part on the data associated with the plurality of items within the workspace, wherein determining whether to control the follow of items comprises determining that the flow of items within the chute is blocked;
determining a strategy for controlling the flow of items, wherein the strategy comprises moving the flow disrupter in a manner that improves a blockage of the flow of items within the chute; and
in response to determining to control the flow of items, implement to control the flow of items at least by controlling the flow disrupter to move in a manner that causes the flow of items to change, wherein the flow disrupter is flush with the chute when the flow disrupter is not deployed to impede the flow of items, and the flow disrupter is controlled based at least in part on the strategy.

23. A method to control a robotic system, comprising:
receiving, via a communication interface, data associated with a plurality of items within a workspace;
determining, by one or more processors, whether to control a flow of items on a chute based at least in part on the data associated with the plurality of items within the workspace, wherein determining whether to control the follow of items comprises determining that the flow of items within the chute is blocked;
determining a strategy for controlling the flow of items, wherein the strategy comprises moving the flow disrupter in a manner that improves a blockage of the flow of items within the chute; and
in response to determining to control the flow of items, implementing to control the flow of items at least by controlling a flow disrupter to move in a manner that causes the flow of items to change, wherein the flow disrupter is flush with the chute when the flow disrupter is not deployed to impede the flow of items, and the flow disrupter is controlled based at least in part on the strategy.

24. A robotic system, comprising:
a communication interface;
one or more processors coupled to the communication interface and configured to:
receive, via the communication interface, data associated with a plurality of items within a workspace;
determine whether to control a flow of items on a chute based at least in part on the data associated with the plurality of items within the workspace; and
in response to determining to control the flow of items, implement to control the flow of items at least by controlling a flow disrupter to move in a manner that causes the flow of items to change, wherein the flow disrupter is flush with the chute when the flow disrupter is not deployed to impede the flow of items; and
a flow disrupter device comprising the flow disrupter and an actuation device that moves the flow disrupter in response to an input communicated by the one or more processors, wherein (i) the actuation device is a bladder configured to rotate the flow disrupter at least partially around an axis, and (ii) the bladder rotates the flow disrupter in response to a fluid being introduced into an inner cavity of the bladder.

25. A method to control a robotic system, comprising:

receiving, via a communication interface, data associated with a plurality of items within a workspace;

determining, by one or more processors, whether to control a flow of items on a chute based at least in part on the data associated with the plurality of items within the workspace; and in response to determining to control the flow of items, implementing to control the flow of items at least by controlling a flow disrupter to move in a manner that causes the flow of items to change;

wherein:
the flow disrupter is flush with the chute when the flow disrupter is not deployed to impede the flow of items;

the robotic system comprises a flow disrupter device comprising the flow disrupter and an actuation device that moves the flow disrupter in response to an input communicated in connection with controlling the flow disrupter to move in the manner that causes the flow of items to change;

the actuation device is a bladder configured to rotate the flow disrupter at least partially around an axis; and the bladder rotates the flow disrupter in response to a fluid being introduced into an inner cavity of the bladder.

* * * * *